(12) United States Patent
Duxbury

(10) Patent No.: US 11,820,039 B2
(45) Date of Patent: Nov. 21, 2023

(54) TAPER JIG AND METHODS OF USE

(71) Applicant: Woodpeckers, LLC, Strongsville, OH (US)

(72) Inventor: Nathan William Duxbury, Northfield, OH (US)

(73) Assignee: WOODPECKERS, LLC, Strongsville, OH (US)

( * ) Notice: Subject to any disclaimer, the term of this patent is extended or adjusted under 35 U.S.C. 154(b) by 368 days.

(21) Appl. No.: 17/391,726

(22) Filed: Aug. 2, 2021

(65) Prior Publication Data

US 2023/0037039 A1 Feb. 2, 2023

(51) Int. Cl.
| | | |
|---|---|---|
| B25B 5/00 | (2006.01) | |
| B27C 5/06 | (2006.01) | |
| B23D 47/04 | (2006.01) | |
| B23D 47/02 | (2006.01) | |

(52) U.S. Cl.
CPC .............. B27C 5/06 (2013.01); B23D 47/025 (2013.01); B23D 47/04 (2013.01); B25B 5/006 (2013.01)

(58) Field of Classification Search
CPC ........ B27C 5/06; B23D 47/025; B23D 47/04; B25B 5/006
See application file for complete search history.

(56) References Cited

U.S. PATENT DOCUMENTS

| | | |
|---|---|---|
| 2,339,897 A | 1/1944 | Wetzler |
| 2,351,436 A | 6/1944 | Ketz |
| 4,125,251 A | 11/1978 | Jamieson, Jr. |
| D267,625 S | 1/1983 | Dark |
| D320,915 S | 10/1991 | Sanguino |
| 5,090,283 A * | 2/1992 | Noble .................... B27G 19/04 83/467.1 |
| D332,562 S | 1/1993 | Fremont et al. |
| 5,816,129 A * | 10/1998 | Singer .................... B27B 27/08 83/581 |
| D436,814 S | 1/2001 | Gore |
| D568,706 S | 5/2008 | Weiby |
| D568,707 S | 5/2008 | Weiby |
| D574,864 S | 8/2008 | McDaniel |
| D577,752 S | 9/2008 | McDaniel et al. |
| 8,167,259 B2 | 5/2012 | Spang, Jr. et al. |
| D682,327 S | 5/2013 | Perez et al. |
| D711,718 S | 8/2014 | Francaviglia |
| D718,599 S | 12/2014 | Durocher et al. |

(Continued)

*Primary Examiner* — Nirvana Deonauth
(74) *Attorney, Agent, or Firm* — Sand, Sebolt & Wernow Co., LPA

(57) ABSTRACT

A taper jig that provides a woodworker with multifunctional use for orientating and maintaining a workpiece in order to make a tapered cut in a workpiece at desired incremental angles. The taper jig includes a first track and a second track that operably engages the first track wherein the second track is pivotably moveable relative to the first track. The taper jig also includes at least one measurement scale assembly that operably secures the first track and the second track to one another at a predetermined angle. The taper jig also includes at least one clamping handle assembly that operably engages one of the first track and the second track, wherein the at least one clamping handle assembly being adapted to clamp a workpiece. The taper jig may also include a first sled and a second sled that operably engage with the first and second tracks.

23 Claims, 33 Drawing Sheets

(56) References Cited

U.S. PATENT DOCUMENTS

| | | |
|---|---|---|
| D809,032 S | 1/2018 | Cummings |
| D809,578 S | 2/2018 | Cummings |
| D892,582 S | 8/2020 | Doherty |
| D894,707 S | 9/2020 | Hall |
| D898,086 S | 10/2020 | Schaaf et al. |
| D903,452 S | 12/2020 | Lin |
| D903,456 S | 12/2020 | Hall |
| D913,347 S | 3/2021 | Hall |
| 2003/0015078 A1* | 1/2003 | Taylor .................... B27G 5/023 83/437.2 |
| 2006/0027289 A1* | 2/2006 | Lin ........................ B27G 5/023 83/471 |

* cited by examiner

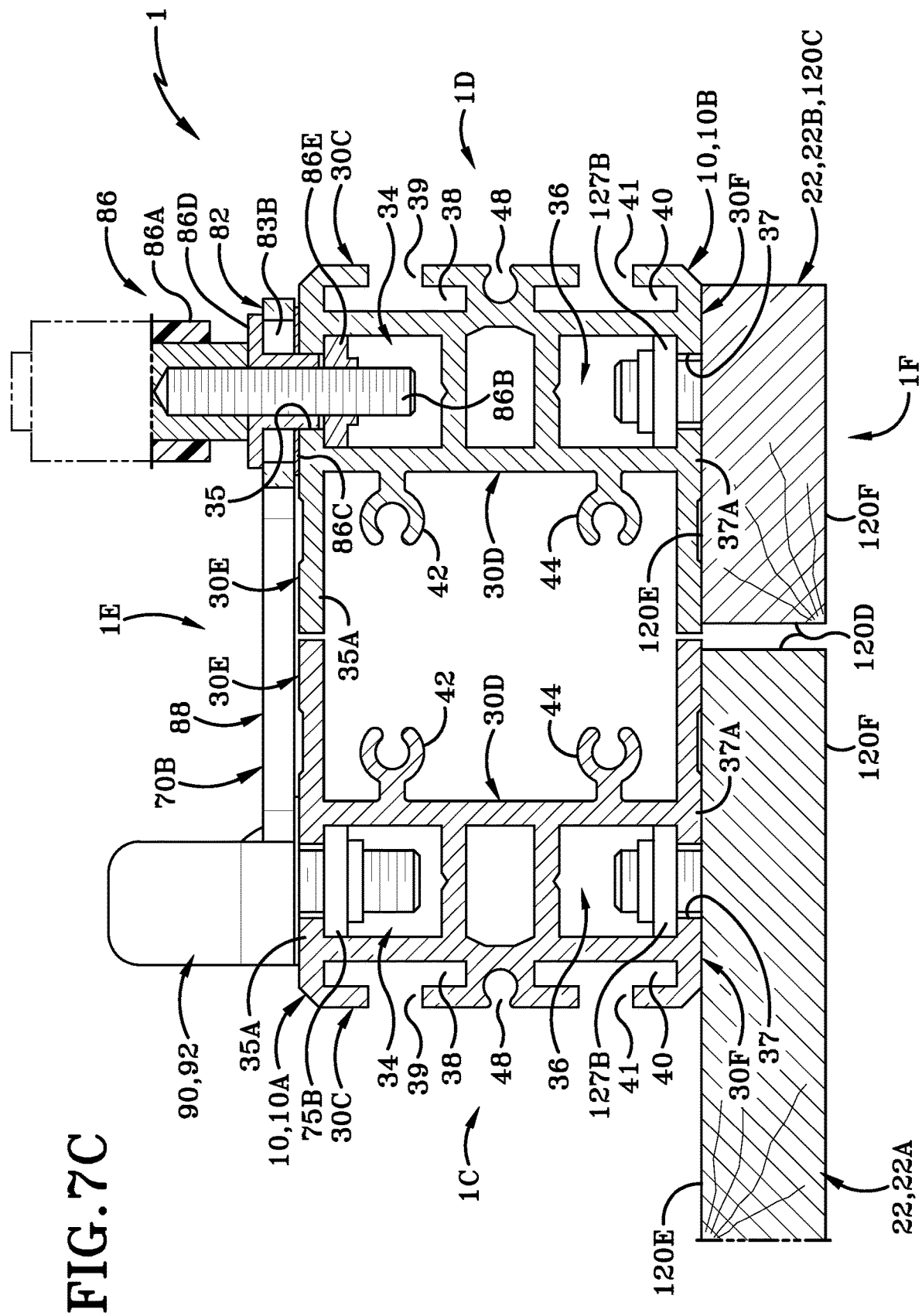

TAPER JIG AND METHODS OF USE

TECHNICAL FIELD

The present disclosure generally relates to an angled setting system. More particularly, the present disclosure relates to a taper jig. Specifically, the present disclosure relates to a taper jig that is useable with any table saw which enables a user to more accurately cut a tapered cut into a workpiece at precise angle increments with a table saw in a controlled angled line.

BACKGROUND

Table saws are versatile tools used in multiple projects for cutting into different types of workpiece, such as wood workpiece. Generally, table saws and of the like are used in woodworking projects for cutting and/or sawing into a workpiece at variable dimensions and angles based on the orientation and/or arrangement of the workpiece used with a selected table saw. While a woodworker may use a table saw or a similar woodworking device to make tapered cuts into a workpiece, it may become extremely difficult and demanding to make precise and accurate tapered cuts into a workpiece that are substantially precise to the angle predetermined by the woodwork.

To address these difficulties and problems, a woodworker may select an angled guiding system, such as a taper jig, to help stabilize and guide his or her workpiece through a cutting blade of a table saw during a cutting operation. While such taper jigs are provided in the market, the woodworker may have to use a number of different devices with the angled guide system to perform tapered cut into a workpiece. For example, the woodworker may have to use a first set of assisting devices with the taper jig for cutting a first tapered cut into a workpiece and a second set of assisting devices with the taper jig for cutting a first tapered cut into a workpiece. In another example, the woodworker may have to use a first measurement device with the taper jig cutting a first tapered cut into a workpiece and a second measurement device with the taper jig cutting a second tapered cut into a workpiece. Such use of multiple assisting devices and/or measurement devices requires the woodworker to have access to these various assisting devices and/or measurement devices and requires the expenditure of more time and effort when the woodworker is cutting tapered cuts into a workpiece.

SUMMARY

The presently disclosed taper jig provides a woodworker with multifunctional use for orientating and maintaining a workpiece in order to make a tapered cut in a workpiece at desired incremental angles. The disclosed taper jig may reduce the overall number of table saw assisting devices and/or measurement devices that a woodworker has to use to complete a project and may also the reduce the project's completion time since the need to switch between multiple devices is avoided. As such, the taper jig disclosed herein addresses some of the inadequacies of previously known taper jig assisting devices.

In one aspect, an exemplary embodiment of the present disclosure may provide a taper jig. The taper jig has a first track. The taper jig also has a second track that operably engages the first track wherein the second track is pivotably moveable relative to the first track. The taper jig also has at least one measurement scale assembly that operably secures the first track and the second track to one another at a predetermined angle. The taper jig also has at least one clamping handle assembly that operably engages one of the first track and the second track, said at least one clamping handle assembly being adapted to clamp a workpiece.

This exemplary embodiment or another exemplary embodiment may further provide that the first track and the second track are arranged in a same plane, and each of the first track and second track has outer surface and an inner surface, and when the first track and second track pivot relative to one another, the inner surfaces move one of towards and away from one another. This exemplary embodiment or another exemplary embodiment may further provide that the first track further comprises a front end, a rear end, a first top channel extending from the front end to the rear end, and an opposing first bottom channel extending from the front end to the rear end. This exemplary embodiment or another exemplary embodiment may further provide that the second track further comprises a front end, a rear end, a second top channel extending from the front end to the rear end, and an opposing second bottom channel extending from the front end to the rear end. This exemplary embodiment or another exemplary embodiment may further provide that the at least one clamping handle assembly is selectively operably engageable in one of the first top channel and the second top channel. This exemplary embodiment or another exemplary embodiment may further provide that each of the first track and the second track has a front end and a rear end, wherein a channel is defined in each of the first track and the second track and the channel extends from the front end to the rear end, and wherein the at least one measurement scale assembly is operably engaged with the channel of the first track and with the channel of the second track. This exemplary embodiment or another exemplary embodiment may further provide a push plate selectively operably engaging either of the first track and the second tracks. This exemplary embodiment or another exemplary embodiment may further provide that the at least one measurement scale assembly further comprises: an indexer having a set of measurement teeth defining a set of angles; and a selector having at least one selector tooth operable to selectively engage the set of measurement teeth and set the predetermined angle between the first track and the second track. This exemplary embodiment or another exemplary embodiment may further provide that the set of angles defines a range from about zero degrees up to about seven degrees arranged in one-quarter degree increments. This exemplary embodiment or another exemplary embodiment may further provide that the set of angles defines a range from about zero degrees up to about fifteen degrees arranged in one-half degree increments. This exemplary embodiment or another exemplary embodiment may further provide that the clamping handle assembly comprises: a handle; a threaded shaft operably engaged with the handle, said threaded shaft being adapted to engage with a woodworking tool; and a clamp block operably engaged with the threaded shaft, said clamp block being adapted to apply a clamping force to a workpiece. This exemplary embodiment or another exemplary embodiment may further provide that the handle and the clamp block interlockingly engage with one another. This exemplary embodiment or another exemplary embodiment may further provide that the clamp block is selectively movable between a first orientation and a second orientation. This exemplary embodiment or another exemplary embodiment may further provide that each of the first track and the second track has a front end and a rear end, wherein a channel is defined in each of the first track and the second track and the channel extends from the front end to the rear end, and wherein the taper jig further comprises: a span clamp assembly extending between the channel in the first track and the channel in the second track, said span clamp assembly adjustably securing the first track and the second track to one another. This exemplary embodiment or another exemplary embodiment may further provide that the at least one measurement scale assembly sets the predetermined angle in a first range of angles, and wherein the span clamp assembly sets the predetermined angle in a second range of angles outside of the first range of angles. This exemplary embodiment or another exemplary embodiment may further provide a first sled operably engaged with the first bottom channel of the first track by a first set of locking mechanisms; and a second sled operably engaged with the second bottom channel of the second track by a second set of locking mechanisms. This exemplary embodiment or another exemplary embodiment may further provide that an expansion assembly, the expansion assembly comprising: a first expansion track operably engaged to the first track; and a second expansion track operably engaged to the second track.

In another aspect, an exemplary embodiment of the present disclosure may provide a method of cutting a workpiece using a taper jig. The method comprising the steps of moving a first track of the taper jig and a second track of the taper jig to a predetermined angle relative to one another via at least one measurement scale assembly; securing the first track and the second track to one another at the predetermined angle via the at least one measurement scale assembly; operably engaging at least one clamping handle assembly with one of the first track and the second track; clamping the workpiece to the one of the first track and the second track with the at least one clamping handle assembly; and cutting the workpiece at the predetermined angle via a cutting unit.

This exemplary embodiment or another exemplary embodiment may further provide the step of utilizing the at least one measurement scale assembly to set the predetermined angle in a first range of angles. This exemplary embodiment or another exemplary embodiment may further provide the step of providing an indexer on the at least one measurement scale assembly having a first set of angles thereon that are in the first range of angles, and the first set of angles is from about zero degrees up to about seven degrees arranged in one-quarter degree increments. This exemplary embodiment or another exemplary embodiment may further provide the step of providing an indexer on the at least one measurement scale assembly with a first set of angles thereon that are in the first range of angles, and the first set of angles is from about zero degrees up to about fifteen degrees arranged in one-half degree increments. This exemplary embodiment or another exemplary embodiment may further provide the steps of providing an indexer on the at least one measurement scale assembly and providing a set of measurement teeth on the indexer; providing a selector on the at least one measurement scale assembly and providing at least one selector tooth on the selector; and selectively engaging the at least one selector tooth with the set of measurement teeth to set the predetermined angle between the first track and the second track. This exemplary embodiment or another exemplary embodiment may further provide the steps of disengaging the at least one measurement scale from one or both of the first track and the second track; engaging a span clamp assembly between the first track and the second track; and utilizing the span clamp assembly to set the predetermined angle in a second range of angles, wherein the second range of angles is outside of the first range of angles. This exemplary embodiment or another exemplary embodiment may further provide the steps of defining a first channel in the first track, wherein the first channel extends between a front end and a rear end of the first track; defining a second channel in the second track, wherein the second channel extends between a front end and rear end of the second track; and engaging the at least one measurement scale assembly in the first channel and in the second channel. This exemplary embodiment or another exemplary embodiment may further provide the steps of attaching a first expansion track of an expansion assembly to the first track of the taper jig; attaching a second expansion track of the expansion assembly to the second track of the taper jig; and operably engaging a workpiece with the first track of the taper jig and the first expansion track of the expansion assembly.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 7C is a transverse cross-section of the taper jig taken in the direction of line 7C-7C in FIG. 3.

FIG. 10 is also a front elevation view of the at least one clamping handle assembly operatively engaged with the taper jig.

Similar numbers refer to similar parts throughout the drawings.

DETAILED DESCRIPTION

Figure 1:
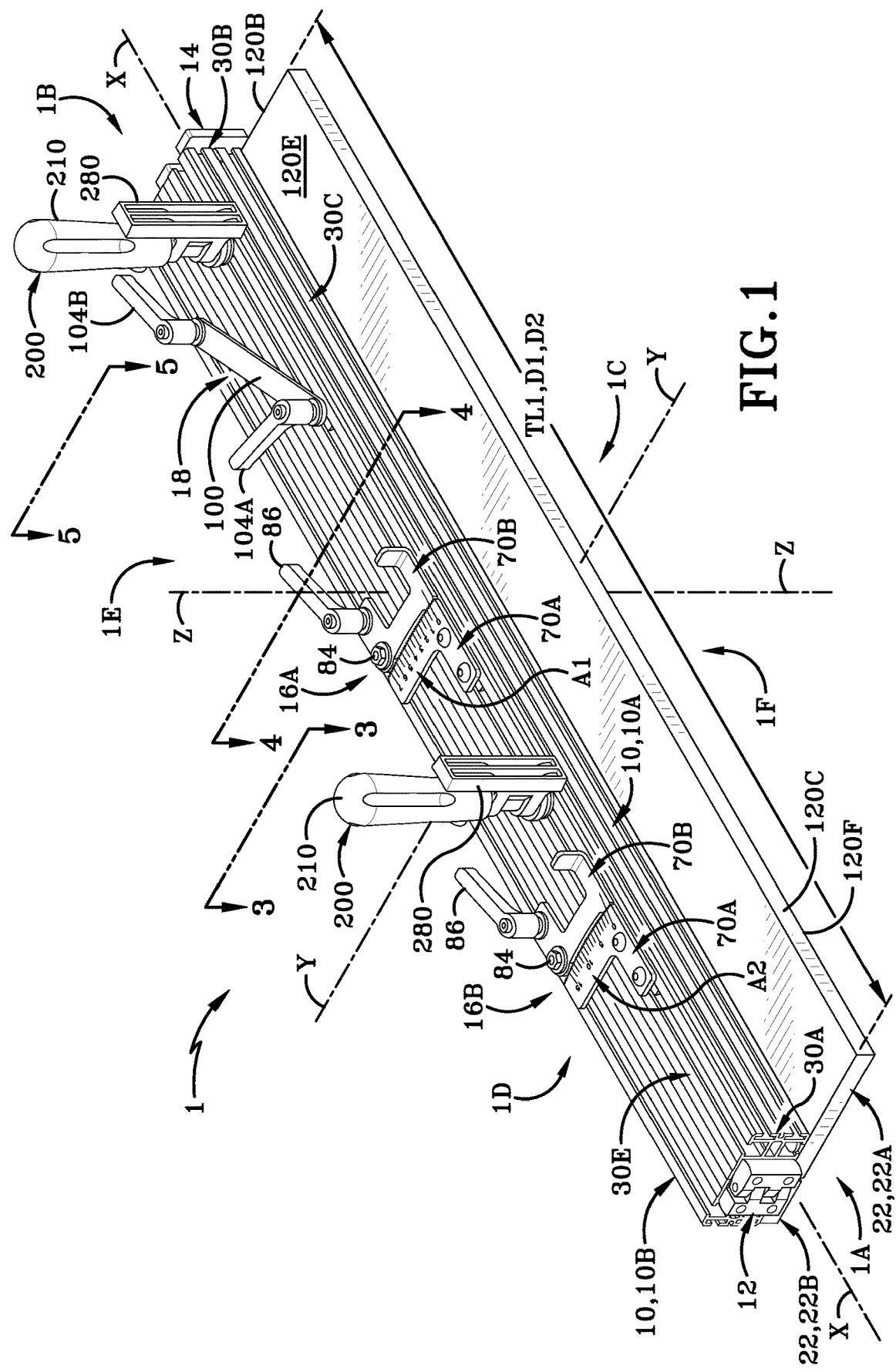
FIG. 1 is a top, front, left side isometric perspective of a taper jig in accordance with an aspect of the present disclosure, wherein the taper jig is illustrated operatively engaged with at least one clamping handles in accordance with an aspect of the present disclosure.

FIG. 1 illustrates a taper jig, shown generally at 1, for use with a table saw, which is described in more detail below. Taper jig 1 generally includes a front end 1A, a rear end 1B that opposes the front end 1A, a first side or left side 1C, a second side or right side 1D that opposes the left side 1C, a top end 1E, and a bottom end 1F that opposes the top end 1E. In addition, the taper jig 1 includes a longitudinal axis "X" that extends between the front end 1A and the rear end 1B, a transverse axis "Y" that extends between the left side 1C and the right side 1D, and a vertical axis "Z" that extends between the top end 1E and the bottom end 1F. It should be understood that the terms "front", "rear", "top", bottom", "right", and "left" are used to describe the orientation of the taper jig 1 illustrated in the attached figures and should in no way be considered to limit the orientation that the taper jig 1 may be utilized.

Referring now to FIG. 1, the taper jig 1 includes a pair of tracks 10, a hinge 12 that operably connects the first track 10A and the second track 10B together, a push plate 14, at least one measurement scale assembly 16, a span clamp assembly 18, and a pair of sleds 22. In addition, at least one clamping handle assembly 200 and an expansion assembly 300 may operably engage the taper jig 1 and/or each other as desired by a woodworker using the taper jig 1. Such associated assemblies and/or components are described in more detail below.

In the illustrated embodiment, the pair of tracks 10 includes a first track 10A and a second track 10B. Each of the first track 10A and a second track 10B operably engages with one another via the hinge 12. The first track 10A and the second track 10B are identical to one another and are engaged with the hinge 12 as mirrored images that face towards the front end 1A of the taper jig 1. Inasmuch as the first track 10A and the second track 10B are identical, the following description will relate to the first track 10A. It should be understood, however, that the description of the first track 10A applies equally to the second track 10B.

Referring to FIG. 1, the first track 10A has a front end 30A disposed proximate the front end 1A of the taper jig 1, a rear end 30B that opposes the front end 30A, and a length $TL_1$ that is defined from the front end 30A to the rear end 30B. In addition, the first track 10A includes an outer surface 30C that is proximate the left side 1C of the taper jig 1 and extends between the front end 30A of the first track 10A and the rear end 30B of the first track 10A. The first track 10A also includes an inner surface 30D that is proximate the right side 1D of the taper jig 1 and extends between the front end 30A of the first track 10A and the rear end 30B of the first track 10A. The first track 10A also includes a top surface 30E that is proximate the top end 1E of the taper jig 1 and extends between the front end 30A of the first track 10A and the rear end 30B of the first track 10A. The first track 10A also includes a bottom surface 32F that is proximate the first track 10A and the bottom end 1F of the taper jig 1 and extends between the front end 30A of the first track 10A and the rear end 30B of the first track 10A. In the illustrated embodiment, the outer surface 30C opposes the inner surface 30D on the first track 10A relative to the longitudinal axis "X", and the top surface 30E opposes the bottom surface 32F relative to the vertical axis "Z".

Figure 2A:
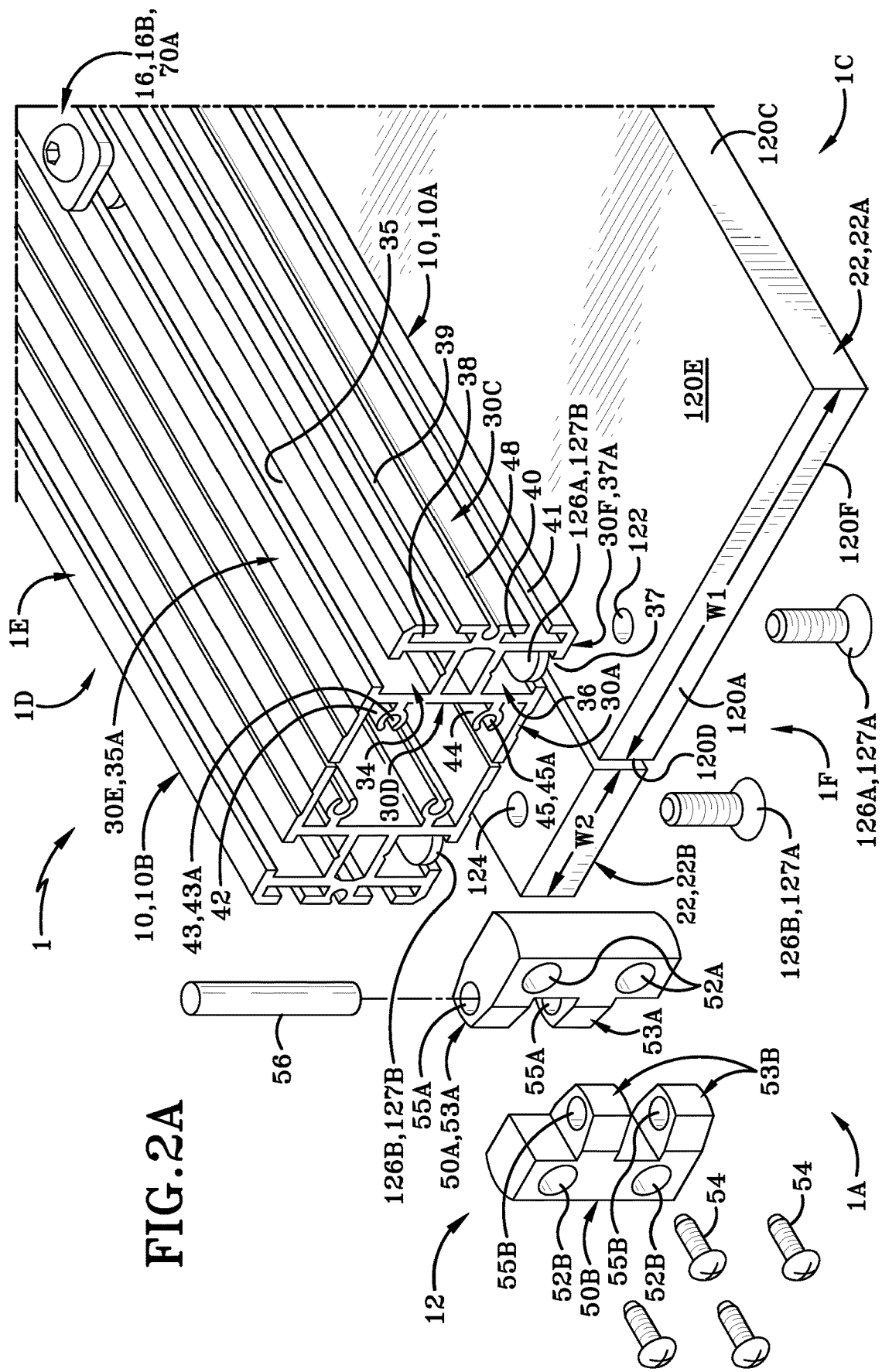
FIG. 2A is a partial top, front, left side isometric perspective view of the taper jig in FIG. 1, wherein a hinge and first and second sleds are provided in exploded views.

Referring to FIGS. 1 and 2, the first track 10A defines a top channel 34 that extends along the length $TL_1$ of the first track. The top channel 34 also extends downwardly into the first track 10A from the top surface 30E along an axis that is parallel with the vertical axis "Z". The top channel 34 of the first track 10A is accessible by a top slot 35 defined along an upper wall 35A of the first track 10A. A lower wall 34A of the first track 10A also defines the top channel 34 in the first track 10A. In addition, a groove 34A' extends into the lower wall 34A relative to the vertical axis "Z" of the taper jig 1. Such use of each of the lower wall 34A, the groove 34A', and upper wall 35A is described in more detail below. The first track 10A also defines a bottom channel 36 that extends along the length $TL_1$ of the first track and opposes the top channel 34 on the first track 10A. The bottom channel 36 extends upwardly into the first track 10A from the bottom surface 32F along an axis that is parallel with the vertical axis "Z". The bottom channel 36 of the first track 10A is accessible by a bottom slot 37 defined along a bottom wall 37A of the first track 10A. Such use of the bottom wall 37A is described in more detail below.

Still referring to FIGS. 1 and 2, the first track 10A also defines a first outer channel 38 that extends along the length $TL_1$ of the first track and is disposed proximate to the top channel 34. The first outer channel 38 extends laterally into the first track 10A from the outer surface 30C along an axis that is parallel with the transverse axis "Y." The first outer channel 38 of the first track 10A is accessible by a first outer slot 39 defined along the outer surface 30C of the first track 10A. The first track 10A also defines a second outer channel 40 that extends along the length $TL_1$ of the first track and is disposed proximate to the bottom channel 36. The second outer channel 40 extends laterally into the first track 10A from the outer surface 30C along an axis that is parallel to the transverse axis "Y." The second outer channel 40 of the first track 10A is accessible by a second outer slot 41 defined along the outer surface 30C of the first track 10A. In the illustrated embodiment, the first outer channel 38 and the second outer channel 40 are arranged side-by-side to one another on the first track 10A in which the first outer channel 38 is disposed above the second outer channel 40 relative to the vertical axis "Z". Such uses of each of the top channel 34, bottom channel 36, first outer channel 38, and second outer channel 40 is described in more detail below.

In addition, the first track 10A defines a third outer channel 48 that extends laterally into the first track 10A from the outer surface 30C along an axis that is parallel with the transverse axis "Y." In the illustrated embodiment, the third outer channel 48 is defined between the first outer channel 38 and the second outer channel 40 relative to the vertical axis "Z". The first inner channel 42 defines a threaded aperture 49 at the front end 30A of the first track 10A where such use of the threaded aperture 49 is described in more detail below.

Each of the top channel 34, bottom channel 36, first outer channel 38, and second outer channel 40 may define similar shapes and/or different shapes on the first track 10A. In one exemplary embodiment, a top channel and a bottom channel may define a substantially similar shape in which the top channel and the bottom channel define a U-shaped channel in the cross section of the first track. In another exemplary embodiment, a first outer channel and a second outer channel may define a substantially similar shape in which both the first outer channel and the second outer channel define a T-shaped channel in the cross section of the first track.

Still referring to FIGS. 1 and 2, the first track 10A also includes a first inner channel 42 and a second inner channel 44. Each of the first inner channel 42 and the second inner channel 44 extend away from the inner surface 30D relative to the transverse axis "Y". The first inner channel 42 extends along the length $TL_1$ of the first track 10A and is disposed proximate to the top channel 34. The first inner channel 42 defines a first set of threaded openings 43 where a first threaded opening 43A is defined at the front end 30A of the first track 10A and a second threaded opening 43B is defined at the rear end 30B of the first track 10A opposite to the first threaded opening 43A. The second inner channel 44 extends along the length $TL_1$ of the first track 10A and is disposed proximate to the bottom channel 36. The second inner channel 44 defines a second set of threaded openings 45 where a first threaded opening 45A of the second set of threaded openings 45 is defined at the front end 30A of the first track 10A and a second threaded opening 45B of the second set of threaded openings 45 is defined at the rear end 30B of the first track 10A opposite to the first threaded opening 45A. In the illustrated embodiment, the first inner channel 42 and the second inner channel 44 are arranged side-by-side to one another on the first track 10A in which the first inner channel 42 is disposed above the second outer channel 40 relative to the vertical axis "Z". In addition, such use of first set of threaded openings 43 and the second set of threaded openings 45 is described in more detail below.

The first track 10A also includes a first marked position 46 that is proximate the front end 30A of the first track 10A and a second marked position 47 that is adjacent to the first marked position 46 and proximate the medial point of the first track 10A between the front end 30A and the rear end 30B of the first track 10A. Such first marked position 46 and second marked position 47 are described in more detail below.

The first and second tracks 10A, 10B may be made of any suitable material for providing minimum maintenance and high durability. In one exemplary embodiment, first and second tracks may be made of a metal material. In another exemplary embodiment, first and second tracks may be made of a nonferrous metal material. In another exemplary embodiment, first and second tracks may be made of an aluminum material. In another exemplary embodiment, first and second tracks may be made of an anodized extruded aluminum material.

As illustrated in FIG. 2, the hinge 12 has a first separable portion 50A that defines a first set of apertures 52A. The first portion 50A also defines a set of extensions 53A where a connection hole 55A is defined in each extension 53A on the first portion 50A. Similarly, the hinge 12 defines a second separable portion 50B that defines a second set of apertures 52B. The second portion 50B also defines a set of extensions 53B where a connection hole 55B is defined in each extension 53B on the second portion 50B. In the illustrated embodiment, the first portion 50A is operably engaged with the first track 10A via fasteners 54 passing through the first set of apertures 52A and operably threaded into the first threaded openings 43A, 45A of the first and second inner channels 42, 44 on the first track 10A. The second portion 50B is operably engaged with the second track 10B via the fasteners 54 passing through the second set of apertures 52B and operably threaded into the second threaded openings 43A, 45A of the first and second inner channels 42, 44 on the second track 10B. In addition, the first portion 50A is operably connected with the second portion 50B via a linchpin 56 being housed inside of the connections holes 55A, 55B to interlock the first portion 50A and the second portion 50B together. The interlocking relationship between the first portion 50A and the second portion 50B, via the linchpin 56, allows the rear end 30B of one of the first and second tracks 10A, 10B to rotate away from the rear end 30B of the one of the first and second tracks 10A, 10B by pivoting the front end 30A of one of the first and second tracks 10A, 10B relative to the front end 30A of one of the first and second tracks 10A, 10B. Such rotation and/or pivoting of the of the tracks 10A, 10B relative to one another is described in more detail below.

In the illustrated embodiment, the hinge 12 may be made of any suitable material for providing a suitable connection between the first and second tracks 10A, 10B while maintaining strength and impact resistance. In one exemplary embodiment, a hinge may be made of a plastic material. In another exemplary embodiment, a hinge may be made of a polymer material. In another exemplary embodiment, a hinge may be made of reinforced nylon material.

Figure 2B:
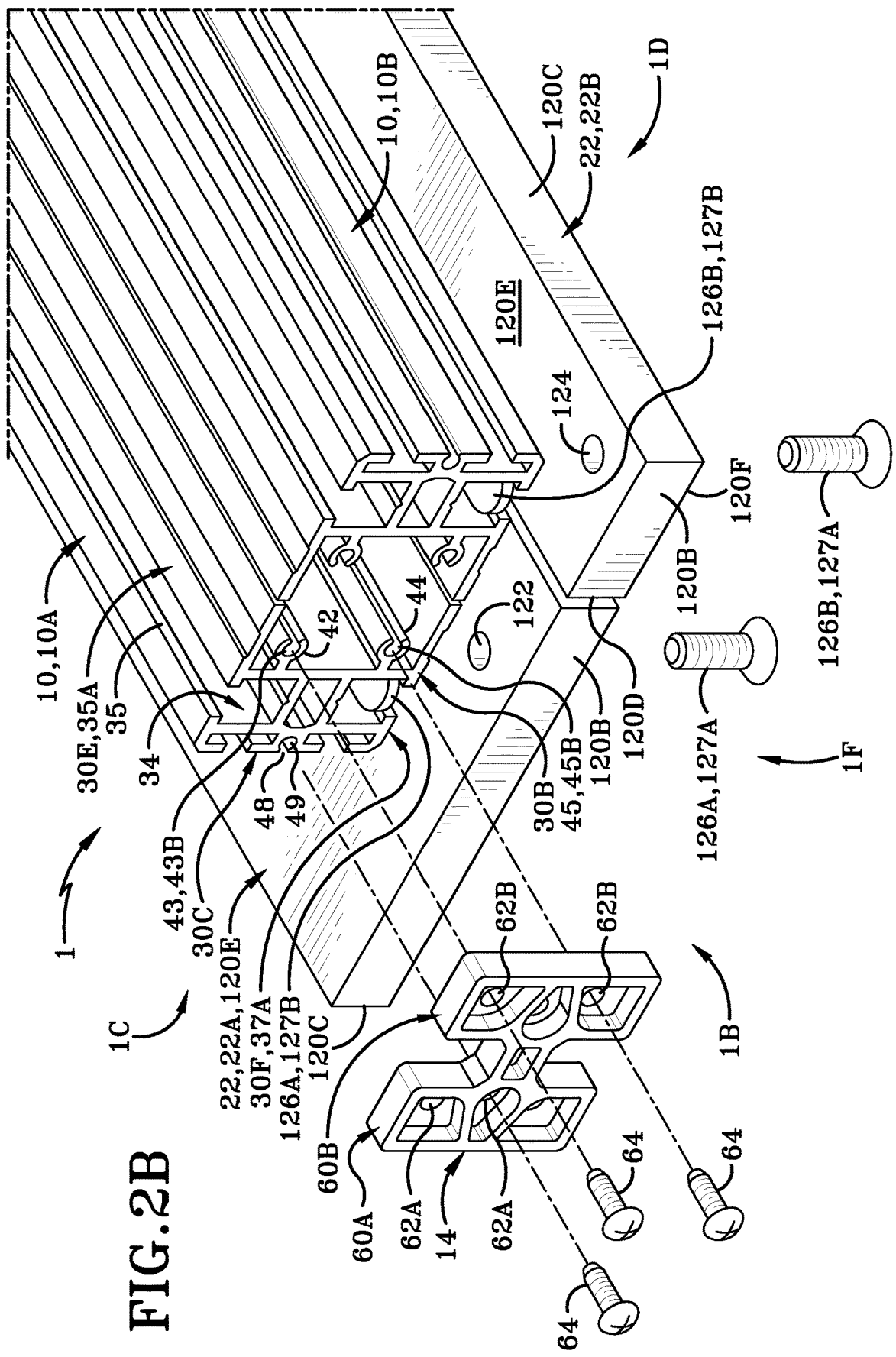
FIG. 2B is a partial top, rear, right side isometric perspective view of the taper jig in FIG. 1, wherein a push plate and first and second sleds are provided in exploded views.

Referring to FIG. 1, the push plate 14 is provided in a H-shaped configuration that includes first section 60A joined with a second section 60B. In the illustrated embodiment, the first section 60A includes a first set of holes 62A, and the second section 60B includes a second set of holes 62B. In the illustrated embodiment, the push plate 14 operably engages the rear end 30B of the first track 10A via a set of fasteners 64 operably threading into the second set of threaded openings 45 of the first track 10A. As shown in FIG. 2B, fasteners from the set of fasteners 64 passes through the first set of holes 62A of the first section 60A and operably threaded into the second threaded openings 43B, 45B of the first and second inner channels 42, 44 on the first track 10A and the threaded aperture 49 of the third outer channel 48 on the first track 10A. While the push plate 14 is operably engaged to the first track 10A, the push plate 14 may operably engage the second track 10B in a substantially similar configuration and/or arrangement as the push plate 14 operably engages to the first track 10A.

Figure 16A:
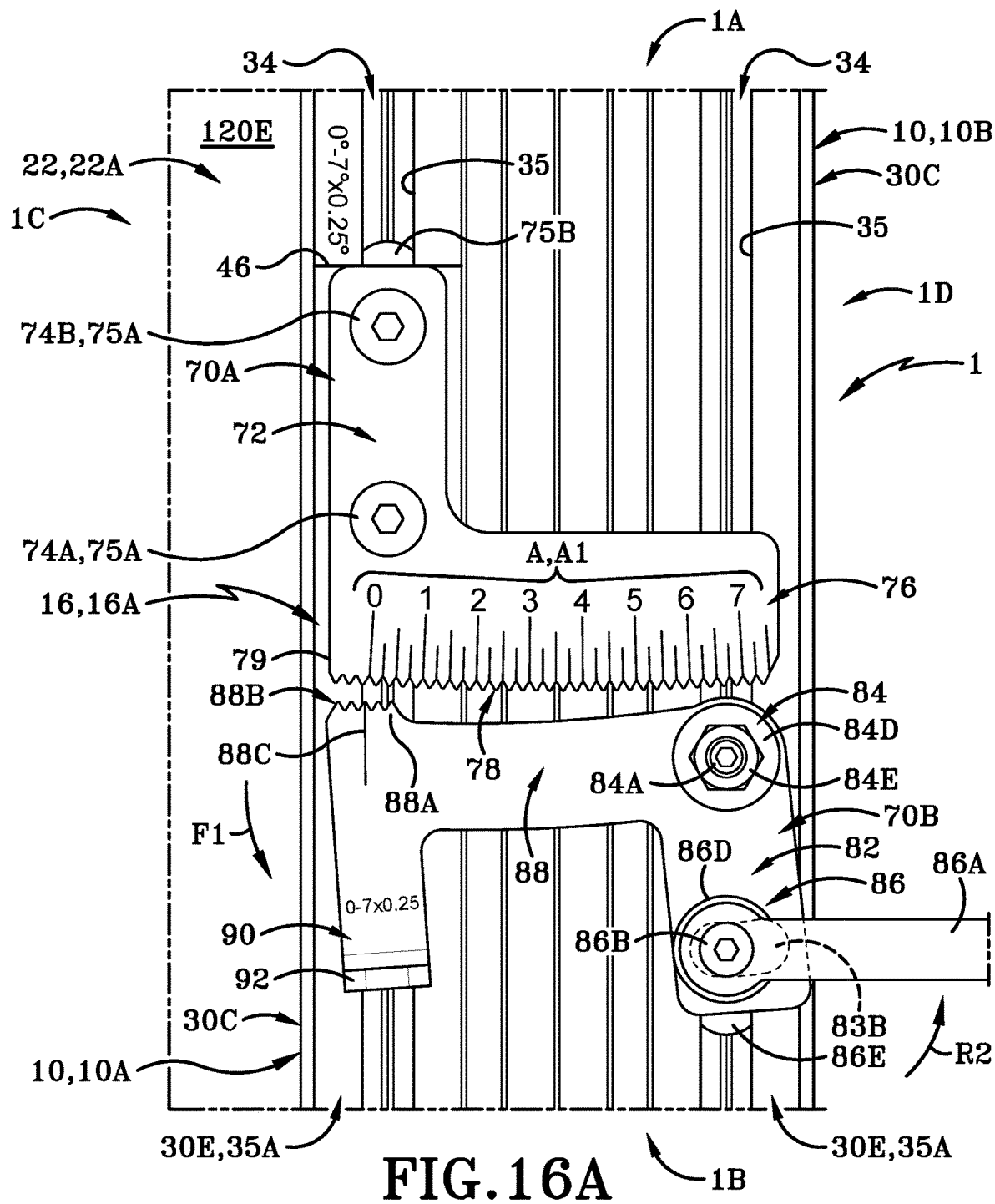
FIG. 16A is a partial top plan view of the first measurement scale assembly and the taper jig, wherein a selector of the first measurement scale assembly is loosened from the second track and is disengaged from an indexer of the first measurement scale assembly.
Figure 16B:
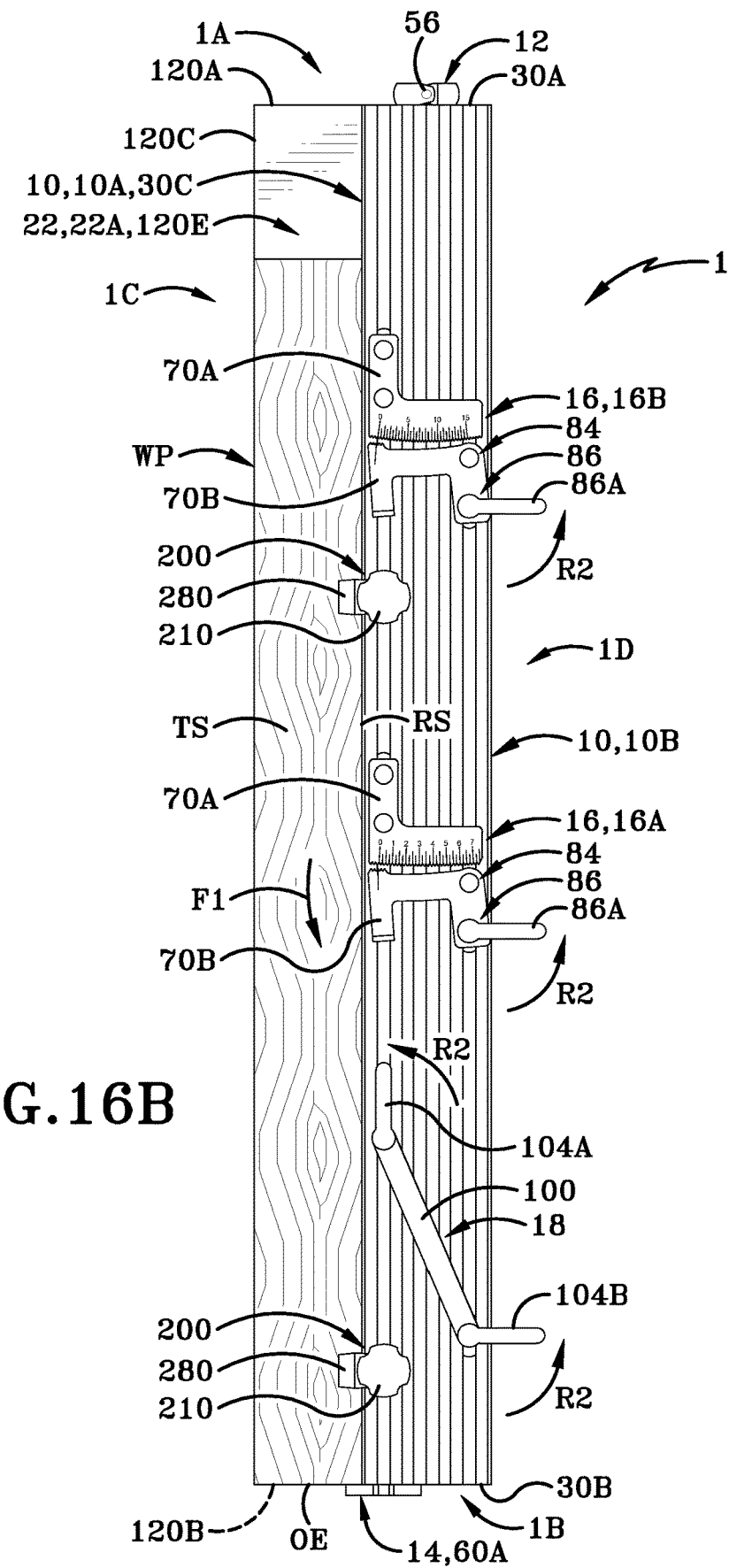
FIG. 16B is a top elevation view similar to FIG. 16A of the taper jig, wherein the workpiece is operably engaged with the taper jig, and wherein the second measurement scale assembly and the span clamp assembly are loosened from the taper jig.

In addition, a portion of the first section 60A of the push plate 14 is disposed beyond the outer surface 30C of the first track 10A when the push plate 14 is operably engaged to the first track 10A. As illustrated in FIG. 16B, an outermost edge "OE" of a workpiece "WP" abuts the portion of the first section 60A of the push plate 14 that is disposed beyond the outer surface 30C of the first track 10A. As illustrated in FIGS. 16B-16D, 17, and 18, the push plate 14 maintains the lateral position of the workpiece "WP" relative to the taper jig 1 in which the push plate 14 prevents the workpiece "WP" from laterally moving along the first track 10A during a cutting process. While the push plate 14 is operably engaged to the first track 10A for maintaining the lateral position of the workpiece "WP", the push plate 14 may operably engage with the second track 10B for maintaining the lateral position of a workpiece substantially similar to the push plate 14 being operably engaged with the first track 10A via fasteners 64.

The at least one measurement scale assembly 16 of the taper jig 1 may include a first measurement scale assembly 16A and a second measurement scale assembly 16B. Each of the first measurement scale assembly 16A and the second measurement scale assembly 16B operably engages the first and second tracks 10A, at different predetermined locations on the first and second tracks 10A, 10B. The arrangement and configuration of the first measurement scale assembly 16A and the second measurement scale assembly 16B are substantially similar to one another and are engaged with the top channel 34 of each of the first track 10 and the second track 10B. Inasmuch as the first measurement scale assembly 16A and the second measurement scale assembly 16B are substantially similar, the following description will relate to the first measurement scale assembly 16A. It should be understood, however, that the description of the first measurement scale assembly 16A applies substantially similarly to the second measurement scale assembly 16B.

Figure 4:
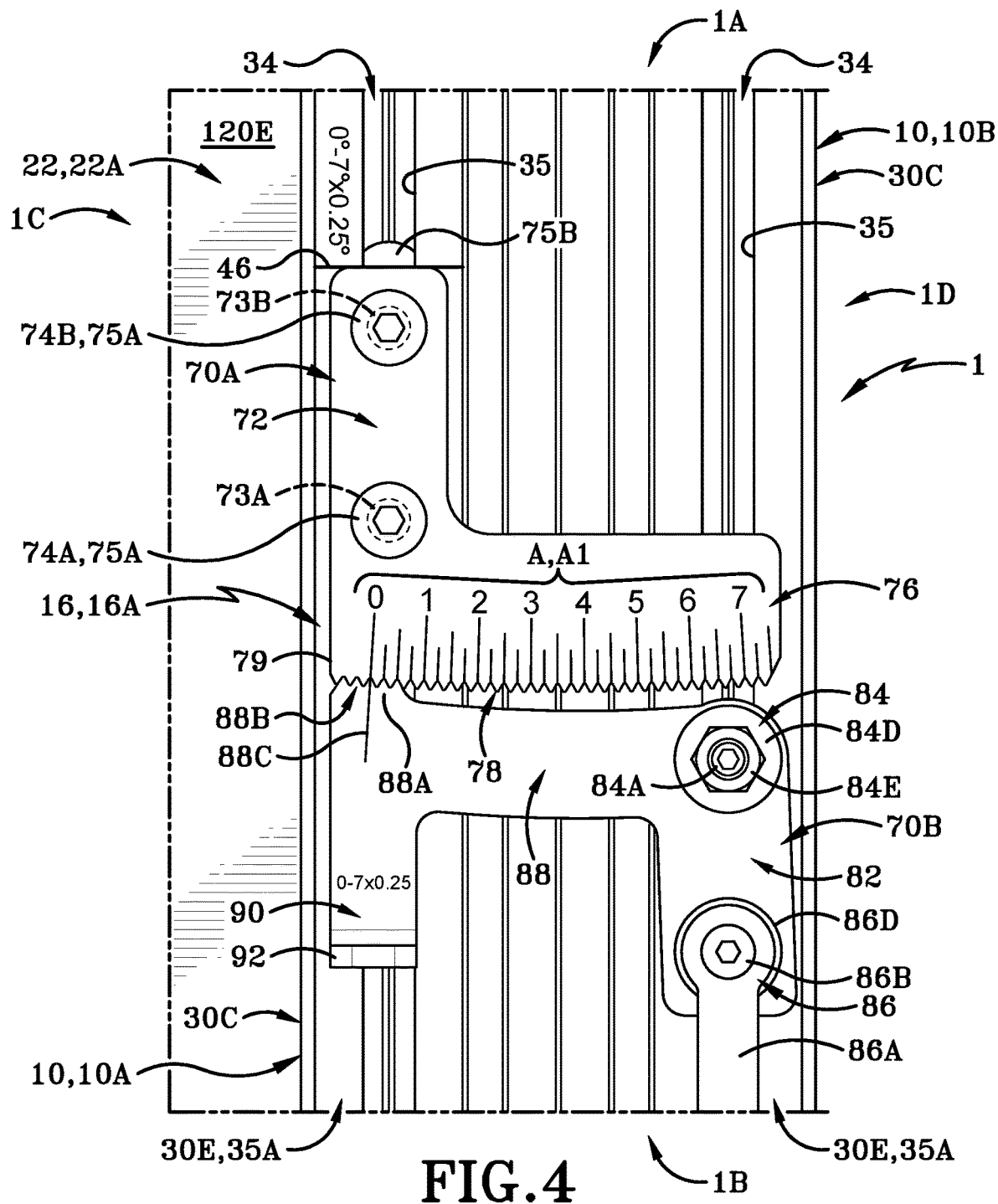
FIG. 4 is a partial top plan view of the taper jig taken in the direction of line 4-4 in FIG. 1, wherein the first measurement scale assembly is shown in FIG. 4.
Figure 6:
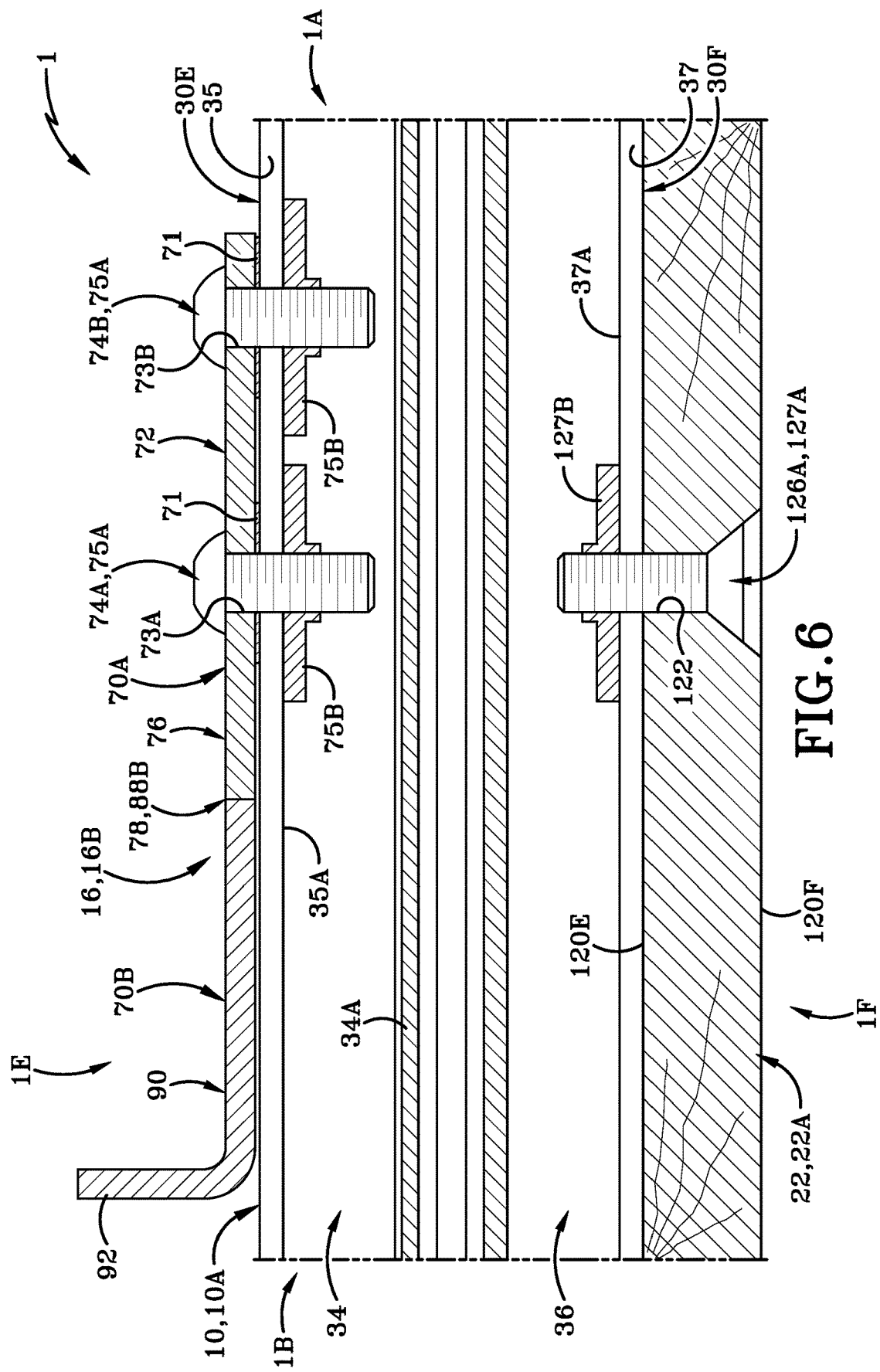
FIG. 6 is a longitudinal cross-section of the taper jig taken in the direction of line 6-6 in FIG. 3.
Figure 7A:
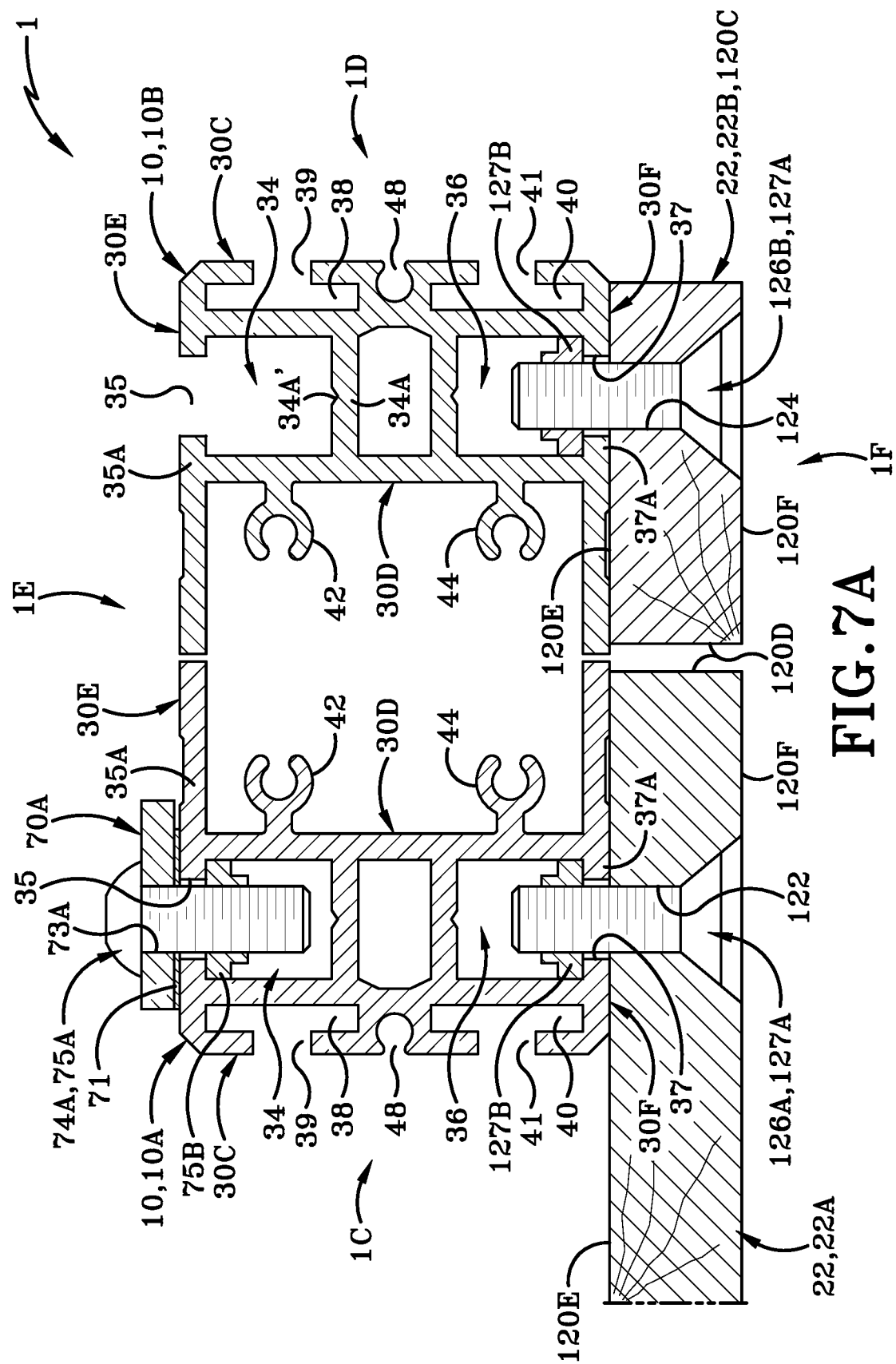
FIG. 7A is a transverse cross-section of the taper jig taken in the direction of line 7A-7A in FIG. 3.

As illustrated in FIGS. 1, 4, and 6, the first measurement scale assembly 16A has an indexer 70A. The indexer 70A includes an attachment portion 72 that defines first and second attachment through-holes 73A, 73B that extend entirely through the attachment portion 72 therein. Referring to FIG. 6, the attachment portion 72 is positioned above the top channel 34 of the first track 10A and abuts the top surface 30E of the first track 10A. The attachment portion 72 also operably engages to the first track 10A via a set of locking mechanisms 74. Each locking mechanism 74 includes a fastener 75A that operably threads to a weld nut 75B. Prior to operably engaging the attachment portion 72 to the first track 10A, a fastener 75A of the locking mechanism 74 is partially threaded to a weld nut 75B for ease of operably threading the fastener 75A to the weld nut 75B and operably engaging the weld nut to the first track 10A. As illustrated in FIGS. 4 and 7A, a first locking mechanism 74A of the set of locking mechanism 74 operably engages a portion of the attachment portion 72 to the first track 10A by having a fastener 75A pass through the first attachment through-hole 73A of the attachment portion 72 and the top slot 35 of the first track 10A. Once inside the top channel 34, the fastener 75A operably threaded to the weld nut 75B directly abuts the upper wall 35A of the first track 10A and operably engages with the first track 10A inside of the top channel 34. Similarly, a second locking mechanism 74B of the set of locking mechanism 74 operably engages a portion of the attachment portion 72 to the first track 10A by having a fastener 75A pass through the second attachment through-hole 73B of the attachment portion 72 and the top slot 35 of the first track 10A. Once inside the top channel 34, the fastener 75A operably threaded to the weld nut 75B directly abuts the upper wall 35A of the first track 10A and operably engages with the first track 10A inside of the top channel 34.

The indexer 70A of the first measurement scale assembly 16A also includes a measurement portion 76 that extends laterally away from the attachment portion 72 in the direction of the transverse axis "Y" and is curvilinear-shaped. As illustrated in FIG. 4, measurement portion 76 defines a set of measurement teeth 78 that is positioned along an outermost edge 79 of the measurement portion 76 opposite to the attachment portion 72. The set of measurement teeth 78 also defines first range of angles "A" that indicates different angles in which one track (e.g., the first track 10A) may pivot away from another track (e.g., the second track 10B). As illustrated in FIG. 4, the set of measurement teeth 78 defines a first set of angles "$A_1$" that indicates different angles in which one track (e.g., the first track 10A) may pivot away from another track (e.g., the second track 10B). In addition, the valley between each tooth in the set of measurement teeth 78 on the indexer 70A defines an angle from the first set of angles "$A_1$." In the illustrated embodiment, the first set of angles "$A_1$" defined by the set of measurement teeth 78 may have a range from about 0 degrees up to about 7.5 degrees in which the valley between each tooth in the set of measurement teeth 78 defines one-quarter angle increments. In other words, the first set of angles "$A_1$" defined by the set of measurement teeth 78 may have a range from about 0 degrees up to about 7.5 degrees in which teeth are arranged in one-quarter degree increments.

As illustrated in FIG. 4, a front edge of the attachment portion 72 that is positioned opposite to the set of measurement teeth 78 on the measurement portion 76 (relative to the longitudinal axis "X") is aligned with the first marked position 46 on first track 10A once the indexer 70A is operably engaged with the first track 10A. The alignment of the front edge of the attachment portion 72 with the first marked position 46 on first track 10A allows a woodworker to make precise angular measurements when one track 10A, 10B is pivoted away from the other track 10A, 10B during a tapered cutting operation. The use of making precise angular measurements during a cutting operation are described in more detail below.

Figure 3:
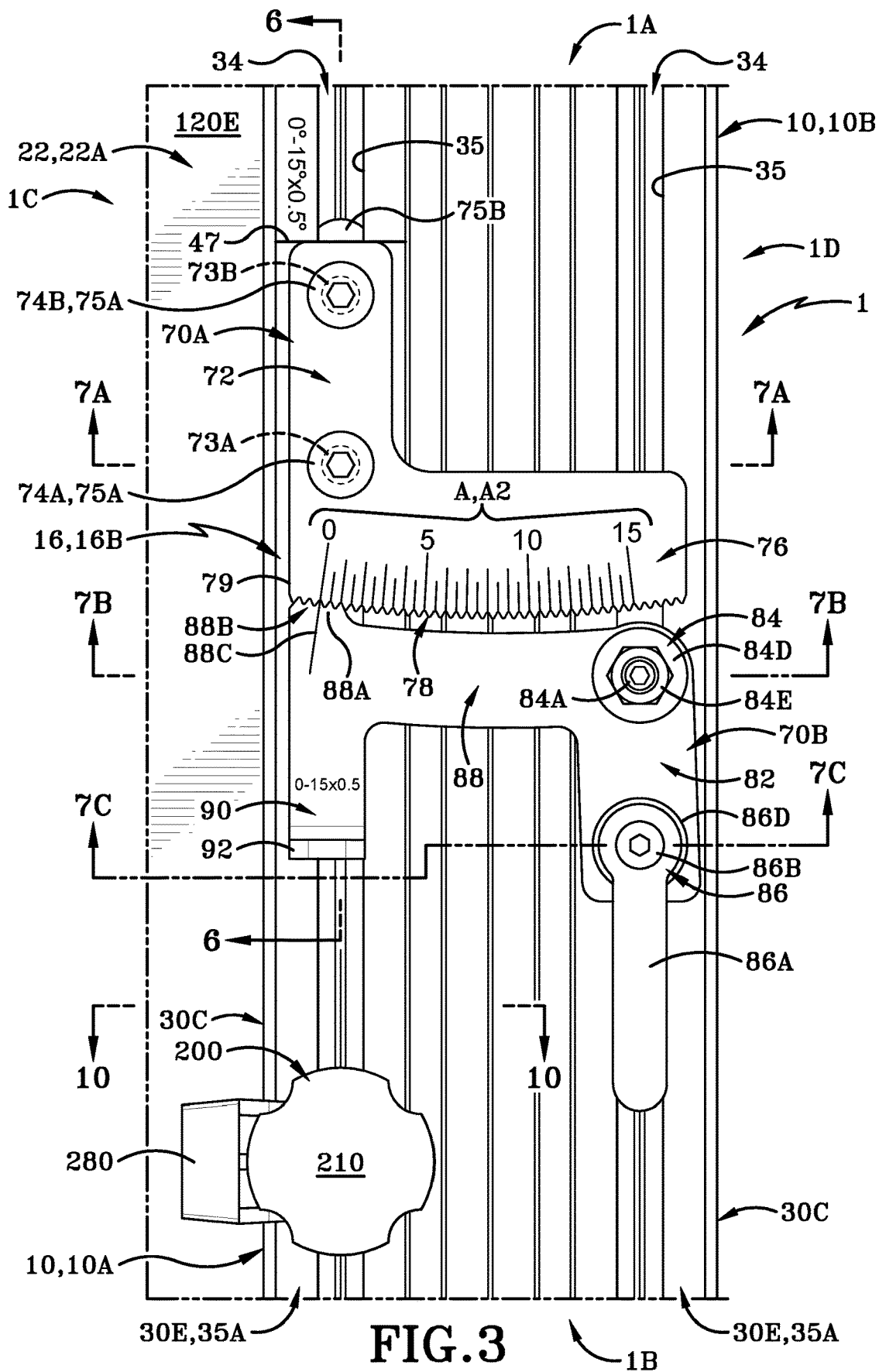
FIG. 3 is a partial top plan view of the taper jig taken in the direction of line 3-3 in FIG. 1, wherein a second measurement scale assembly is shown in FIG. 3.
Figure 3A:
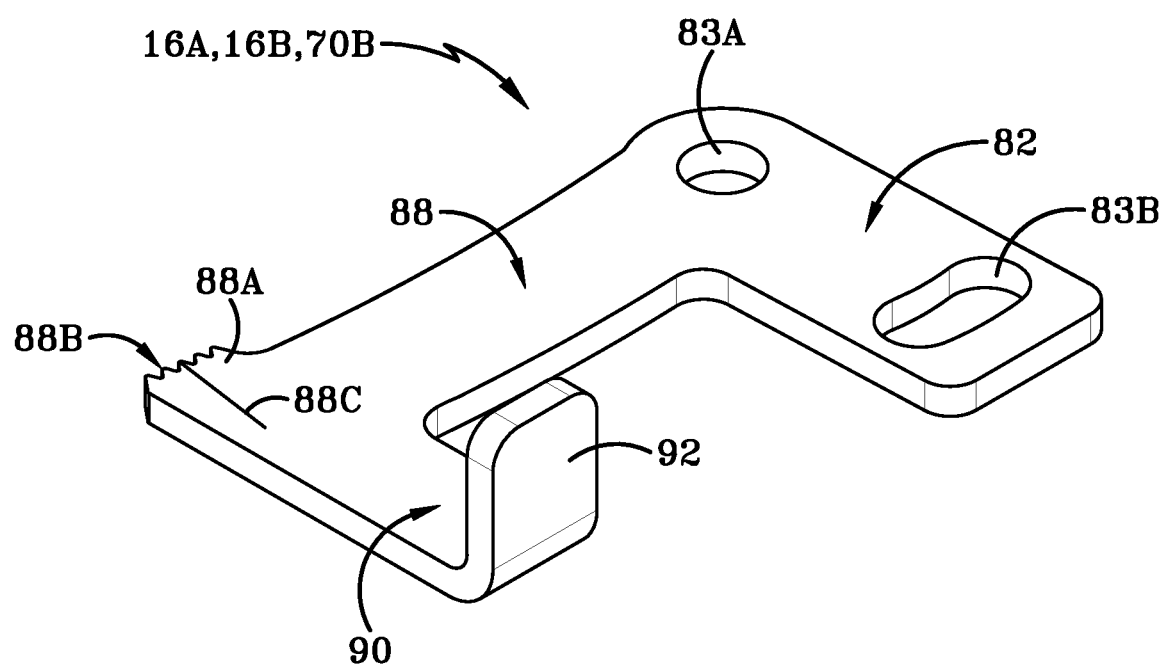
FIG. 3A is a top, rear, left side isometric perspective view of a selector of a first measurement scale.
Figure 7B:
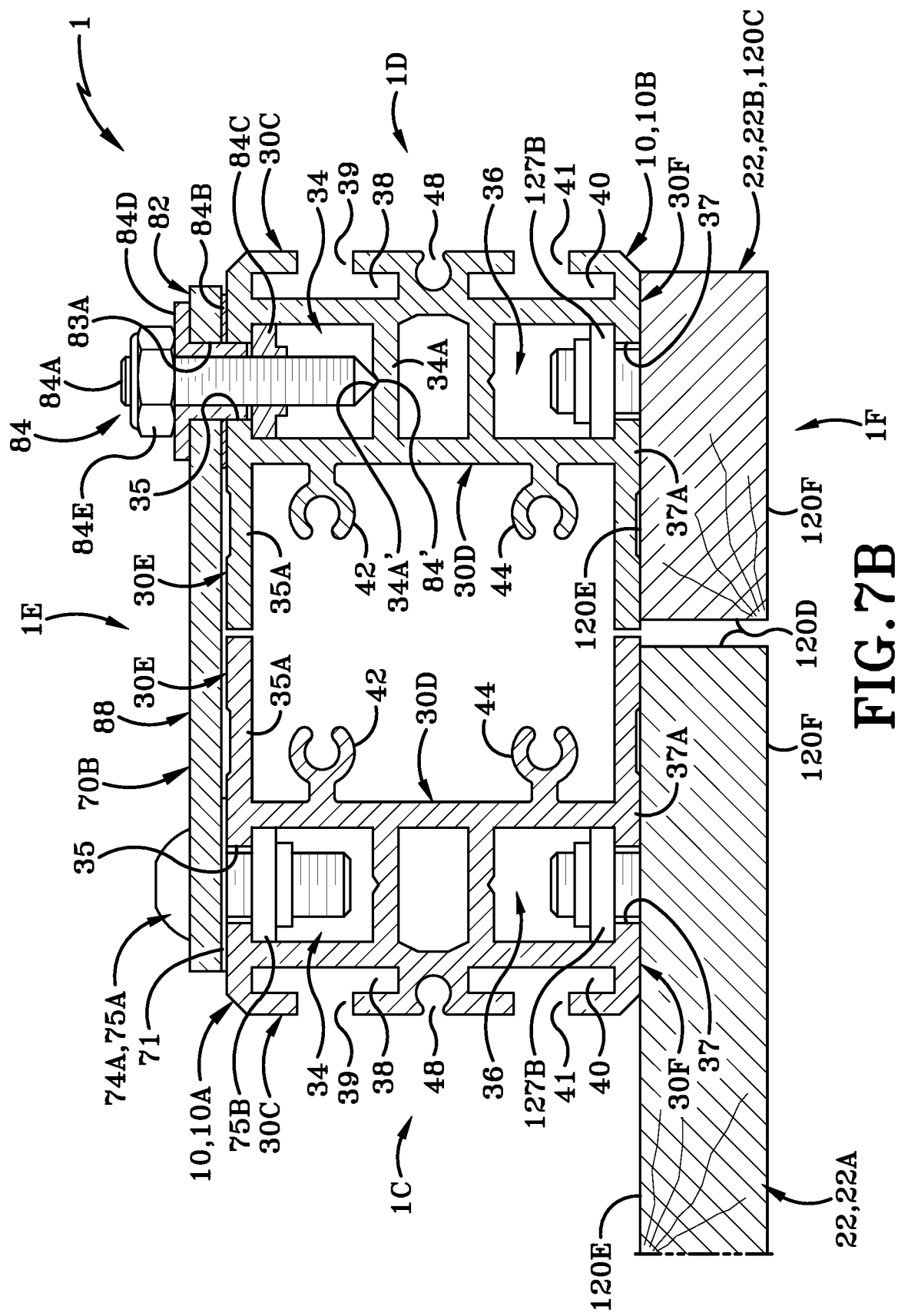
FIG. 7B is a transverse cross-section of the taper jig taken in the direction of line 7B-7B in FIG. 3.

Referring to FIGS. 3A, 4, and 7B, the first measurement scale assembly 16A also includes a selector 70B. The selector 70B of the first measurement scale assembly 16A includes an attachment portion 82 that defines a first attachment through-hole 83A similar to the through-holes 73A, 73B of the indexer 70A. The selector 70B also defines an oblong through-hole 83B that is defined relative to the transverse axis "Y" of the taper jig 1. As illustrated in FIG. 7B, the attachment portion 82 is positioned above the top channel 34 of the second track 10B and abuts the top surface 30E of the second track 10B. Similar to the indexer 70A, the selector 70B operably engages to the second track 10B. However, the selector 70B operably engages to the second track 10B via a pivoting mechanism 84 and an adjusting mechanism 86.

Referring to FIGS. 4 and 7B, the pivoting mechanism 84 includes a fastener 84A where one end of the fastener 84A passes through a washer 84B and operably threads to a weld nut 84C. An opposing end of the fastener 84A also passes through a second washer 84D and operably threads into a lock nut 84E. Prior to operably engaging the attachment portion 82 to the second track 10B, the fastener 84A of the pivoting mechanisms 84 is partially threaded to the weld nut 84C and the lock nut 84E for ease of operably threading the fastener 84A to the weld nut 84C and the lock nut 84E and operably engaging the weld nut 84C and the lock nut 84E to the second track 10B. As illustrated in FIG. 7B, the weld nut 84C of the pivoting mechanism 84 operably engages a portion of the attachment portion 82 to the second track 10B by having the fastener 84A pass through the first attachment through-hole 83A of the attachment portion 82 and the top slot 35 of the second track 10B. The fastener 84A is then operably fastened to the weld nut 84C in which the weld nut 84C directly abuts the upper wall 35A of the second track 10B inside of the top channel 34. In addition, the lock nut 84E of the pivoting mechanism 84 operably engages the same portion of the attachment portion 82 to the second track 10B by having the fastener 84A operably fastened to the lock nut 84E that directly abuts the second track 10B on the attachment portion 82 exterior to the top channel 34 of the second track 10B.

In addition, a terminal tip 84A' of the fastener 84A that is disposed inside of the top channel 34 may operably engage the lower wall 34A of the second track 10B. As illustrated in FIG. 7B, the terminal tip 84A' operably engages the lower wall 34A inside of the groove 34A' once the pivoting mechanism 84 is assembled to the second track 10B. The engagement between the fastener 84A and the lower wall 34A ensures that the pivoting mechanism 84 maintains the selector 70B at the desired location on the second track 10B when the selector 70B is be pivoted about the fastener 84A during use.

As illustrated in FIGS. 4 and 7C, the adjusting mechanism 86 includes an adjustable lever 86A that has a fastener 86B. The fastener 86B passes into a bushing 86C, through a washer 86D, and operably fastens into a weld nut 86E such that the adjusting mechanism 86 is provided on the selector 70B of the first measurement scale assembly 16A. Prior to operably engaging the attachment portion 82 to the second track 10B, the fastener 86B of the adjusting mechanism 86 is partially threaded to the weld nut 86E for ease of operably threading the fastener 86B to the weld nut 86E and operably engaging the weld nut 86E to the second track 10B. As illustrated in FIG. 7C, the weld nut 86E of the adjusting mechanism 86 operably engages a portion of the attachment portion 82 to the second track 10B by having the fastener 86B pass through the oblong through-hole 83B of the attachment portion 82 and the top slot 35 of the second track 10B. The fastener 86B is then operably fastened to the weld nut 86E, via the adjustable lever 86A, in which the weld nut 86E directly abuts the upper wall 35A of the second track 10B inside of the top channel 34.

In addition, the adjustable lever 86A includes a spring-loaded mechanism (not illustrated). In a first engaged position, the adjustable lever 86A is able to tighten and/or loosen the fastener 86B when the spring-loaded mechanism is engaged with the fastener 86B. In a second disengaged position, the adjustable lever 86A is able to freely rotate about the fastener 86B when the spring-loaded mechanism is disengaged from the fastener 86B. The disengagement of the spring-loaded mechanism is performed by woodworker apply a pulling force on the adjustable lever 86A away from the second track 10B relative to the vertical axis "Z" of the taper jig 1. While the illustrated embodiment includes the adjustable lever 86A, any suitable adjustable lever 86A may be used in any particular embodiment.

The selector 70B of the first measurement scale assembly 16A also includes a selector portion 88 that extends laterally away from the attachment portion 82 in the direction of the transverse axis "Y" and is curvilinear shaped. As illustrated in FIG. 4, selector portion 88 defines a protrusion 88A that extends away from the selector portion 88 where the protrusion 88A is positioned opposite to the attachment portion 82. The protrusion 88A includes a set of selector teeth 88B that is positioned along an outermost edge of the protrusion 88A and extend away from the protrusion 88A in the direction of the longitudinal axis "X" of the taper jig 1. In the illustrated embodiment, the set of selector teeth 88B of the selector 70B operably meshes with the set of measurement teeth 78 of the indexer 70A in which the indexer 70A and the selector 70B may interlock with each other at a predetermined angle during a cutting process. Such interlocking between the indexer 70A and the selector 70B is provided in more detail below. In addition, the selector 70B includes a selecting marker 88C provided on the protrusion 88A that allows a woodworker to accurately select a desired angle to position the one track relative to the another track. Such use of the selecting marker 88C during a cutting operation is provided in more detail below.

As illustrated in FIGS. 3A, 4, and 6, the selector 70B of the first measurement scale assembly 16A also includes a handle 90 that extends laterally away from the selector portion 88 in the direction of the longitudinal axis "X" of the taper jig 1. The handle 90 includes a bent portion 92 that extend laterally away from the handle 90 in the direction of the vertical axis "Z" of the taper jig 1. The bent portion 92 allows a woodworker to quickly actuate the selector 80B for selecting a suitable angle from the first set of angle "$A_1$" provided on the indexer 70A. Such use of the bent portion 92 during a cutting operation is provided in more detail below.

While the first and second measurement scale assemblies 16A, 16B are substantially similar as described and illustrated herein, the indexer 70A of the second measurement scale assembly 16B includes a different measurement portion 76 than that of the measurement portion 76 provided on the first measurement scale assembly 16A. As illustrated in FIG. 3, measurement portion 76 of the second measurement scale assembly 16B defines a set of measurement teeth 78 that is positioned along an outermost edge 79 of the measurement portion 76 opposite to the attachment portion 72. The set of measurement teeth 78 also defines a second set of angles "$A_2$" that indicates different angles in which one track (e.g., the first track 10A) may pivot away from another track (e.g., the second track 10B). In addition, the valley between each tooth in the set of measurement teeth 78 on the indexer 70A defines an angle from the second set of angles "$A_2$" In the illustrated embodiment, the second set of angles "$A_2$" defined by the set of measurement teeth 78 may have a range from about 0 degrees up to about 15 degrees in which the valley between each tooth in the set of measurement teeth 78 defines one-half angle increments. In other words, the second set of angles "$A_2$" defined by the set of measurement teeth 78 may have a range from about 0 degrees up to about 15 degrees in which teeth are arranged in one-half degree increments.

In addition, the second measurement scale assembly 16B is also aligned with the second marked position 47 on the first track 10A. As illustrated in FIG. 3, the front edge of the attachment portion 72 of the second measurement scale assembly 16B that opposes the set of measurement teeth 78 on the measurement portion 76 of the second measurement scale assembly 16B is aligned with the second marked position 47 on first track 10A once the indexer 70A is operably engaged with the first track 10A. The alignment of the front edge of the attachment portion 72 with the second marked position 47 on first track 10A allows a woodworker to make precise angular measurements when the first track 10A is pivoted away from the second track 10B during a cutting operation. The use of making precise angular measurements during a cutting operation are described in more detail below.

In addition, a spacer 71 may be positioned between the indexer 70A of the first and second measurement scale assemblies 16A, 16B. As illustrated in FIGS. 6 through 7B, each spacer 71 may operably engage to a bottom surface of the indexer 70A and the top surface 30E of the first track 10A.

Figure 5:
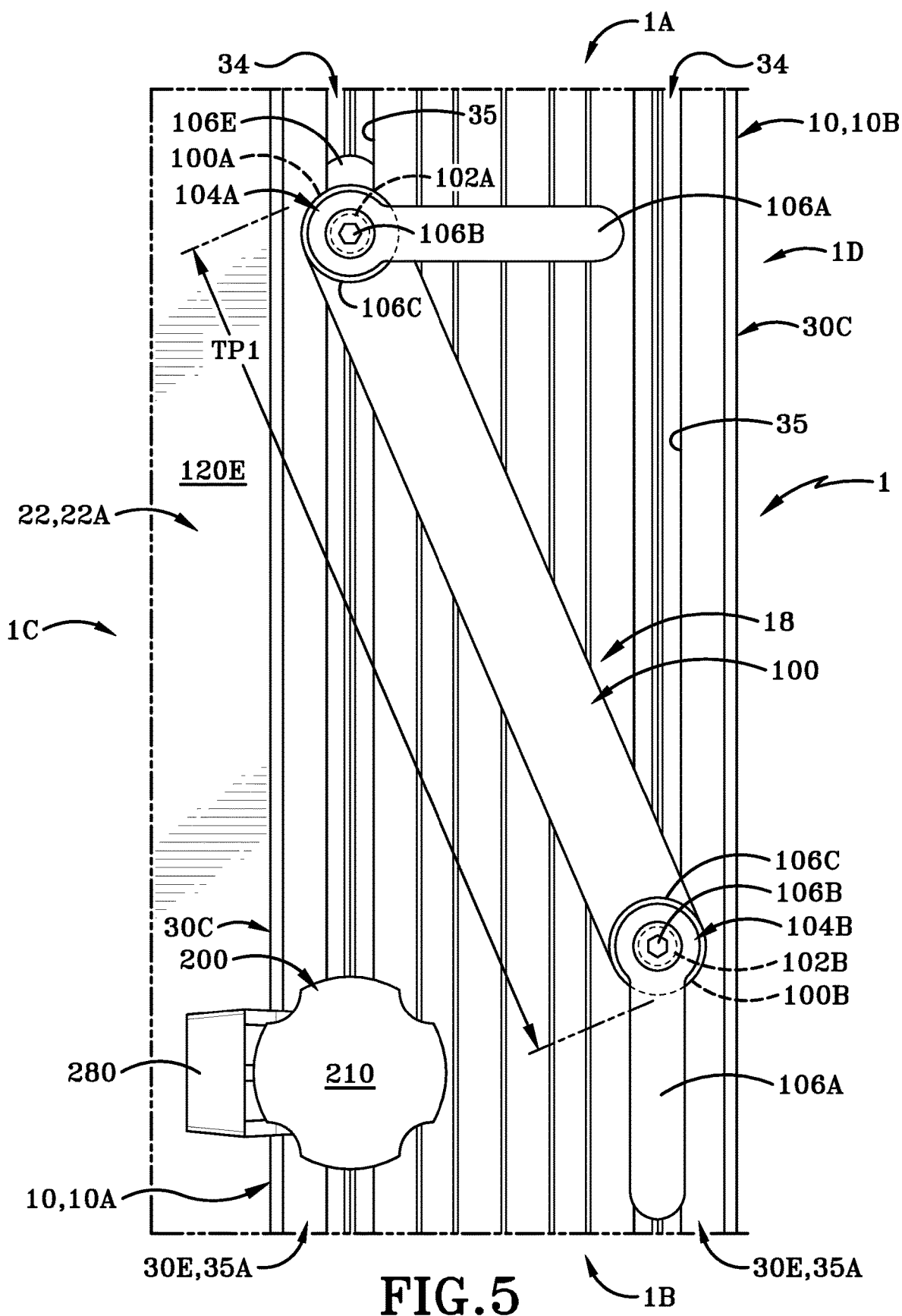
FIG. 5 is a partial top plan view of the taper jig taken in the direction of line 5-5 in FIG. 1, wherein a span clamp and at least one clamping handle assembly are shown in FIG. 5.

As illustrated in FIG. 5, the span clamp assembly 18 includes a plate 100 that has a first end 100A, an opposed second end 100B, and a length TPS that is measured from the first end 100A to the second end 100B. The plate 100 also defines a first aperture 102A proximate the first end 100A of the plate 100 and a second aperture 102B proximate the second end 100B.

The span clamp assembly 18 also includes a first adjusting mechanism 104A and a second adjusting mechanism 104B similar to the adjusting mechanisms 86 provided in the first measurement scale assembly 16A and the second measurement scale assembly 16B. In the illustrated embodiment, the first adjusting mechanism 104A operably engages the plate 100 to the first track 10A such that the first end 100A of the plate 100 is disposed adjacent to the first track 10A. In addition, the second adjusting mechanism 104B operably engages the plate 100 to the second track 10B such that the second end 100B of the plate 100 is disposed adjacent to the second track 10B. Each of the first adjusting mechanism 104A and the second adjusting mechanism 104B includes an adjustable lever 106A that has a fastener 106B. The fastener 106B passes through a bushing 106C, through a washer 106D, and operably fastens into a weld nut 106E such that the plate 100 is operably engaged to the first track 10A and the second track 10B.

Prior to operably engaging the plate 100 to the first track 10A and the second track 10B, the fastener 106B of each of the first adjusting mechanism 104A and the second adjusting mechanism 104B is partially threaded to the weld nut 106E in each of the first adjusting mechanism 104A and the second adjusting mechanism 104B for ease of operably threading the fastener 106B to the weld nut 106E and operably engaging each respective weld nut 106E to the first track 10A and the second track 10B. Referring to FIG. 5, the weld nut 106E of the first adjusting mechanism 104A operably engages the first end 100A of the plate 100 to the first track 10A by having the fastener 106B of the first attachment mechanism 104A pass through the first aperture 102A of the plate 100 and the top slot 35 of the first track 10A. The fastener 106B of the first adjusting mechanism 104A is then operably fastened to the weld nut 106E, via the adjustable lever 106A, in which the weld nut 106E directly abuts the first track 10A inside of the top channel 34. Similarly, the weld nut 106E of the second adjusting mechanism 104B operably engages the second end 100B of the plate 100 to the second track 10B by having the fastener 106B of the second attachment mechanism 104B pass through the second aperture 102B of the plate 100 and the top slot 35 of the second track 10B. The fastener 106B of the second adjusting mechanism 104B is then operably fastened to the weld nut 106E, via the adjustable lever 106A, in which the weld nut 106E directly abuts the second track 10B inside of the top channel 34.

In addition, the span clamp assembly 18 defines a second range of angles (not illustrated) that is different than the first range of angle "A" defined by the at least one measurement scale assembly 16. The second range of angles may provide one track (e.g., the first track 10A) away from another track (e.g., the second track 10B) in which one track may pivot away from another track at an angle defined by the second range of angles. In one exemplary embodiment, the second range of angles of a span clamp assembly may be outside of the first range of angles of at least one measurement scale.

As illustrated in FIGS. 1 and 2, each of the first and second sleds 22A,22B has a front end 120A disposed proximate to the front end 1A of the taper jig 1 and an opposed rear end 120B disposed proximate to the rear end 1B of the taper jig 1. Each of the first and second sleds 22A, 22B also has an outer side 120C disposed proximate to the left side 1C of the taper jig 1 and an opposed inner side 120D disposed proximate to the right side 1D of the taper jig 1. Referring to FIG. 1, the first sled 22A has a first length "$D_1$" that is measured from the front end 120A to the rear end 120B, and the second sled 22B has a second length "$D_2$" that is measured from the front end 120A to the rear end 120B. In the illustrated embodiment, the first length "$D_1$" of the first sled 22A and the second length "$D_2$" of the second sled 22B are equal. Referring to FIG. 2, the first sled 22A has a first width "$W_1$" that is measured from the outer side 120C to the inner side 120D, and the second sled 22B has a second width "$W_2$" that is measured from the front end 120A to the rear end 120B. In the illustrated embodiment, the first width "W₁" of the first sled 22A is greater than the second width "W₂" of the second sled 22B. Each of the first sled 22A and the second sled 22B also has a top surface 120E that extends between the front end 120A to the rear end 120B and an opposed bottom surface 120F that extends between front end 120A to the rear end 120B. Still referring to FIG. 2, the first sled 22A also defines a set of first openings 122 that extends entirely through the first sled 22A from the top surface 120E to the bottom surface 120F and is disposed proximate to the inner side 120D of the first sled 22A. Still referring to FIG. 2, the second sled 22B also defines a set of second openings 124 that extends entirely through the second sled 22B from the top surface 120E to the bottom surface 120F and is disposed proximate to the outer side 120C of the second sled 22B.

Referring to FIG. 2, the first sled 22A and the second sled 22B are operably engaged to the first track 10A and the second track 10B via a first set of locking mechanisms 126A and a second set of locking mechanisms 126B. Each of the first locking mechanism 126A and second locking mechanism 126B includes a fastener 127A that operably threads to a weld nut 127B. Prior to operably engaging the first sled 22A and the second sled 22B to the first track 10A and the second track the fastener 127A in each locking mechanism 126A, 126B is partially threaded to the weld nut 127B in each locking mechanism 126A, 126B. Such partial threading is used to easily operably thread the fastener 127A to the weld nut 127B where the weld nut 127B in each locking mechanism 126A, 126B operably engages to the bottom wall 37A of the first track 10A and the second track 10B inside each bottom channel 36. As illustrated in FIG. 6, each locking mechanism of the first set of locking mechanism 126A operably engages a portion of the first sled 22A to the first track 10A via the fastener 127A in each locking mechanism of the first set of locking mechanism 126A passing through an opening in the set of first openings 122 of the first sled 22A and the bottom slot 37 of the first track 10A. The fastener 127A in each locking mechanism of the first set of locking mechanism 126A then operably fastens to the weld nut 127B so that the weld nut 127B directly abuts the bottom wall 37A of the first track 10A inside of the bottom channel 36 to maintain the position the first sled 22A to the first track 10A. Similarly, each locking mechanism of the second set of locking mechanism 126B operably engages a portion of the second sled 22B to the second track 10B via the fastener 127A in each locking mechanism of the second set of locking mechanism 126B passing through an opening in the set of second openings 124 of the second sled 22B and the bottom slot 37 of the second track 10B. The fastener 127A in each locking mechanism of the second set of locking mechanism 126B then operably fastens to the weld nut 127B so that the weld nut 127B directly abuts the bottom wall 37A of the second track 10B inside of the bottom channel 36 to maintain the position the second sled 22B to the second track 10B.

In the illustrated embodiment, the first and second sleds 22A, 22B may be sacrificial such that the first and second sleds 22A, 22B may be cut into during a cutting operation. As such, the first and second sleds 22A, 22B may be made from a material in which a standard cutting blade on a table saw may be able to cut through during a cutting operation. In one exemplary embodiment, first and second sleds may be made from a wood material. In another exemplary embodiment, first and second sleds may be made of medium-density fiberboard ("MDF"). In another exemplary embodiment, first and second sleds may be made from any suitable material that would preventing harming or damaging a workpiece or a woodworking tool during a cutting operation.

The at least one clamping handle assembly 200 described and illustrated herein may operably engage either the first track 10A or the second track 10B at different predetermined locations on the either the first track 10A or the second tracks 10B. The arrangement and configuration of the at least one clamping handle assembly 200 described and illustrated herein are substantially identical to additional clamping handles that are engageable with the top channel 34 of each of the first track 10 and the second track 10B. Inasmuch as the at least one clamping handle assembly 200 may include additional clamping handles, the following description will relate to a first clamping handle assembly 200A. It should be understood, however, that the description of the first clamping handle assembly 200A applies substantially equally to any and all additional clamping handles 200 that are operably engaged to the first track 10A or the second track 10B.

Figure 8:
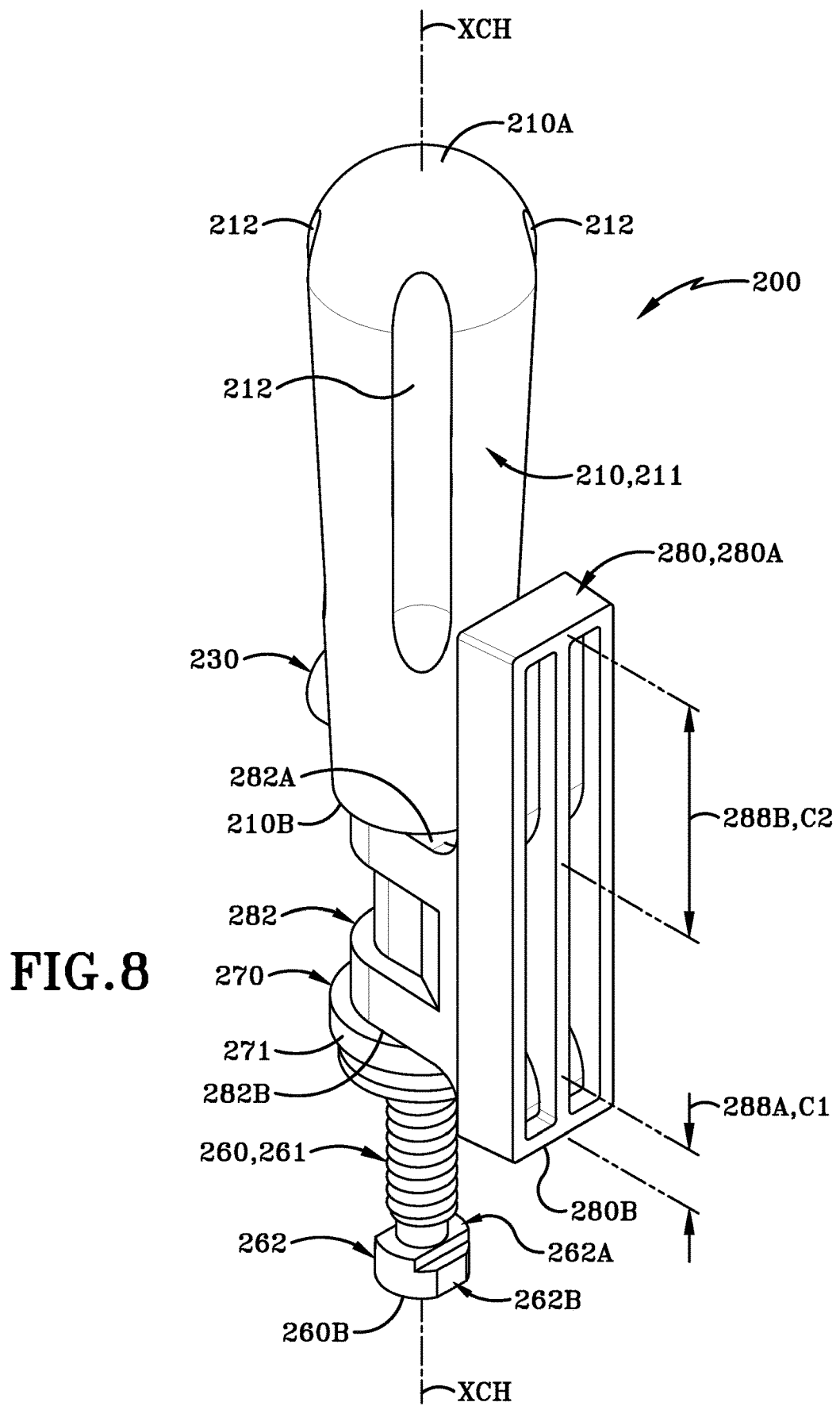
FIG. 8 is a top, front, left side isometric perspective view of at least one clamping handle assembly from the at least one clamping handle assembly shown in FIG. 1.
Figure 9:
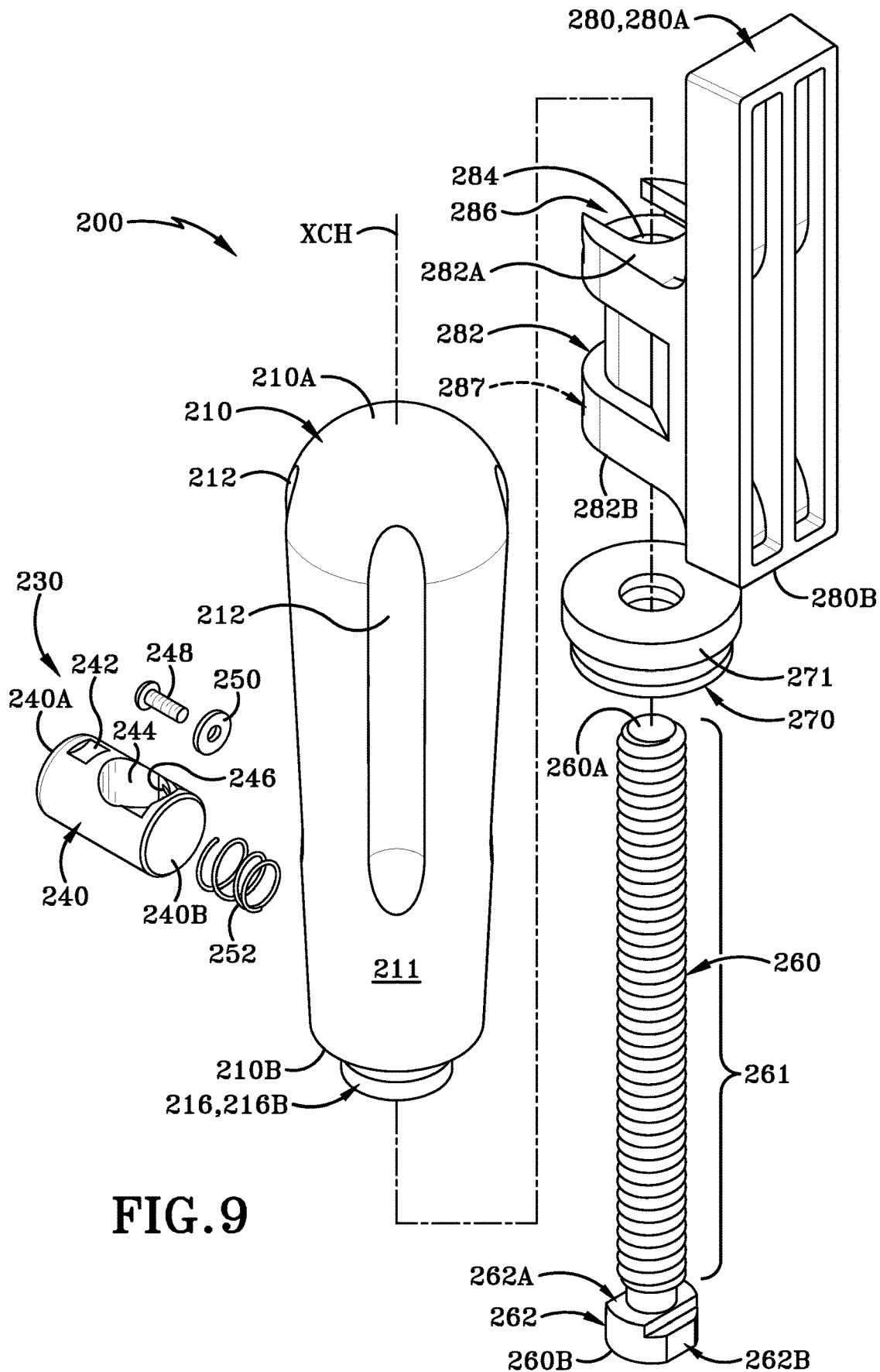
FIG. 9 is an exploded view of the at least one clamping handle assembly in FIG. 8.

Referring to FIGS. 8 and 9, the clamping handle assembly 200A has a handle 210. The handle 210 includes a top end 210A, an opposed bottom end 210B, and a longitudinal axis "$X_{CH}$" that extends between the top end 210A and the bottom end 210B. The handle 210 also includes an exterior surface 211 that extends from the top end 210A to the bottom end 210B. The handle 210 also defines a plurality of indentations 212 between the top end 210A and the bottom end 210B which extends from the exterior surface 211 into the handle 210. The plurality of indentations 212 provides a woodworker with additional gripping surfaces when using or actuating the clamping handle assembly 200A during a cutting operation, which will be described in more detail below.

Figure 11:
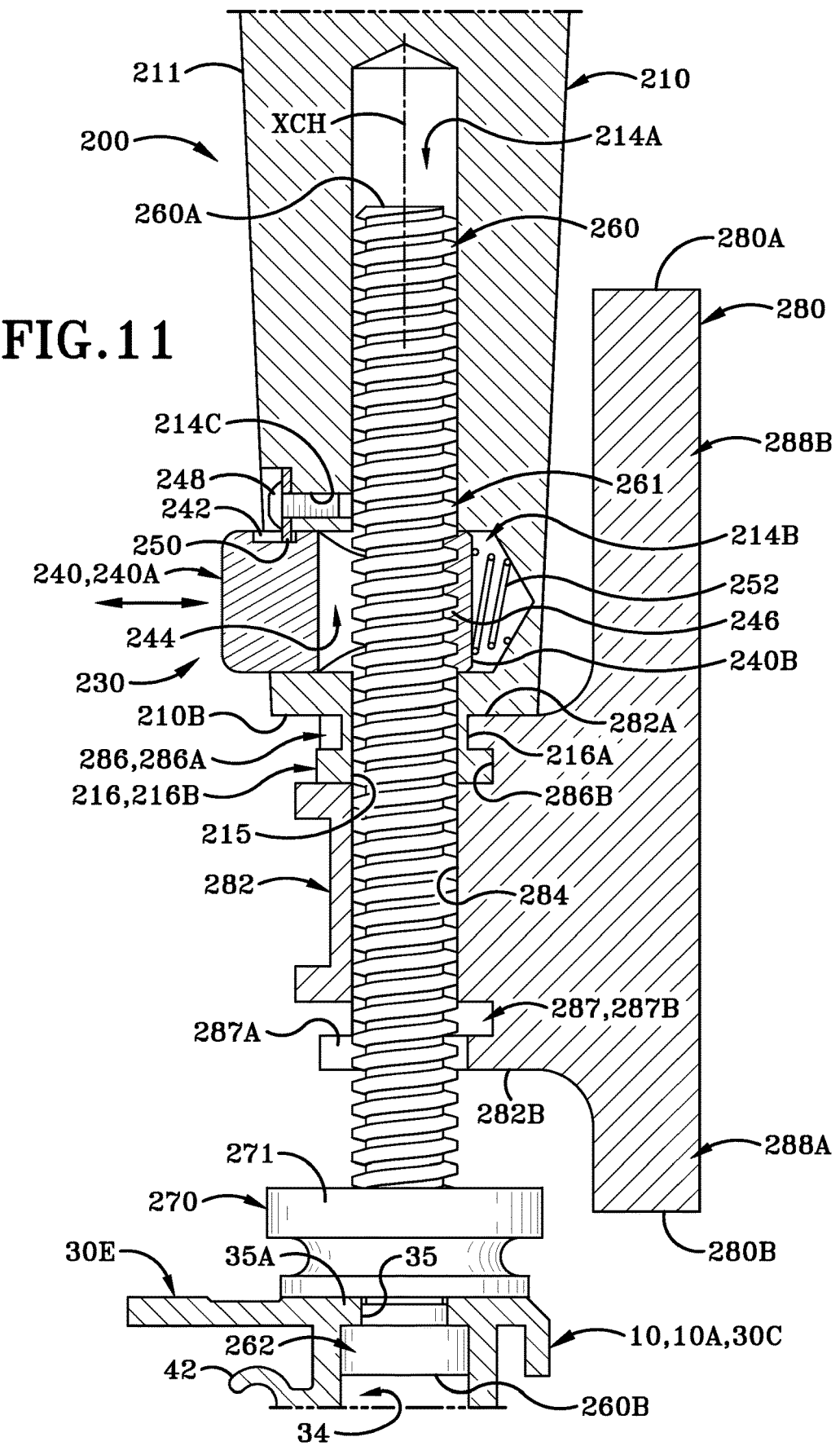
FIG. 11 is a longitudinal cross-section of the at least one clamping handle assembly shown in FIG. 10, wherein a gripping mechanism is moveable between an engaged position and a disengaged position.

Referring to FIG. 11, the handle 210 also defines a first chamber 214A that extends from an opening 215 positioned at the bottom end 210B of the handle 210 towards the top end 210A of the handle 210. The first chamber 214A of the handle 210 is also parallel to the longitudinal axis "$X_{CH}$". The handle 210 also defines a second chamber 214B that is orthogonal to the first chamber 214A and the longitudinal axis "$X_{CH}$". The second chamber 214B is also in fluid communication with the first chamber 214A due to the second chamber 214B intersecting the first chamber 214A proximate to the bottom end 210B of the handle 210. The handle 210 also defines a threaded chamber 214C that is orthogonal to the first chamber 214A and the longitudinal axis "$X_{CH}$". The threaded chamber 214C is defined between the top end 210A and the bottom end 210B and is defined above the second chamber 214B relative to the longitudinal axis "$X_{CH}$" Such use of the threaded chamber 214C is described in more detail below.

Referring to FIGS. 9 and 11, the handle 210 also has an extension 216 that extends downwardly from bottom end 210B and away from the handle 210. The extension 216 defines an annular groove 216A that extends circumferentially into the extension 216. In addition, the extension 216 defines a lip 216B that is disposed adjacent to the annular groove 216A. As illustrated in FIG. 9, the annular groove 216A defines a first outer diameter "$OD_1$" and the lip 216B defines a second outer diameter "$OD_2$" where the second outer diameter "$OD_2$" is greater than the first outer diameter "$OD_1$". Such use of the annular groove 216A and the lip 216B is described in more detail below.

Still referring to FIGS. 9 and 11, the clamping handle assembly 200A also includes a gripping mechanism 230. The gripping mechanism 230 includes a push button 240 that has a first end 240A, an opposed second end 240B, and a longitudinal axis defined between the first end 240A and the second end 240B. The push button 240 defines an indent 242 proximate the first end 240A of the push button 240. The indent 242 also extends into the push button 240 orthogonally to the longitudinal axis of the push button 240. The push button 240 also defines a passageway 244 that extends between the first end 240A and the second end 240B. Such use of the passageway 244 is described in more detail below. The push button 240 also has a threaded wall 246 positioned inside of the passageway 244 in which the threaded wall 246 extends towards the first end 240A. The threaded wall 246 is also described in more detail below.

Still referring to FIGS. 9 and 11, the gripping mechanism 230 includes a pin 248 that is positioned inside of the indent 242 of the push button 240 and operably engaged with the threaded chamber 214C of the handle 210. In addition, a washer 250 is provided with the pin 248 in which the washer 250 is positioned between the head of the pin 248 and the threaded chamber 214C when the gripping mechanism 230 is assembled to the handle 210. The engagement between the pin 248 and the washer 250 with the threaded chamber 214C limits the movement of the gripping mechanism 230, specifically the movement of the push button 240, during actuation. Such movement of the gripping mechanism is provided in more detail below.

Still referring to FIGS. 9 and 11, the gripping mechanism 230 also includes a biaser 252. The biaser is positioned inside of the second chamber 214B and directly abuts the second end 240B of the push button 240 and the handle 210 inside of the second chamber 214B. Such use of the biaser 252 is described in more detail below. In addition, the biaser 252 may be any suitable biaser that provides a biasing means to the push button 240. In one example, the biaser may be a compression spring.

As illustrated in FIG. 11, the gripping mechanism 230 is moveable disposed inside of the second chamber 214B of the handle 210 between an engaged position and a disengaged position. In the engaged position, a portion of the push button 240 measured from the first end 240A towards the second end 240B is positioned outside of the handle 210 and the threaded wall 246 is positioned inside of the first chamber 214A (see FIG. 15B). In addition, the pin 248 and the washer 250 are positioned proximate to the passageway 244 in which the washer 250 in engaged with the push button 240 inside of the indent 242. In the disengaged position, a smaller portion of the push button 240 measured from the first end 240A towards the second end 240B is positioned outside of the handle 210 and the threaded wall 246 is positioned away from the first chamber 214A (see FIG. 15A). In addition, the pin 248 and the washer 250 are positioned proximate to the first end 240A in which the washer 250 in disengaged from the push button 240 inside of the indent 242. In the illustrated embodiment, the gripping mechanism 230 is biased towards the engaged position via the biaser 252 creating a biasing mechanism. The gripping mechanism 230 may be actuated to the disengaged position via a pushing force being exerted on the gripping mechanism 230 via a woodworker using the clamping handle assembly 200A during a cutting operation. Such engaged position and disengaged position of the gripping mechanism 230 is described in more detail below.

Referring to FIGS. 9 and 11, the clamping handle assembly 200A also includes a threaded shaft 260 that has a top end 260A, an opposed bottom end 260B, and a longitudinal direction that extends between the top end 260A and the bottom end 260B. The threaded shaft 260 includes a threaded portion 261 and a bolt head 262. The threaded portion 261 extends from the top end 260A to the bolt head 262. As described in more detail herein, the threaded portion 261 operably engages with the threaded chamber 246 when the push button 230 is provided in an engaged position.

During use, a portion of the threaded portion 261 measured between the top end 260A and the bolt head 262 operably engages with the gripping mechanism 230 inside of the handle 210 when the gripping mechanism 230 is provided in the engaged position. As such, the threaded shaft 260 may be maintained and/or fixed at any suitable location between the top end 260A and the bottom end 260B of the threaded shaft 260 via the gripping mechanism 230. In addition, the threaded shaft 260 may also be releasably attached to the gripping mechanism 230 in the engaged position where a woodworker may apply a rotational force on the handle 210 to move the handle 210 upwardly or downwardly on the threaded shaft 260 relative to the longitudinal axis "$X_{CH}$". Moreover, the threaded shaft 260 may be freely moveable inside of the first chamber 214A of the handle 210 when the gripping mechanism 230 is actuated to the disengaged position via a pushing force exerted by the woodworker against the gripping mechanism 230.

Figure 10:
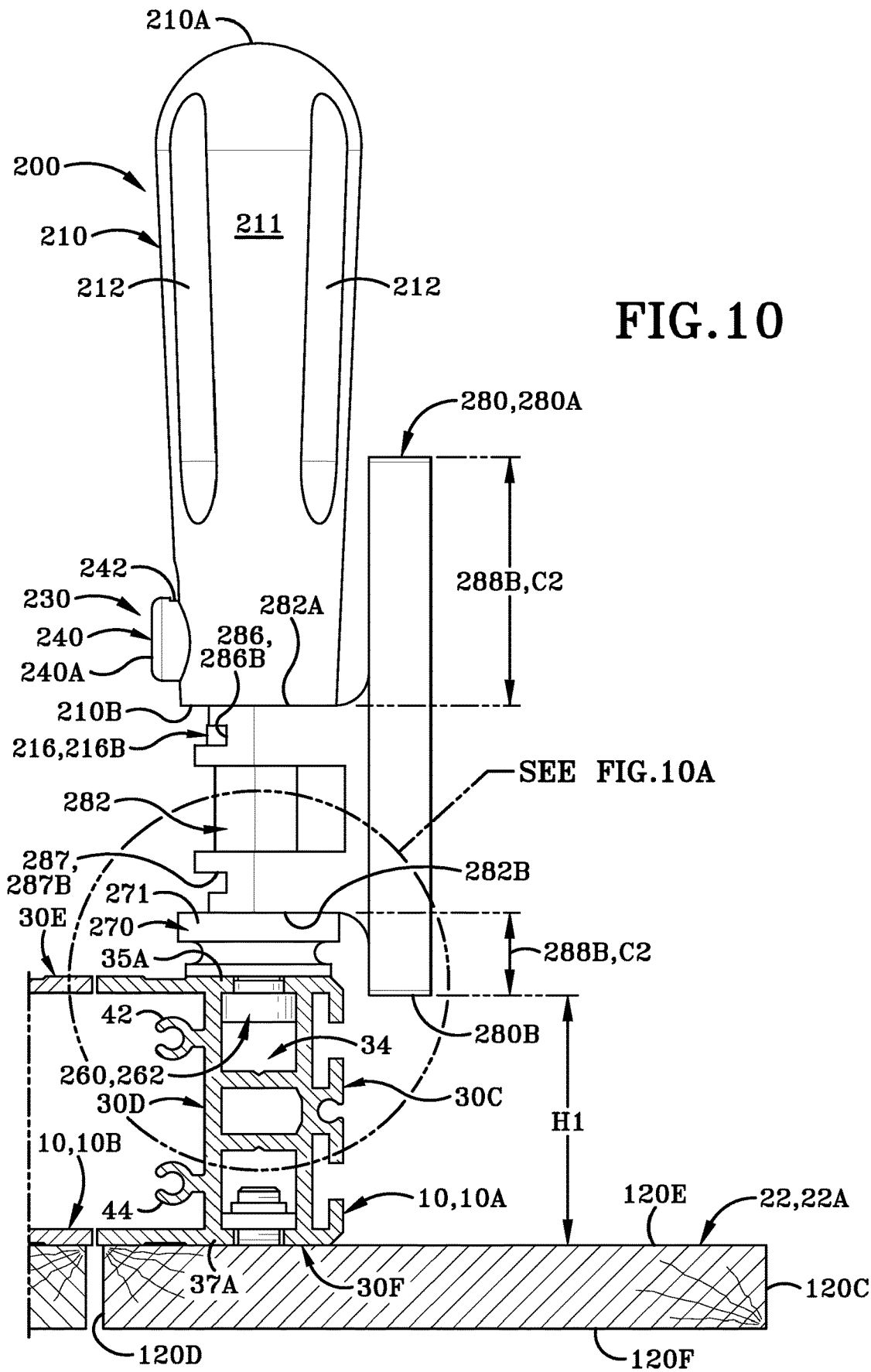
FIG. 10 is a partial transverse cross-section of the taper jig taken in the direction of line 10-10 in FIG. 3.
Figure 10A:
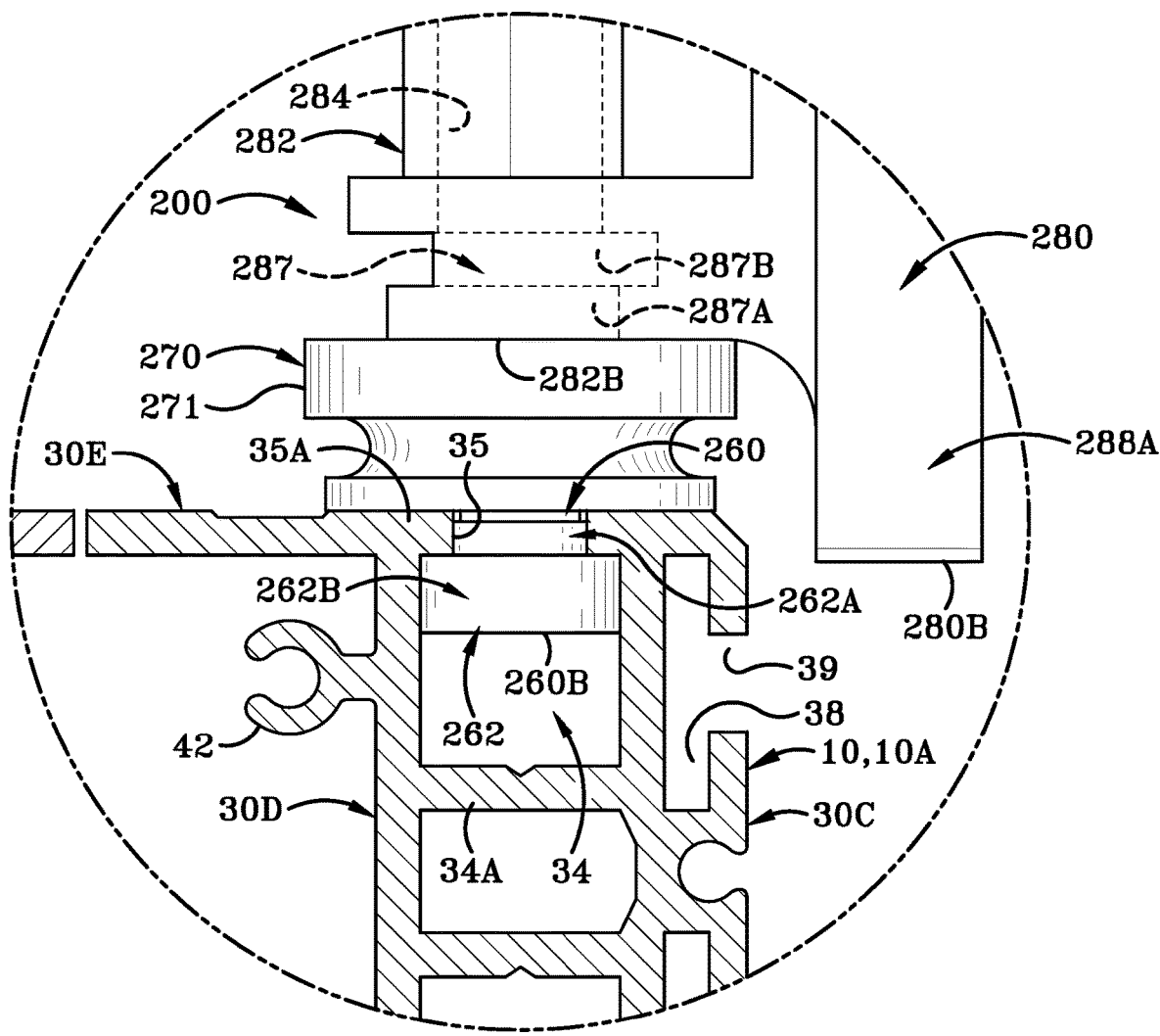
FIG. 10A is an enlargement of the highlighted region in FIG. 10.

The threaded shaft 260 also includes the bolt head 262 that is disposed between the threaded portion 261 and the bottom end 260B of the threaded shaft 260. As illustrated in FIG. 9, the bolt head 262 has a first portion 262A that extends from the threaded portion 261 towards the bottom end 260B of the threaded shaft 260. Still referring to FIG. 9, the bolt head 262 also has a second portion 262B that extends from first portion 262A to the bottom end 260B of the threaded shaft 260. As illustrated in FIG. 10, the bolt head 262 is sized and configured to be received by the top channel 34 of either the first track 10A or the second track 10B to allow the handle 210 to be operably engaged with the first track 10A or the second track 10B. Still referring to FIG. 10, the first portion 262A of the bolt head 262 operably engages with the upper wall 35A of the first track 10A, and the second portion 262B of the bolt head operably engages the upper wall 35A and a pair of side walls inside of the top channel 34. Such engagement between the bolt head 262 and the first track 10A prevent rotation of the threaded shaft 260 once the threaded shaft 260 is provided with the first track 10A or the second track 10B.

Still referring to FIGS. 9 and 11, the clamping handle assembly 200 also includes a threaded nut 270. The threaded nut 270 operably engages with the threaded shaft 260 such that the threaded nut 270 is releasably attachable to the threaded shaft 260. As illustrated in FIG. 10, the threaded nut 270 directly abuts the top surface 30E and the upper wall 35A of either the first track 10A or the second track 10B to allow the handle 210 to be maintained at a desired location on the first track 10A or the second track 10B. In addition, the threaded nut 270 may have an outer knurled surface 271 that allows a woodworker to suitably grip the threaded nut 270 when tightening or loosening the threaded nut 270 to the threaded shaft 260.

Still referring to FIGS. 9 and 11, the clamping handle assembly 200 also includes a clamp block 280. The clamp block 280 includes a top end 280A, an opposed bottom 280B, and a longitudinal direction that extends between the top end 280A and the bottom end 280B. As illustrated in FIG. 10, the clamp block 280 includes a support member 282 that has a first end or top end 282A proximate to the top end 280A of the clamp block 280 and an opposed second end or bottom end 282B proximate to the bottom end 280B of the clamp block 280. The clamp block 280 also defines a central passageway 284 in the support member 282 that extends from the top end 282A to the bottom end 282B in the longitudinal direction of the clamp block 280. The central passageway 284 is sized and configured to receive and house a portion of the threaded shaft 260 when the clamp block 280 is provided on the threaded shaft 260 during a cutting operation, which is described in more detail below.

In addition, the support member 282 defines a first slot 286 at the top end 282A of the support member 282 and a second slot 287 at the bottom end 280B of the clamp block 280. The first slot 286 and second slot 287 also define a generally T-shape configuration and extend laterally into the support member 282 orthogonal to the longitudinal direction of the clamp block 280. In the illustrated embodiment, the first slot 286 defines a first section 286A proximate the top end 282A of the support member 282 and a second section 286B adjacent to the first section 286A in which the first section 286A and the second section 286B are arranged side-by-side on the support member 282 and are in fluid communication with each other. In addition, the first section 286A defines a first diameter and the second section 286B defines a second diameter that is greater than the first diameter. Similarly, the second slot 287 defines a first section 287A proximate the bottom end 282B of the support member 282 and a second section 287B adjacent to the first section 287A in which the first section 287A and the second section 287B are arranged side-by-side on the support member 282 and are in fluid communication with each other. In addition, the first section 287A defines a first diameter and the second section 287B defines a second diameter that is greater than the first diameter.

In the illustrated embodiment, the first slot 286 and the second slot 287 face one another on the support member 282 relative to the longitudinal direction of the clamp block 280. The first slot 286 and second slot 287 also define a T-shape configuration and extend laterally into the support member 282 substantially perpendicularly to the longitudinal direction of the clamp block 280. In the illustrated embodiment, each of the first slot 286 and the second slot 287 is sized and configured to receive the extension 216 in which the clamp block 280 operably engages with the handle 210. Such engagement between the clamp block 280 and the handle 210 allows the clamp block 280 to be reversible in a first orientation and a second orientation.

Figure 12A:
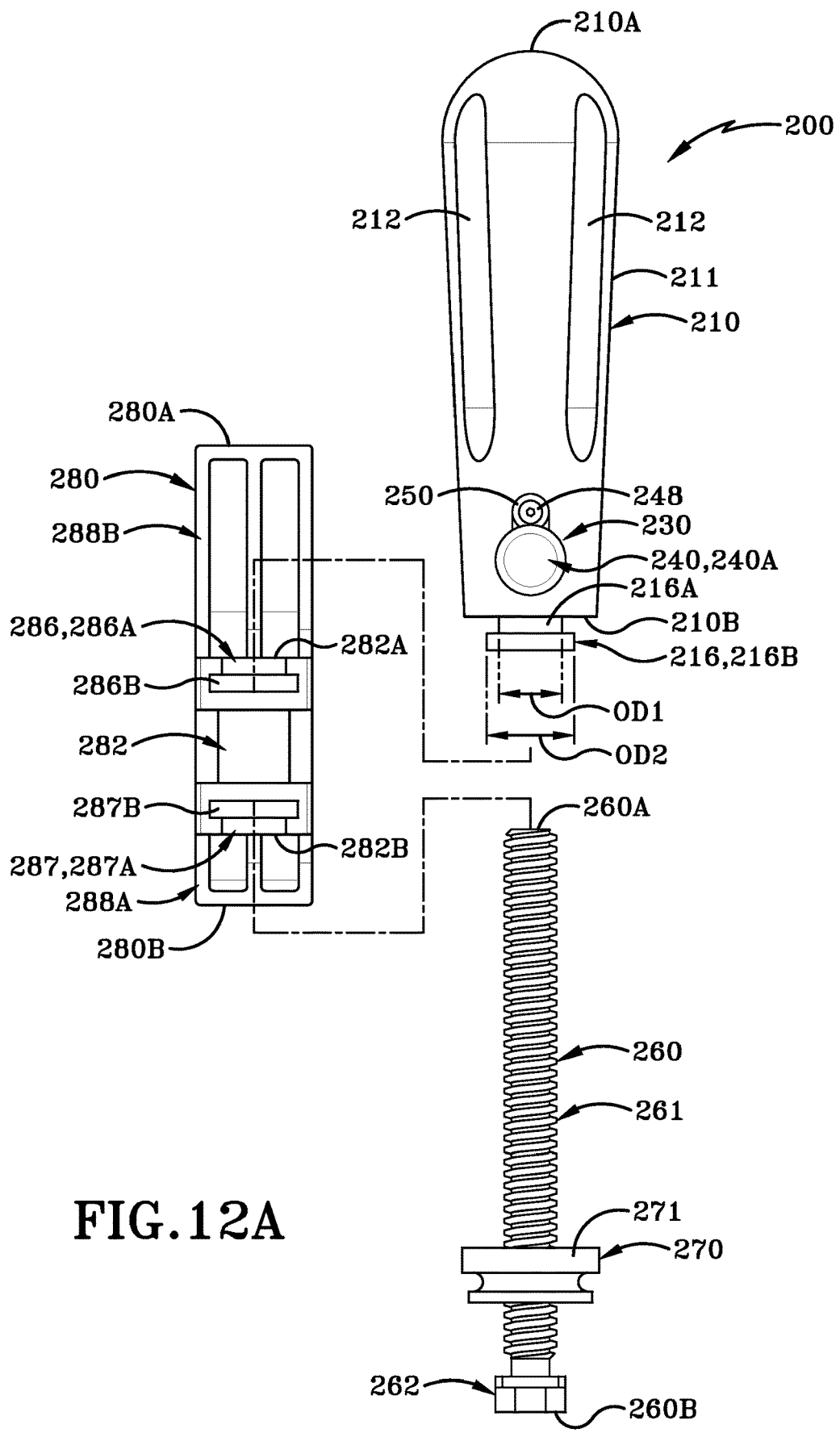
FIG. 12A is an exploded view of the at least one clamping handle assembly in FIG. 8, wherein a clamp block is oriented in a first orientation.

As illustrated in FIG. 12A, the clamp block 280 is provided in the first orientation relative to the handle 210. In the illustrated embodiment, the first section 286A of the first slot 286 is sized and configured to receive and house the annular groove 216A of the extension 216. In addition, the second section 286B of the first slot 286 is sized and configured to receive and house the lip 216B of the extension 216. Such engagement between the first slot 286 and the extension 216 allows the clamp block 280 to operably engage with the handle 210. In other words, the clamp block 280 interlockingly engages with the handle 210. Moreover, the second slot 287 is positioned away from the handle 210 in the first orientation. Furthermore, the threaded shaft 260 may be feed through the central passageway 284 of the clamp block 280 to collectively operably engage the handle 210 and the clamp block 280 to the threaded shaft 260.

Figure 12B:
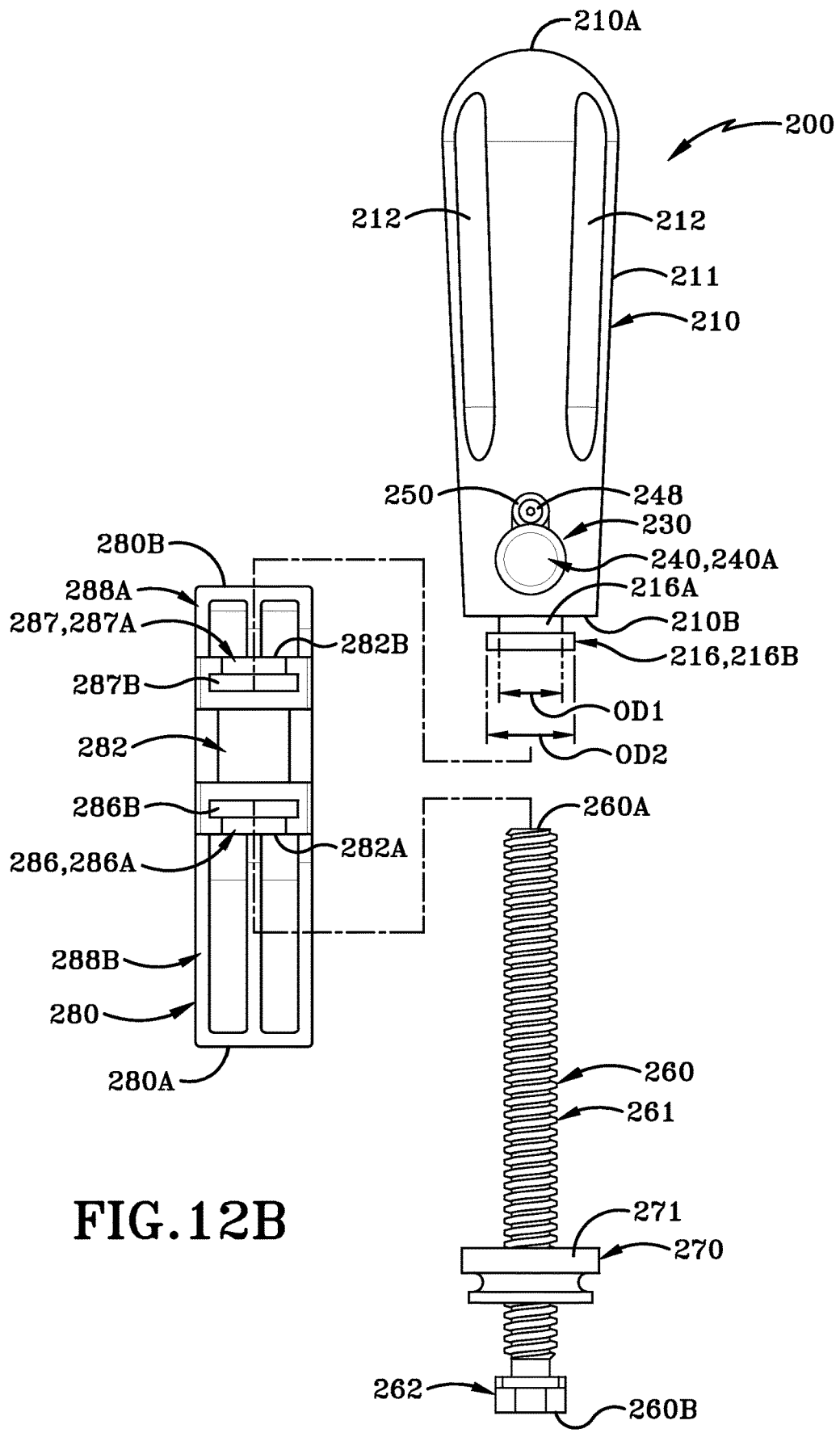
FIG. 12B is an exploded view of the at least one clamping handle assembly in FIG. 8, wherein the clamp block is orientated in a second orientation.

As illustrated in FIG. 12B, the clamp block 280 is provided in the second orientation relative to the handle 210. In the illustrated embodiment, the first section 287A of the second slot 287 is sized and configured to receive and house the annular groove 216A of the extension 216. In addition, the second section 287B of the second slot 287 is sized and configured to receive and house the lip 216B of the extension 216. Such engagement between the second slot 287 and the extension 216 allows the clamp block 280 to operably engage with the handle 210. In other words, the clamp block 280 interlockingly engages with the handle 210. Moreover, the first slot 286 is positioned away from the handle 210 in the second orientation. Furthermore, the threaded shaft 260 may be feed through the central passageway 284 of the clamp block 280 to collectively operably engage the handle 210 and the clamp block 280 to the threaded shaft 260.

Referring to FIGS. 8-11, the clamp block 280 also includes a first holding portion 288A and a second holding portion 288B. In the illustrated embodiment, the first holding portion 288A extends downwardly from the bottom end 282B of the support member 282 to the bottom end 280B of the clamp block 280 parallel to the longitudinal direction of the clamp block 280. The second holding portion 288B extends upwardly from the top end 282A of the support member 282 to the top end 280A of the clamp block 280 parallel to the longitudinal direction of the clamp block 280. As shown in FIG. 10, the first holding portion 288A defines a first length "$C_1$" that extends from the bottom end 282B of the support member 282 to the bottom end 280B of the clamp block 280. The second holding portion 288B defines a second length "$C_2$" that extends from the top end 282A of the support member 282 to the top end 280A of the clamp block 280. In the illustrated embodiment, the second length "$C_2$" is greater than the first length "$C_1$".

The clamp block 280 may be provided in the first orientation or in the second orientation as determined by the woodworker based on any suitable variation, such as the size, shape, and configuration of a workpiece being maintained by a clamping handle.

As illustrated in FIG. 10, the clamp block 280 is provided in the first orientation where the first holding portion 288A is adjacent to the threaded shaft 260 and disposed proximate to the bolt head 262. In addition, the second holding portion 288B is adjacent to the handle 210 and disposed away from the bolt head 262 of the threaded shaft 260. Referring to FIG. 10, the first holding portion 288A defines a first height "$H_1$" from the bottom end 280B of the clamp block 280 to the bottom surface 32F of the first track 10A and/or the second track 10B. In one exemplary embodiment, a first height may have a range from about 1½ inches up to about 3½ inches.

Figure 15A:
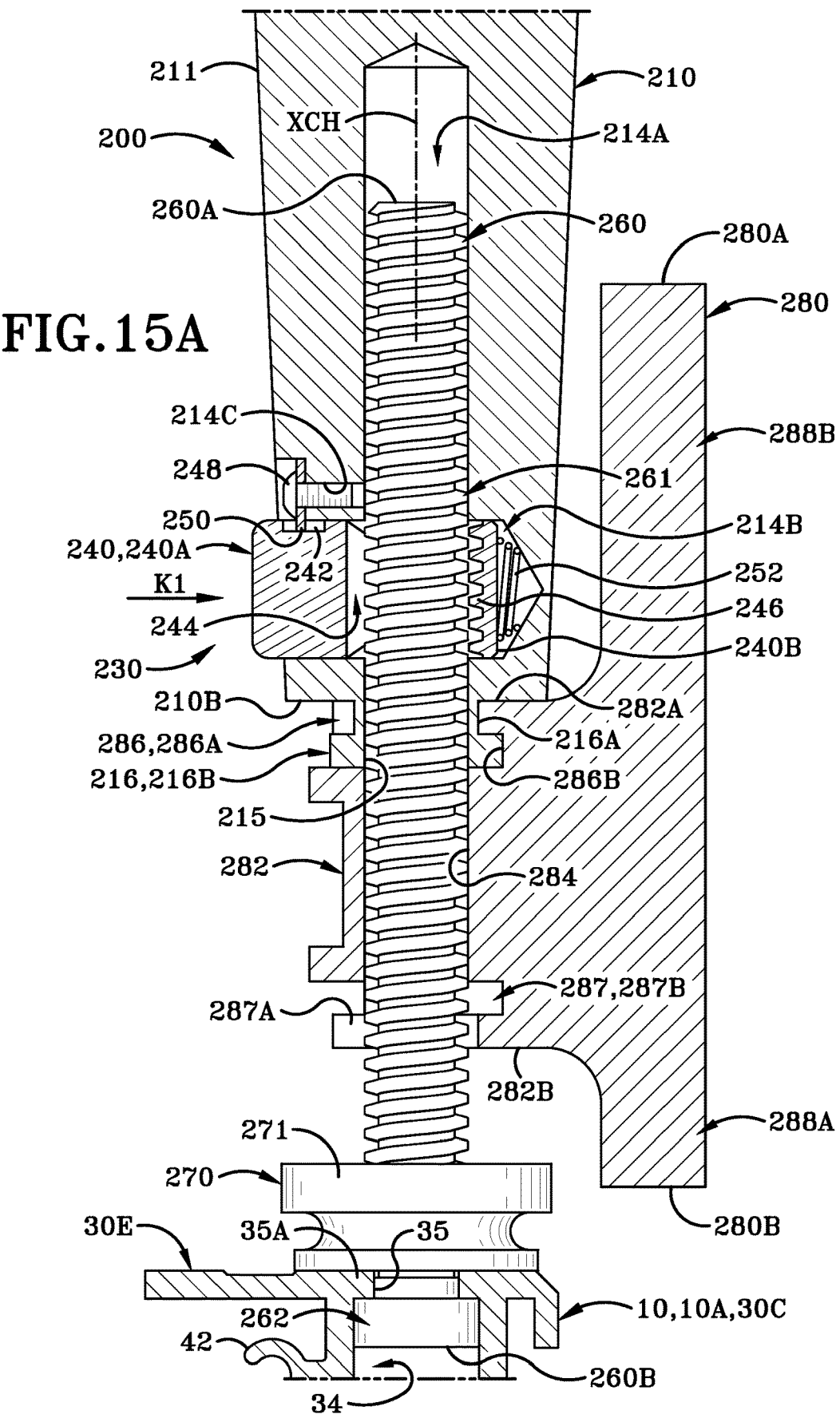
FIG. 15A is a longitudinal cross-section of the at least one clamping handle assembly in FIG. 10, wherein a gripping mechanism is actuated from the engaged position to the disengaged position.
Figure 15B:
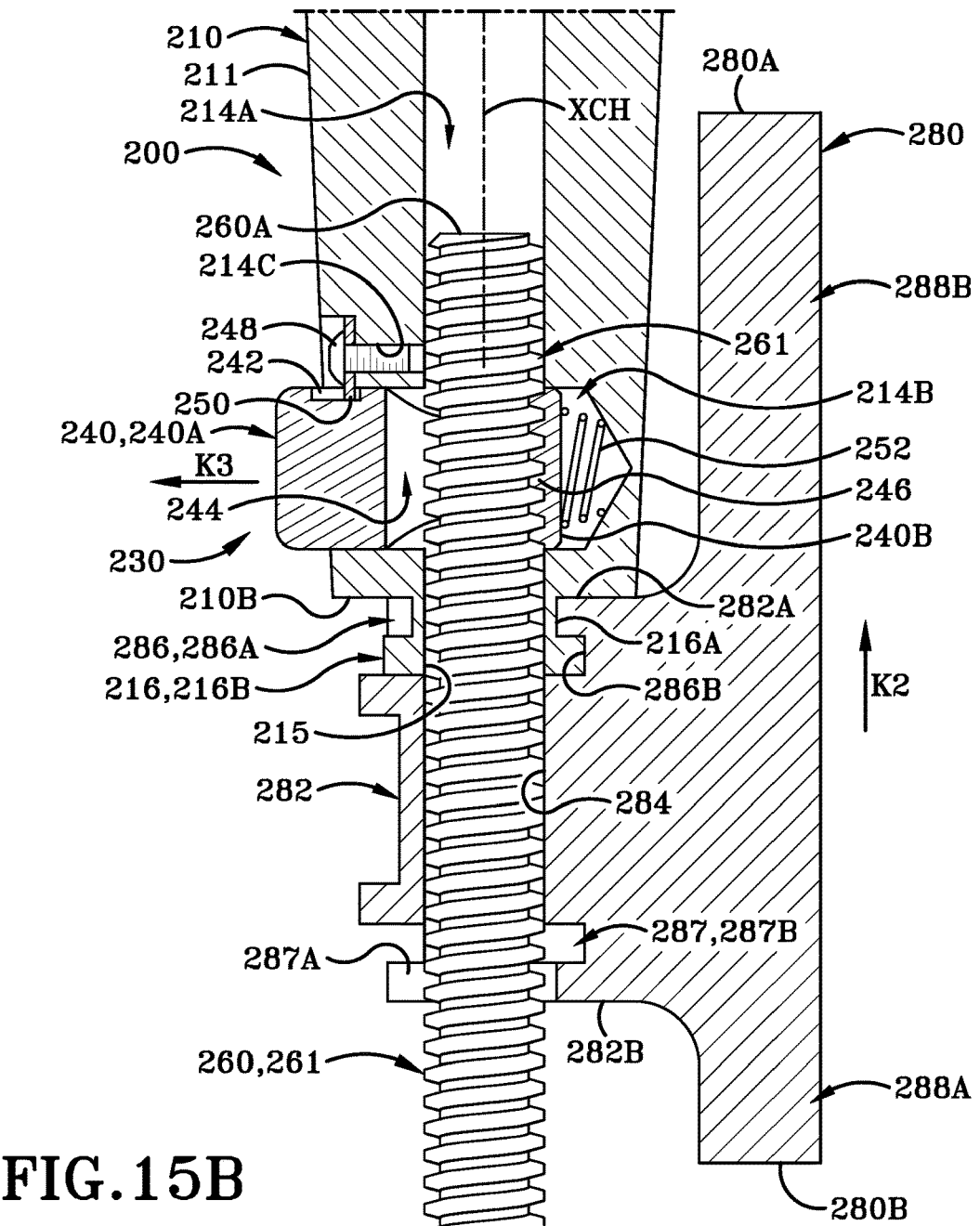
FIG. 15B is a longitudinal cross-section of the at least one clamping handle assembly in FIG. 10, wherein a gripping mechanism is actuated from the disengaged position to the engaged position.
Figure 15B:
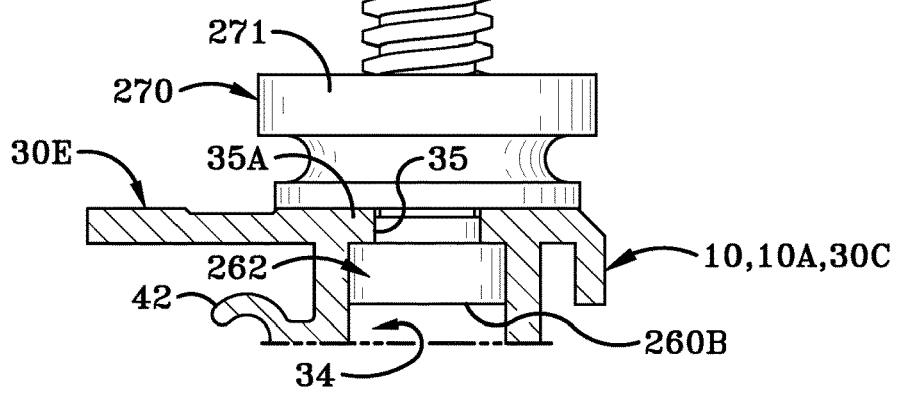
Figure 15C:
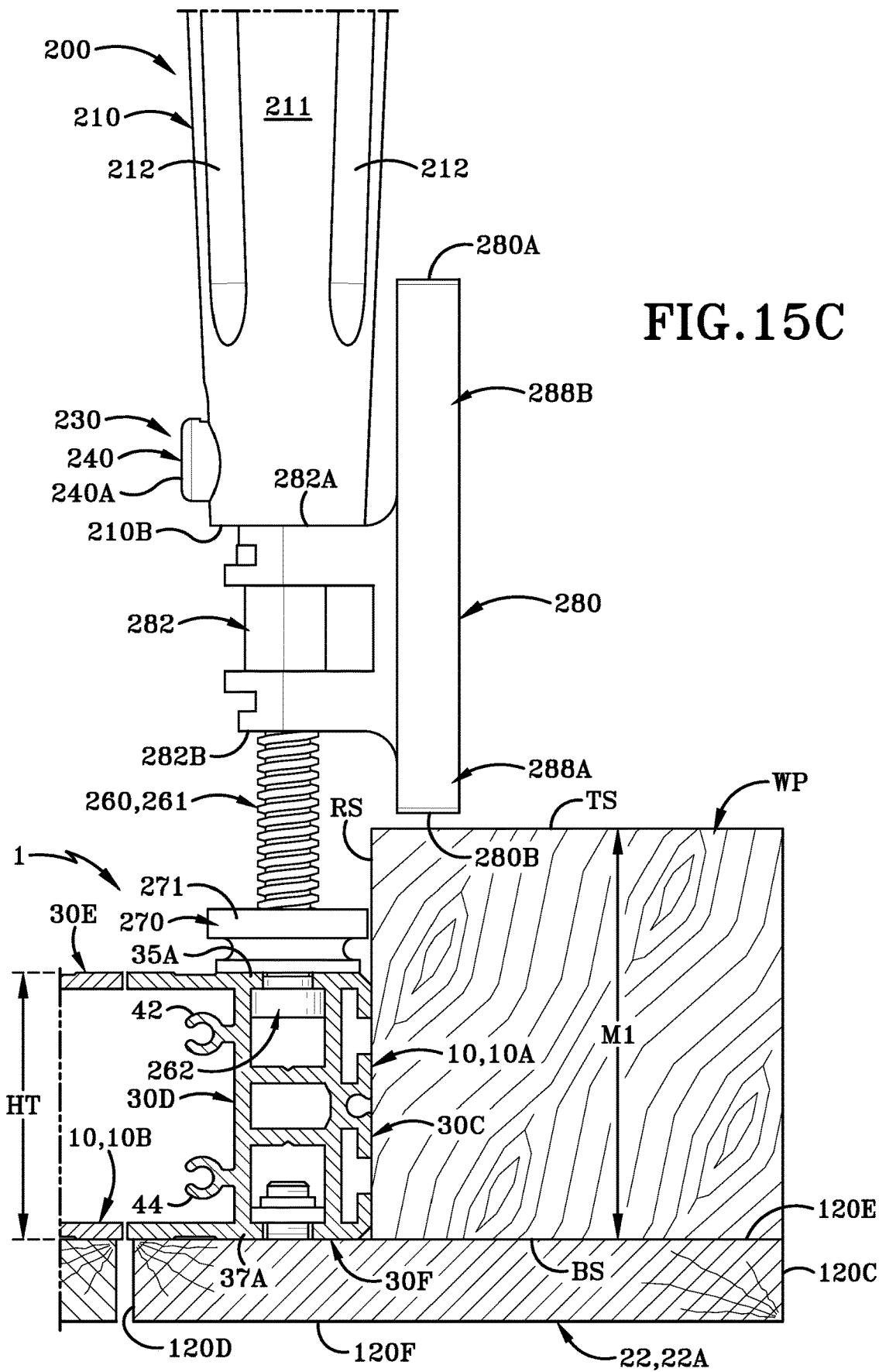
FIG. 15C is a partial front elevation view of the at least one clamping handle assembly operably engaged to the taper jig, wherein the clamp block of the at least one clamping handle assembly is oriented in the first orientation and is disengaged from a workpiece.
Figure 15D:
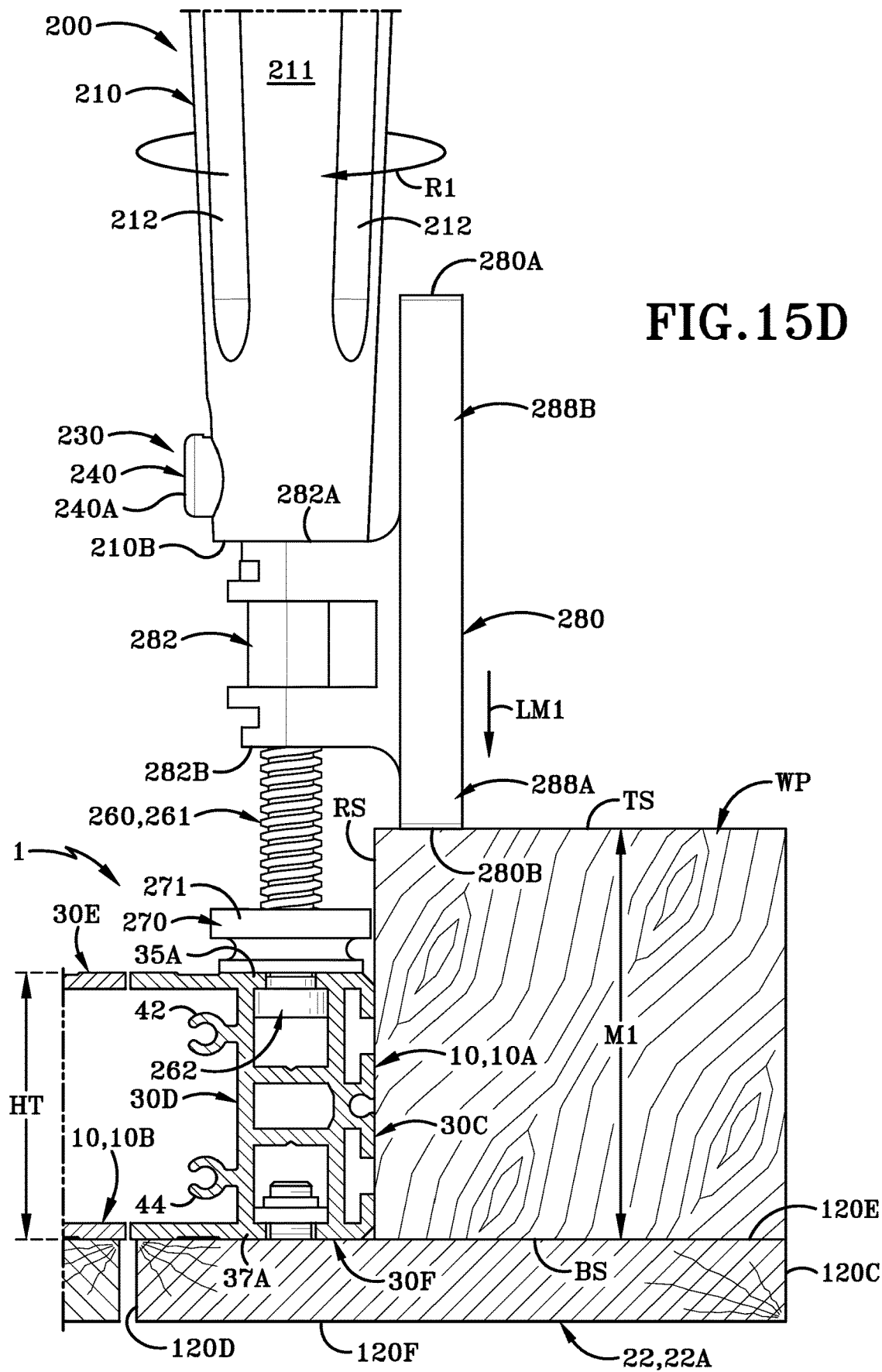
FIG. 15D is a partial front elevation view similar to FIG. 15C of the at least one clamping handle assembly operably engaged to the taper jig, wherein the clamp block of the at least one clamping handle assembly is oriented in the first orientation and is engaged with the workpiece.
Figure 15E:
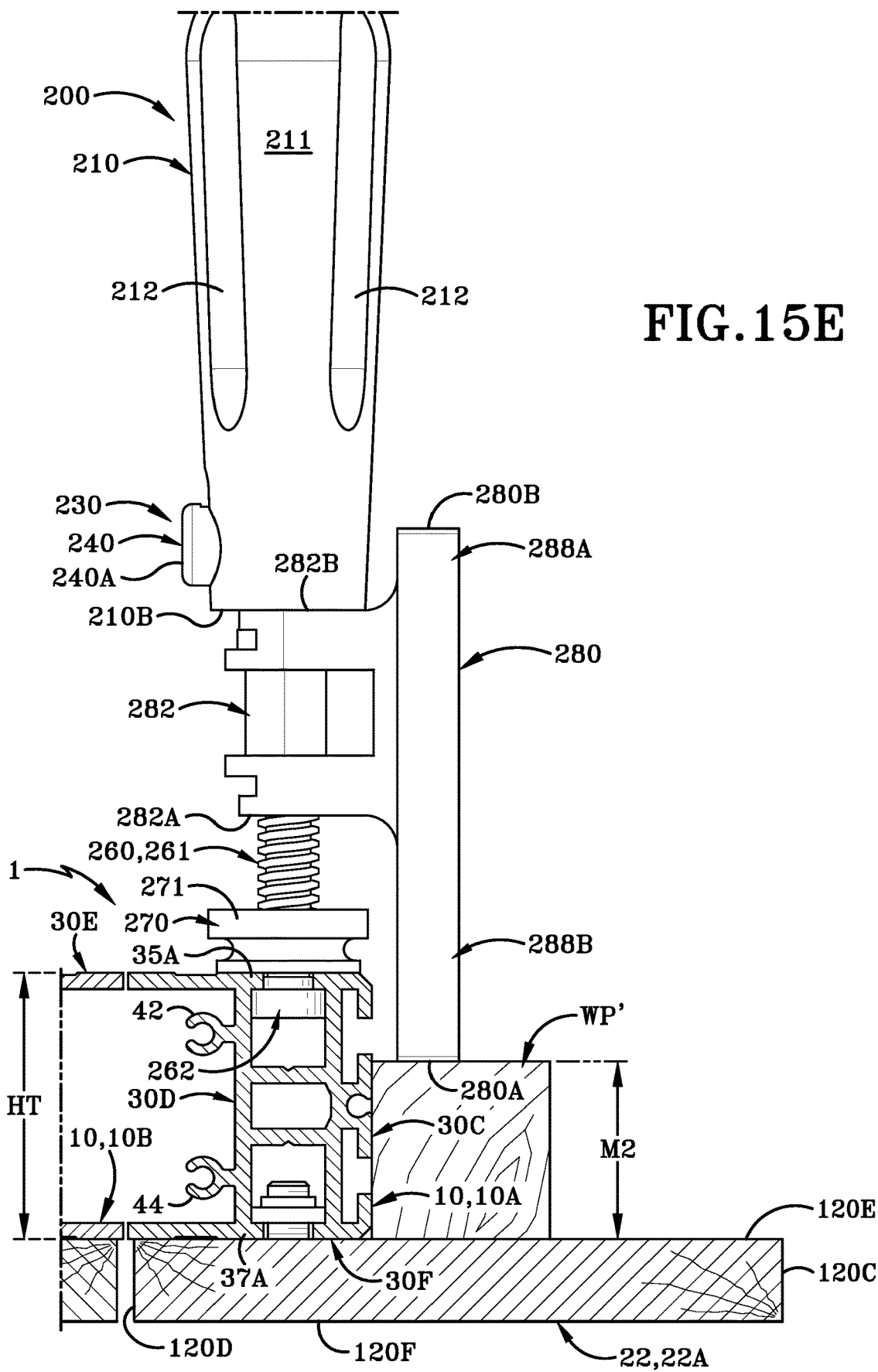
FIG. 15E is a partial front elevation view similar to FIG. 15C of the at least one clamping handle assembly operably engaged to the taper jig, wherein the clamp block of the at least one clamping handle assembly is oriented in a second orientation and is engaged with a different workpiece.

As illustrated in FIG. 15E, the clamp block 280 is provided in the second orientation where the first holding portion 288A is adjacent to the handle 210 and disposed away from the bolt head 262 of the threaded shaft 260. In addition, the second holding portion 288B is adjacent to the threaded shaft 260 and disposed proximate to the bolt head 262. Referring to FIG. 15E, the second holding portion 288B may define a second height (not illustrated) from an end of the second holding portion 288B proximate to the bottom end 280B of the clamp block 280 to the bottom surface 32F of the first track 10A and/or the second track 10B. In one exemplary embodiment, a second height may have a range from about ½ inches up to about 2½ inches.

In the illustrated embodiment, the expansion assembly 300 is operably engaged to the first and second tracks 10A, 10B of the taper jig 1. The expansion assembly 300 comprises of a pair of expansions tracks 310, a pair of expansion bars 312, an expansion span clamp assembly 318, and a pair of expansion sleds 322.

The pair of expansion tracks 310 also includes a first expansion track 310A and a second expansion track 310B. Each of the first expansion track 310A and a second expansion track 310B operably engages with the first track 10A and the second track 10B, which is described in more detail below. The first expansion track 310A and the second expansion track 310B are substantially identical to one another and are engaged with the first track 10A and the second track 10B facing towards the front end 1A of the taper jig 1. Inasmuch as the first expansion track 310A and the second expansion track 310B are substantially identical, the following description will relate to the first expansion track 310A. It should be understood, however, that the description of the first expansion track 310A applies equally to the second expansion track 310B.

Figure 13A:
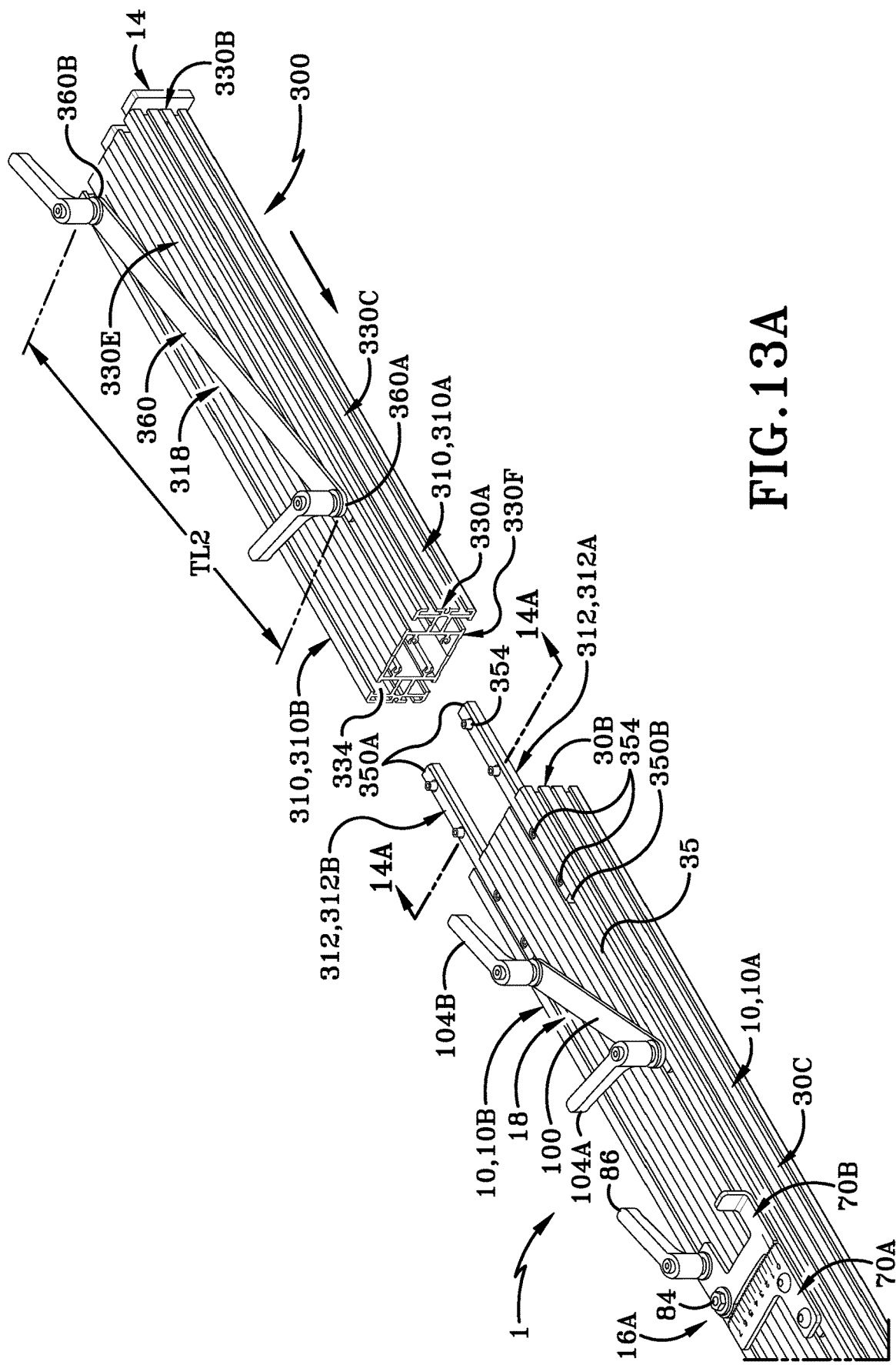
FIG. 13A is a top, front, left side isometric perspective view of a portion of the taper jig separable from an expansion assembly.

Referring to FIG. 13A, the first expansion track 310A has a front end 330A disposed proximate the rear end 30B of the first track 10A, an opposed rear end 330B, and a length "$TL_2$" that is defined from the front end 330A to the rear end 330B. In the illustrated embodiment, the length "$TL_2$" of the first expansion track 310A is less than the length "$TL_1$" of the first track 10A. The first expansion track 310A also includes a top surface 330E that is proximate the top end 1E of the taper jig 1 and extends between the front end 330A of the first expansion track 310A and the rear end 330B of the first expansion track 310A. The first track 10A also includes a bottom surface 332F that is proximate the first expansion track 310A and the bottom end 1F of the taper jig 1 and extends between the front end 330A of the first expansion track 310A and the rear end 330B of the first expansion track 310A. In the illustrated embodiment, the top surface 30E opposes the bottom surface 30E relative to the vertical axis "Z".

Still referring to FIG. 13A, the first expansion track 310A defines a top channel 334 that extends along the length $TL_2$ of the first expansion track 310. The top channel 334 also extends downwardly into the first expansion track 310A from the top surface 330E along an axis that is parallel to the vertical axis "Z". The top channel 334 of the first expansion track 310A is accessible by a top slot 335 defined along the top surface 330E of the first expansion track 310A. The first expansion track 310A also defines a bottom channel 336 that extends along the length $TL_2$ of the first expansion track 310A and opposes the top channel 334 on the first expansion track 310A. The bottom channel 336 also extends upwardly into the first expansion track 310A from the bottom surface 332F along an axis that is parallel with the vertical axis "Z". The bottom channel 336 of the first track 10A is accessible by a bottom slot 337 defined along the bottom surface 332F of the first expansion track 310A.

The first and second expansion tracks 310A, 310B may be made of any suitable material for providing minimum maintenance and high durability. In one exemplary embodiment, first and second expansion tracks may be made of a metal material. In another exemplary embodiment, first and second expansion tracks may be made of a nonferrous metal material. In another exemplary embodiment, first and second expansion tracks may be made of an aluminum material. In another exemplary embodiment, first and second expansion tracks may be made of an anodized aluminum material.

The pair of expansion bars 312 also includes a first expansion bar 312A and a second expansion bar 312B. The first expansion bar 312A and a second expansion bar 312B operably engages the first expansion track 310A with the first track 10A and second expansion track 310B with the second track 10B, which is described in more detail below. The first expansion bar 312A and the second expansion bar 312B are also substantially identical to one another. Inasmuch as the first expansion bar 312A and the second expansion bar 312B are substantially identical, the following description will relate to the first expansion bar 312A. It should be understood, however, that the description of the first expansion bar 312A applies equally to the second expansion bar 312B.

Figure 13B:
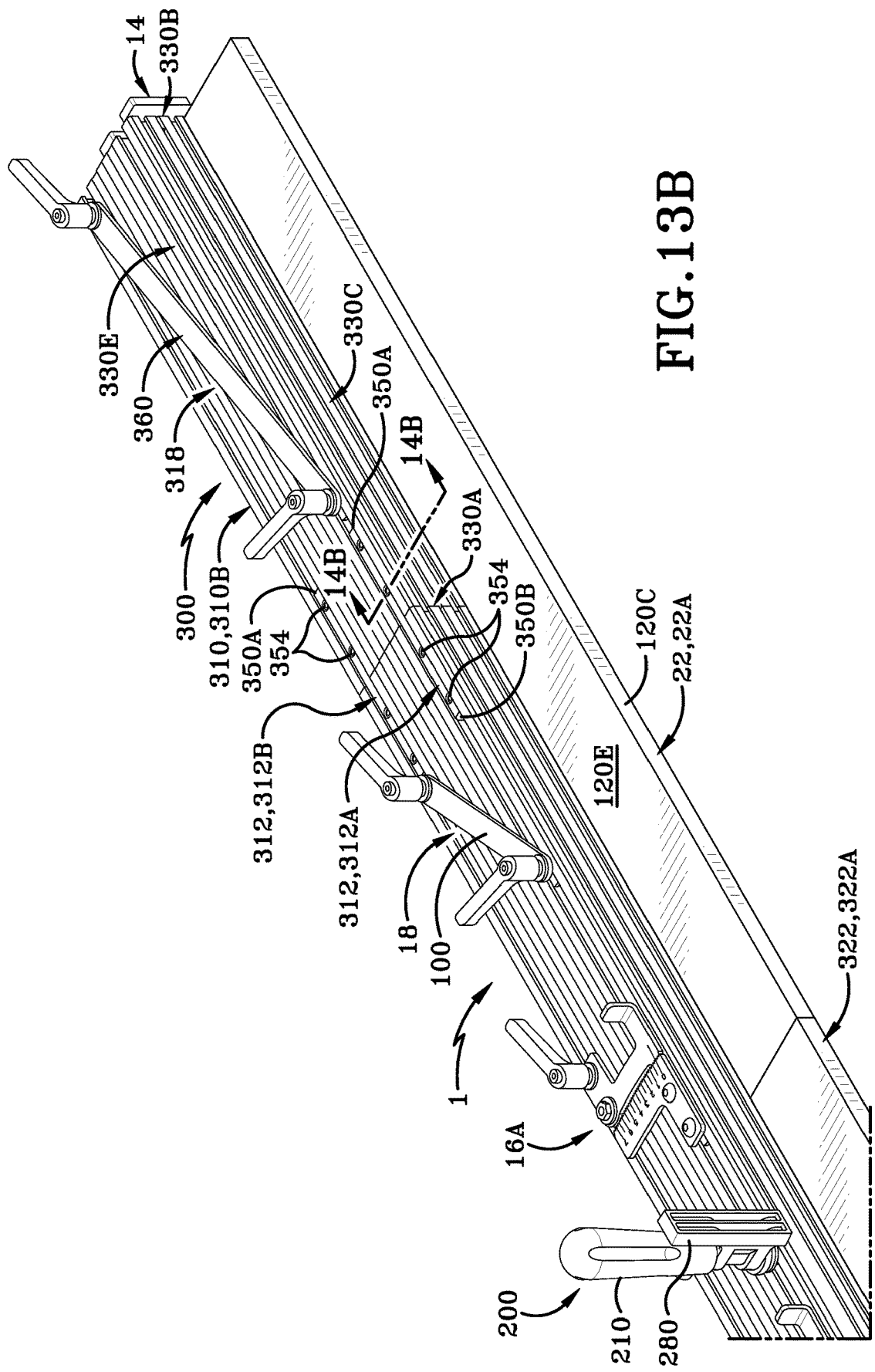
FIG. 13B is a top, front, left side isometric perspective view of the taper jig operably engaged with the expansion assembly.
Figure 14A:
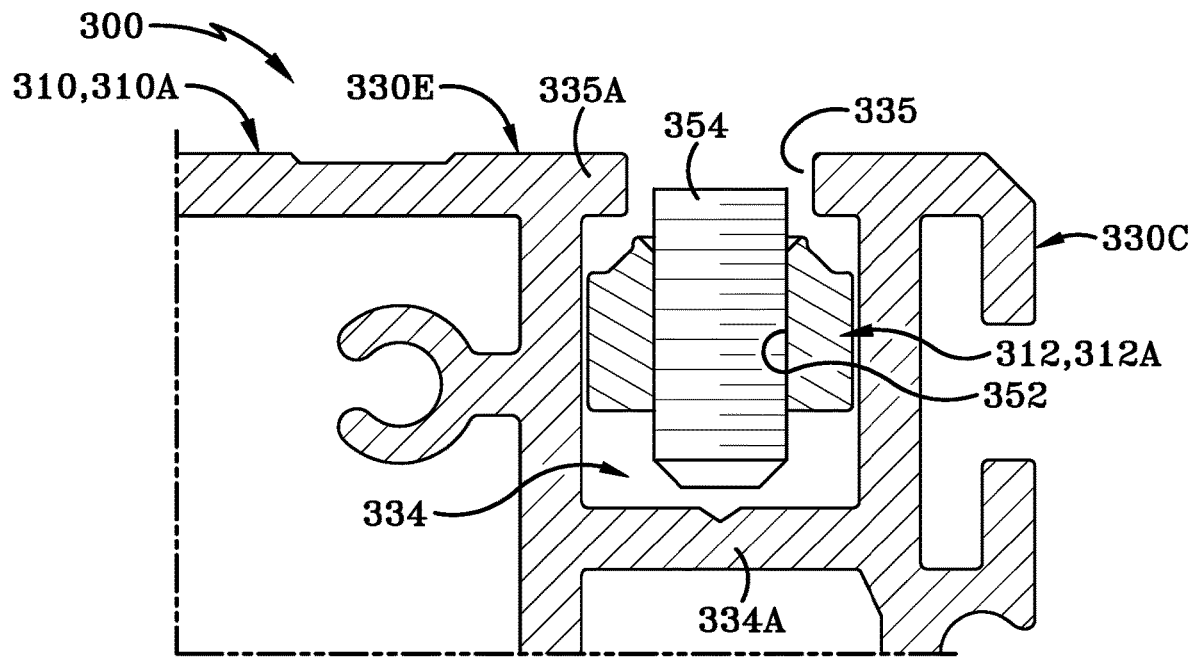
FIG. 14A is a transverse cross-section of the taper jig taken in direction of line 14A-14A in FIG. 13A.

As illustrated in FIGS. 13 and 14A, the first expansion bar 312A has a front end 350A, an opposed rear end 350B, and a longitudinal axis that extends between the front end 350A and the rear end 350B. In the illustrated embodiment, the first expansion bar 312A defines a set of threaded holes 352 that extends entirely through the first expansion bar 312A orthogonal to the longitudinal axis of the first expansion bar 312A. As described later herein, the first expansion bar 312A operably engages the first track 10A to the first expansion track 310A via a set of fasteners 354 operably threading to the set of threaded holes 352 causing an attachment mechanism between the first expansion bar 312A and each of the first track 10A and the first expansion track 310A.

Referring to FIGS. 13A and 13B, the expansion span clamp assembly 318 is substantially similar to the span clamp assembly 18 that is described above. As illustrated in FIG. 13A, the expansion span clamp assembly 318 includes a plate 360 that has a first end 360A, an opposed second end 360B, and a length $TP_2$ that is measured from the first end 360A to the second end 360B. In the illustrated embodiment, the length "$TP_2$" of the expansion span clamp assembly 318 is greater than the length "$TP_1$" of the span clamp assembly 18. The expansion span clamp assembly 318 is greater in length than the span clamp assembly 18 because the addition of the first and second expansion tracks 310A, 310B add additional length to the taper jig 1.

As illustrated in FIGS. 13A and 13B, each of the first and second expansion sleds 322A, 322B is substantially similar to the sleds 22A, 22B of the first and second sleds 22A, 22B described and illustrated herein. In the illustrated embodiment, each of the first and second expansions sleds 322A, 322B have a length that is less than the lengths "$D_1$", "$D_2$" of the first and second sleds 22A, 22B due to the first and second expansion sleds 322A, 322B matching the lengths of the first and second expansions tracks 310A, 310B.

In the illustrated embodiment, the first and second expansion sleds 322A, 322B may be sacrificial such that the first and second expansion sleds 322A, 322B may be cut into during a cutting operation. As such, the first and second expansion sleds 322A, 322B may be made from a material in which a standard cutting blade on a table saw may be able to cut through during a cutting operation. In one exemplary embodiment, first and second sleds may be made from a wood material. In another exemplary embodiment, first and second sleds may be made of medium-density fiberboard ("MDF"). In another exemplary embodiment, first and second sleds may be made from any suitable material that would not harm or damage a workpiece or a woodworking tool during a cutting operation.

Having described the structure of the taper jig 1 and the various components and connections thereof within taper jig 1, methods of use thereof will now be described.

Figure 14B:
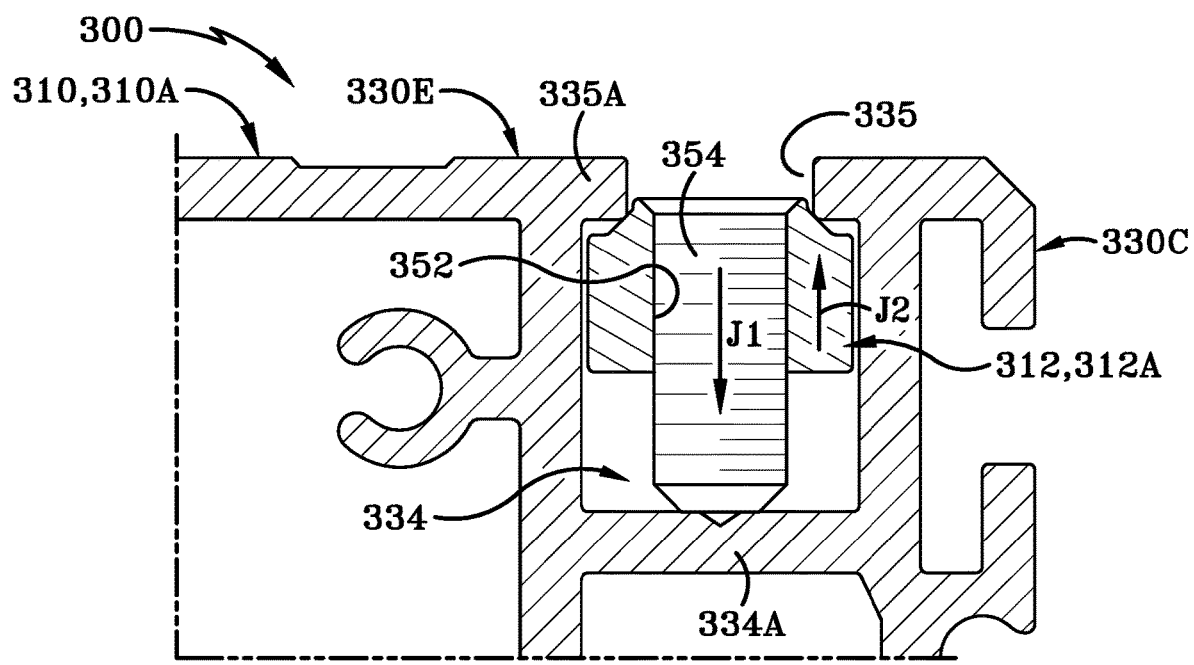
FIG. 14B is a transverse cross-section of the taper jig taken in direction of line 14B-14B in FIG. 13B.

Prior to introducing a workpiece to the taper jig 1, a woodworker may introduce the expansion assembly 300 to the taper jig 1. As illustrated in FIG. 13A, a woodworker may operably engage the expansion assembly 300 with the taper jig 1 via the first expansion bar 312A and the second expansion 312B. In the illustrated embodiment, the woodworker may initially operably engage the first and second expansions bars 312A, 312B to the first and second expansions tracks 310A, 310B in which a portion of each expansion bars 312A, 312B is positioned inside of each expansion track 310A, 310B via the top channel 334. Once inside of the top channel 334, a woodworker may introduce the fasteners 354 to maintain the first and second expansion 312A, 312B inside of the first and second expansion tracks 310A, 310B. As illustrated in FIGS. 14A and 14B, each fastener 354 is operably threaded into a respective threaded hole 352 of the first expansion bar 312A where the fastener 354 and the first expansion bar 312A exert opposing forces on the first expansion track 310A to create a pinching mechanism. As illustrated in FIG. 14B, the pinching mechanism in created by each fastener 354 exerting a downward force on a lower wall 334A of the first expansion track 310A inside of the top channel 334, which is denoted by an arrow labeled "J1", and the first expansion bar 312A exerting an upward, opposing force on an upper wall 335A of the first expansion track 310A inside of the top channel 334, which is denoted by an arrow labeled "J2". The woodworker may repeat the same process to operably engage the second expansion bar 312B to the second expansion track 310B via the fasteners 354.

Once the first and second expansion bars 312A, 312B are operably engaged to the first and second expansion tracks 310A, 310B, the woodworker may introduce the first and second expansion bars 312A, 312B to the first and second tracks 10A, 10B. The woodworker may repeat the same process to operably engage the first expansion bar 312A to the first track 10A and to operably engage the second expansion bar 312B to the second track 10B via the fasteners 354. Once the first and second expansion bars 312A, 312B are operably engaged to the first and second tracks 10A, 10B, the taper jig 1 is now provided in an expanded configuration (see FIG. 13B). If desired, the woodworker may omit the step of expanding the taper jig 1 by not operably engaging the first and second expansion tracks 310A, 310B via the first and second expansion bars 312A, 312B for any suitable reason, such as using the taper jig 1 for cutting a workpiece that is less than or equal to the length "$TL_1$" of the first and second tracks 10A, 10B.

During assembly, the woodworker may operably engage the push plate 14 to the expansion assembly 300 if the woodworker desires to use the expansion assembly 300. As illustrated in FIG. 13A, the woodworker may operably engage the push plate 14 at the rear end 330B of the first expansion track 310A substantially similar to the push plate 14 operably engaging to the first track 10 as described above. In one exemplary embodiment, a woodworker may operably engage the push plate 14 at the rear end 330B of the second expansion track 310B substantially similar to the push plate 14 operably engaging to the first track 10 as described above.

During assembly, the woodworker may operably engage the first and second expansion sleds 322A/322B to the first and second tracks 10A, 10B if the woodworker desires to use the expansion assembly 300. As illustrated in FIG. 13B, the first and second sleds 22A, 22B may be moved rearwardly towards the rear end 1B of the taper jig 1 in which the first and second sleds 22A, 22B operably engage both the first and second tracks 10A, 10B and the first and second expansion tracks 310A, 310B. In addition, the first and second expansion sleds 322A, 322B may operably engage the first and second tracks 10A, 10B proximate the front end 1A of the taper jig 1 and opposite to the first and second sleds 22A, 22B. In this configuration, the first and second sleds 22A, 22B and the first and second expansion sleds 322A, 322B are positioned end-to-end when operably engaged to the first and second tracks 10A, 10B and the first and second expansion tracks 310A, 310B.

Prior to introducing a workpiece to the taper jig 1, the woodworker may operably engage at least one clamping handle assembly 200 to the taper jig 1 for a cutting operation (see FIGS. 13B and 15A). In the illustrated embodiment, the woodworker may introduce a clamping handle assembly 200 to the taper jig. As illustrated in FIG. 15A, the woodworker may operably engage the clamping handle assembly 200 to the first track 10A by creating a securement mechanism between the clamping handle assembly 200 and the first track 10A. Still referring to FIG. 15A, the bolt head 262 of the threaded shaft 260 is provided inside of the top channel 34 and directly abuts the first track 10A underneath the top surface 30E. The threaded nut 270 operably threads to the threaded shaft 260 and directly abuts the top surface of the first track 10A. In order to secure the clamping handle assembly 200 to the first track 10A, the woodworker applies a rotational force on the threaded nut 270 in a clockwise direction until the clamping handle assembly 200 is suitably maintained with the first track 10A and inside of the top channel 34. The clamping handle assembly 200 is maintained with the first track 10A and inside of the top channel 34 by the bolt head 262 of the threaded shaft 260 exerting an upward force on the first track 10A inside of the top channel 34 and the threaded nut 270 exerting a downward force on the first track 10 at the top surface 30E. As such, a securement mechanism is created by the threaded shaft 260 and the threaded nut 270. If the woodworker desires to move the clamping handle assembly 200 on the first track 10A or the first expansion track 310A, the woodworker may apply a rotational force on the threaded nut 270 in the counterclockwise direction to loosen the threaded nut 270 for allowing the clamping handle assembly 200 to freely move along the first track 10A or first expansion track 310A relative to the longitudinal axis "X" of the taper jig 1.

Once the clamping handle assembly 200 is operably engaged with the taper jig 1, a woodworker may collectively raise or lower the handle 210 and the clamp block 280 from a first location on the threaded shaft 260 to a second location on the threaded shaft 260 depending on the height on a workpiece. As illustrated in FIG. 15A, the woodworker may collectively raise the handle 210 and the clamp block 280 away from the first track 10A by actuating the gripping mechanism 230 from engaging the threaded shaft 260 to disengaging the threaded shaft 260. Such actuation of the gripping mechanism is shown by an arrow denoted "$K_1$". While the woodworker actuates the gripping mechanism 230, the woodworker may collectively raise the handle 210 and the clamp block 280 away from the first track 10A and towards the top end 260A of the threaded shaft 260 (see FIG. 15B). Such raising of the handle 210 and the clamp block is shown by an arrow denoted "$K_2$". Once the woodworker has determined a desired height for the handle 210 and the clamp block 280, the woodworker may release the gripping mechanism 230 where the gripping mechanism 230 engages the threaded shaft 260, via the biaser 252, and maintains the handle 210 and the clamp block 280 at a second location on the threaded shaft 260 (see FIG. 15C). Such de-actuation and biasing mechanism provided on the gripping mechanism 230 is shown by an arrow denoted "$K_3$".

Once the woodworker has determined a suitable height for the handle 210 and the clamp block 280, the woodworker may introduce a workpiece "WP" to the taper jig 1. As illustrated in FIG. 15C, a bottom surface "BS" of the workpiece "WP" may contact and rest on a top surface 370E of the first expansion sled 322A and/or the top surface 120E of the first sled 22A. In addition, a right side "RS" of the workpiece "WP" may contact the outer surface 30C of the first track 10A and/or the first expansion track 310A. Still referring to FIG. 15C, the clamp block 280 is disposed directly above a top surface "TS" of the workpiece when the workpiece "WP" is resting on the top surfaces 120E, 370E of the first sled 22A and first expansion sled 322A. In addition, the workpiece "WP" has a height "$M_1$" that is measured from the top surface "TS" to the bottom surface "BS". Given the height "$M_1$" of the workpiece "WP" is greater than the height "$H_T$" of the first and second tracks 10A, 10B, the woodworker may provide the clamp block 280 in the first orientation (see FIG. 12A) where the first holding portion 288A is provided to operably engage with the workpiece "WP". Once the workpiece "WP" is positioned directly under the clamp block 280, the woodworker may apply a rotational force on the handle 210 in the clockwise direction to operably engage the first holding portion 288A with the top surface "TP" of the workpiece "WP". The rotational force applied by the woodworker on the handle 210 is denoted by an arrowed labeled "$R_1$". As the woodworker rotates the handle 210, the clamp block 280 linearly moves downwardly towards the workpiece "WP via the handle 210. The linear force applied by the handle 210 to the clamp block is denoted by an arrowed labeled "$LM_1$". The woodworker may cease the rotational force on the handle 210 once the clamp block 280 is suitably tightened to the workpiece "WP" and maintains the workpiece "WP" with the taper jig 1.

While not illustrated, the woodworker may also actuate the gripping mechanism 230 to operably engage the clamp block 280 to the workpiece "WP". In this operation, the woodworker may collectively move the handle 210 and the clamp block 280 towards the workpiece "WP" while the woodworker is actuating the gripping mechanism 230. The woodworker may stop actuating the gripping mechanism 230 once the clamp block 280 is suitably tightened to the workpiece "WP" and may maintain the workpiece "WP" with the taper jig 1.

As illustrated in FIG. 15E, the woodworker may introduce a different workpiece "WP" to the taper jig 1 that has a height "$M_2$" less than the workpiece "WP" illustrated in FIG. 15D. In this arrangement, the woodworker may provide the clamp block 280 in the second orientation (see FIG. 12B) where the second holding portion 288B is provided to operably engage with the workpiece "WP". Generally, a woodworker may choose to arrange the clamp block 280 in the second orientation when the height of the workpiece "WP" is less than the height "$H_T$" of the first and second tracks 10A, 10B and/or the first and second expansion tracks 310A, 310B. The woodworker may then engage the second holding portion 288B to a top surface "TP" of the workpiece "WP" similarly to the first holding portion 288A engaging the top surface "TP" of the workpiece "WP" shown in FIG. 15D.

In other applications, the workpiece may contact and/or rest on other associated parts of the taper jig 1 or other woodworking tools. In one exemplary embodiment, a bottom surface of a workpiece may contact a first sled of a taper jig if a woodworker desires to omit the use of an expansion assembly. In another exemplary embodiment, a bottom surface of a workpiece may contact a top surface of a worktable or workbench if a woodworker desires to omit the use of any sleds.

Once the workpiece "WP" is operably engaged to the taper jig 1, the woodworker may then position the first track 10A and the first expansion track 310A at an angle α relative to the second track 10B and the second expansion track 310B via the first measurement scale assembly 16A and/or the second measurement scale assembly 16B. As illustrated in FIG. 16A, the woodworker may initially loosen the adjustable lever 86A of the selector 70B of the first measurement scale assembly 16A in order to pivot and select a suitable angle for the selector 70B. The woodworker loosens the adjustable lever 86A by applying a rotational force on the adjustable lever 86A in the counter-clockwise direction. Such rotational force on the adjustable lever 86A is denoted by an arrow labeled "$R_2$". Once loosened, the woodworker may then apply a pulling force on the bent portion 92 of the selector 70B in a direction away from the indexer 70A of the first measurement scale assembly 16A to pivot the selector 70B away from the indexer 70. Such pulling force on the bent portion 92 is denoted by an arrow labeled "$F_1$". The woodworker may cease the pulling force on the bent portion 92 once the fastener 86B operably engages the selector 70B inside of the oblong through-hole 83B. During this operation, the set of selector teeth 88B of the selector 70B disengages from the set of measurement teeth 78 of the indexer 70A to allow the selector 70B to freely rotate and be free of impediment.

As illustrated in FIG. 16B, the woodworker may also loosen the adjustable lever 86A of the second measurement scale assembly 16B similar to the adjustable lever 86A of the first measurement scale assembly 16A to allow the selector 70B of the second measurement scale assembly 16B to freely pivot and rotate on the second track 10B. Still referring to FIG. 16B, the woodworker may also loosen the adjustable levers 106A of the first and/or second adjusting mechanism 104A, 104B of the span clamp assembly 18 similar to the adjustable lever 86A of the first measurement scale assembly 16A to allow the span clamp assembly 18 to freely move on the first track 10A and second track 10B. Such rotational force on each adjustable lever 86A is denoted by an arrow labeled "$R_2$".

Figure 16C:
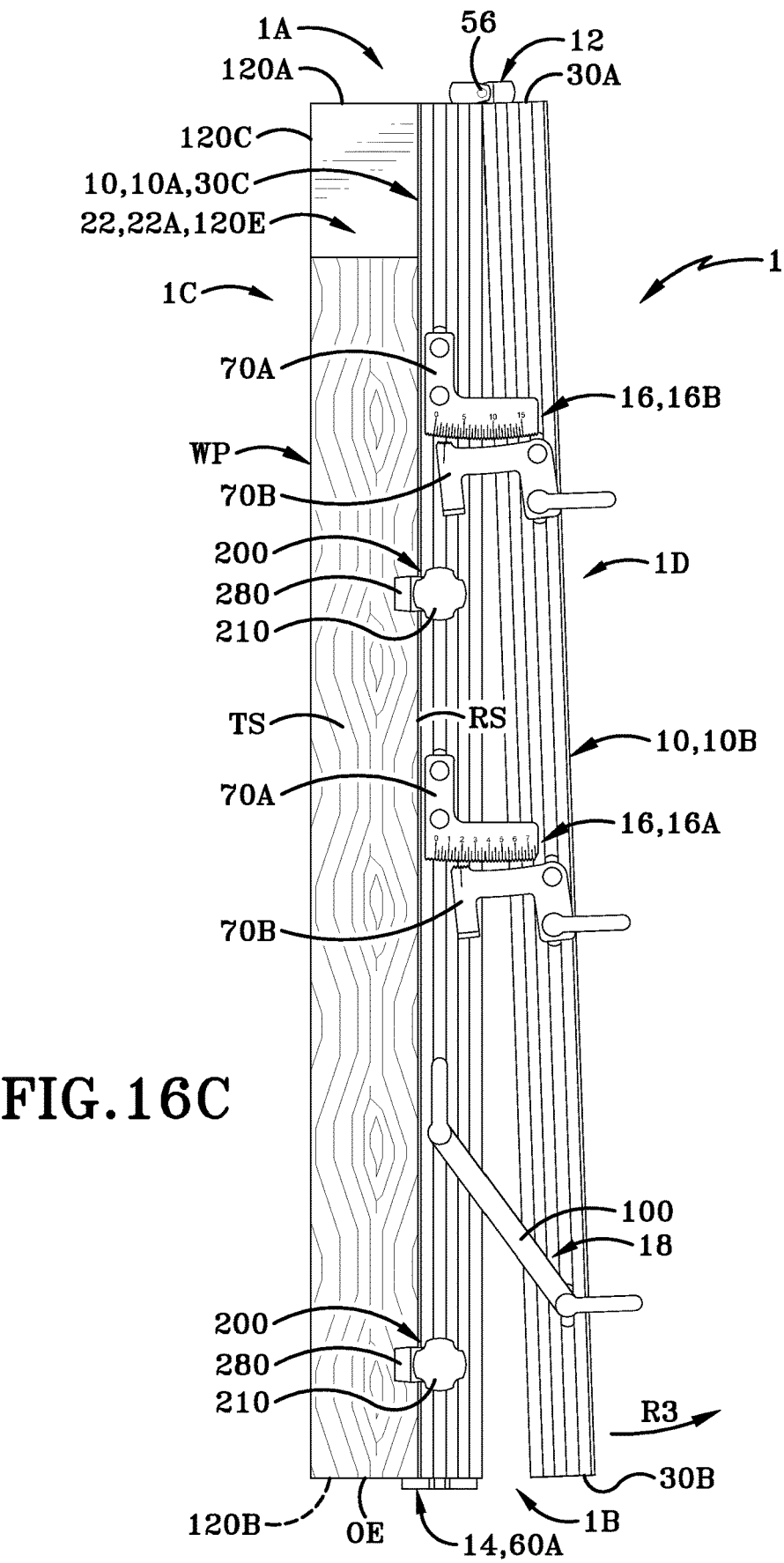
FIG. 16C is a top elevation view similar to FIG. 16B of the taper jig, wherein the workpiece is operably engaged with the taper jig, and wherein the second track of the taper jig is pivoted away from the first track.

Once the selectors 70B of the first and second measurement scale assemblies 16A, 16B and the span clamp assembly 18 are freely moveable on the taper jig 1, the woodworker may then pivot and/or rotate the rear end 30B of the second track 10B away from the rear end 30B of the first track 10A to the angle α as measured by either the first measurement scale assembly 16A and/or the second measurement scale assembly 16B (see FIG. 16C). The pivot and/or rotation of the second track 10B is denoted by an arrow labeled "$R_3$". The linchpin 56 of the hinge 12 allows the rear end 30B of the second track 10B to freely pivot away from the rear end 30B of the first track 10A due to the front ends 30A of the first and second tracks 10B being operably engaged to first and second separable portions 50A, 50B of the hinge 12. Once a suitable angle is determined, the woodworker ceases to pivot the second track 10B away from the first track 10A. While the second track 10B is pivoted away from the first track 10A, the first track 10A may be pivoted away from the second track 10B in another embodiment.

Figure 16D:
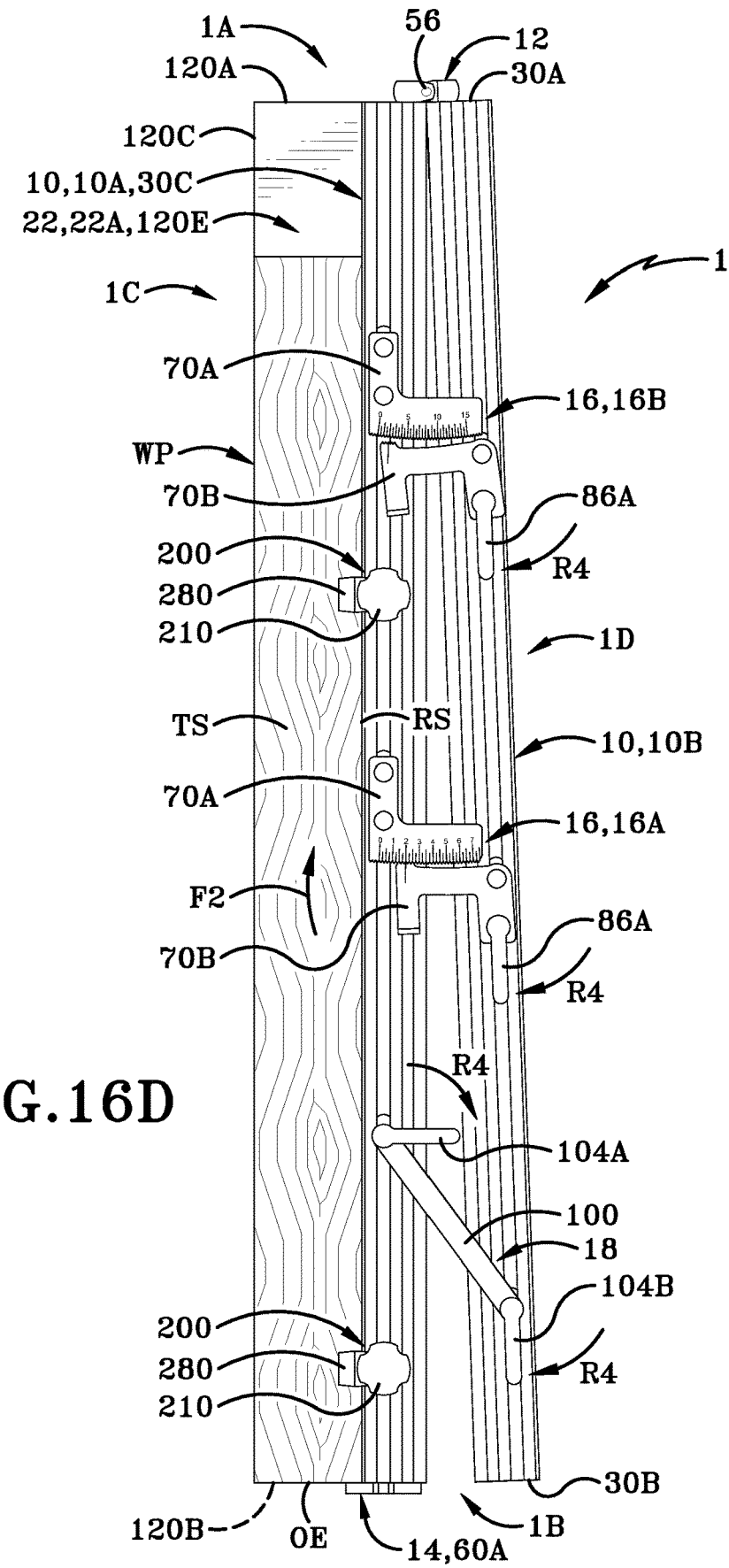
FIG. 16D is a top elevation view similar to FIG. 16C of the taper jig, wherein the workpiece is operably engaged with the taper jig, wherein the second track is disposed at a first angle relative to a first track of the taper jig, and wherein the first measurement scale, the second measurement scale, and the span clamp is tightened to the taper jig.

To ensure the angle α selected by the woodworker remains the same during a cutting process, the woodworker may engage the selector 70B of the first measurement scale assembly 16A with the indexer 70A of said first measurement scale assembly 16B. As illustrated in FIGS. 4 and 16D, the woodworker initially aligns the selecting marker 88C of the selector 70B with an angle from the first set of angle $A_1$ provided on the indexer 70A. As illustrated in FIG. 16D, the angle α selected by the woodworker is two degrees. As such, the selecting marker 88C aligns the selecting marker 88C with the two-degree marker of the first set of angle $A_1$ on the indexer Once aligned, the woodworker applies a pushing force on the bent portion 92 to operably mesh the set of selector teeth 88B of the selector 70B with the set of measurement teeth 78 of the indexer 70A (shown in FIG. 16D). The pushing force exerted by the woodworker on the bent portion 92 is denoted by an arrow labeled "$F_2$". The woodworker then tightens the adjustable lever 86A to the selector 70B so that the first measurement scale assembly 16A maintains the selected angle desired by the woodworker. Such rotational force on the adjustable lever 86A is denoted by an arrow labeled "$R_4$". In addition, the woodworker may then tighten the adjustable levers 86A of the second measurement scale assembly 16B and the span clamp assembly 18 so that the second measurement scale assembly 16B and the span clamp assembly 18 maintains the selected angle desired by the woodworker.

While not illustrated herein, a woodworker may operably mesh the set of selector teeth 88B with the set of measurement teeth 78 of the second measurement scale assembly 16B to further maintain the angle of taper desired by the woodworker during a cutting process. As such, the selecting marker 88C of the selector 70B in the second measurement scale assembly 16B may align with the selected angle from the first set of angle $A_1$ provided on the indexer 70A in the second measurement scale assembly 16B.

Furthermore, the second track 10B may be pivoted and maintained at any suitable angle relative to the first track 10A by the first measurement scale assembly 16A, the second measurement scale assembly 16B, the span clamp assembly 18, or the span expansion clamp 318 based on various considerations. In one example, a woodworker may use either a first measurement scale, a second measurement scale, a span clamp, or a span expansion clamp to maintain a second track at an angle relative to the first track in a range between about zero degrees up to about seven and one-half degrees. In another example, a woodworker may use either a second measurement scale, a span clamp, or a span expansion clamp to maintain a second track at an angle relative to the first track that is greater than seven and one-half degrees up to about fifteen degrees. In another example, a woodworker may use a span clamp assembly or a span expansion clamp assembly to maintain a second track at an angle relative to the first track of at least fifteen degrees.

Figure 17:
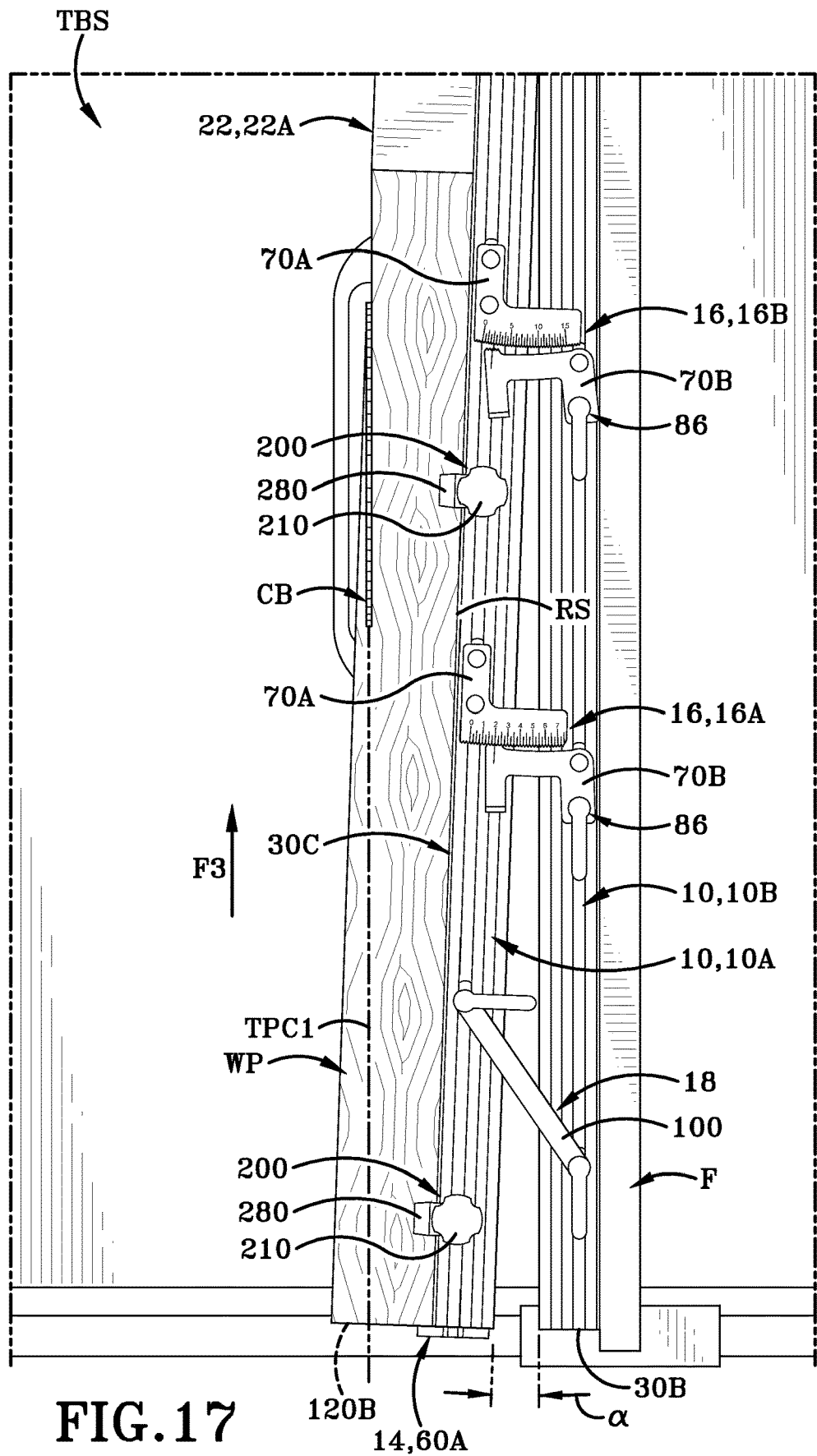
FIG. 17 is a top elevation view similar to FIG. 16D of the taper jig operably engaged with the workpiece, wherein a table saw cuts a first tapered cut into the workpiece at the first angle.

Once the workpiece "WP" is operably engaged with the taper jig 1, the workpiece "WP" and the taper jig 1 may be introduced to a table saw "TBS." As illustrated in FIG. 17, the woodworker may place the front end 1A of the taper jig proximate to a cutting blade "CB" of the table saw "TBS" to begin a tapered cut "$TPC_1$" into the workpiece "WP". In the illustrated embodiment, the woodworker may operably engage a fence "F" to the table saw "TBS" so that the taper jig 1 is linearly guided along the cutting blade "CB" and is maintained on the cutting blade "CB" throughout the cutting process. Once the taper jig 1 and the workpiece "WP" are aligned with the cutting blade "CB", the woodworker exerts a forward force on the taper jig 1 directed towards the cutting blade "CB". Such forward force applied by the woodworker to the taper jig 1 is denoted by an arrow labeled "$F_3$". To assist the woodworker during the cutting process, the woodworker may operably engage the clamping handles 200 provided on the taper jig 1 to help leverage the woodworker with applying force to the taper jig 1. While the clamping handles 200 are provided only on the first track 10A, at least one clamping handle assembly 200 may be provided on the second track 10B (see in FIG. 18 and as described below). During the cutting process, the first sled 22A and the first expansion sled 322A (if included) may be cut into by the cutting blade "CB" as desired by the woodworker.

Figure 18:
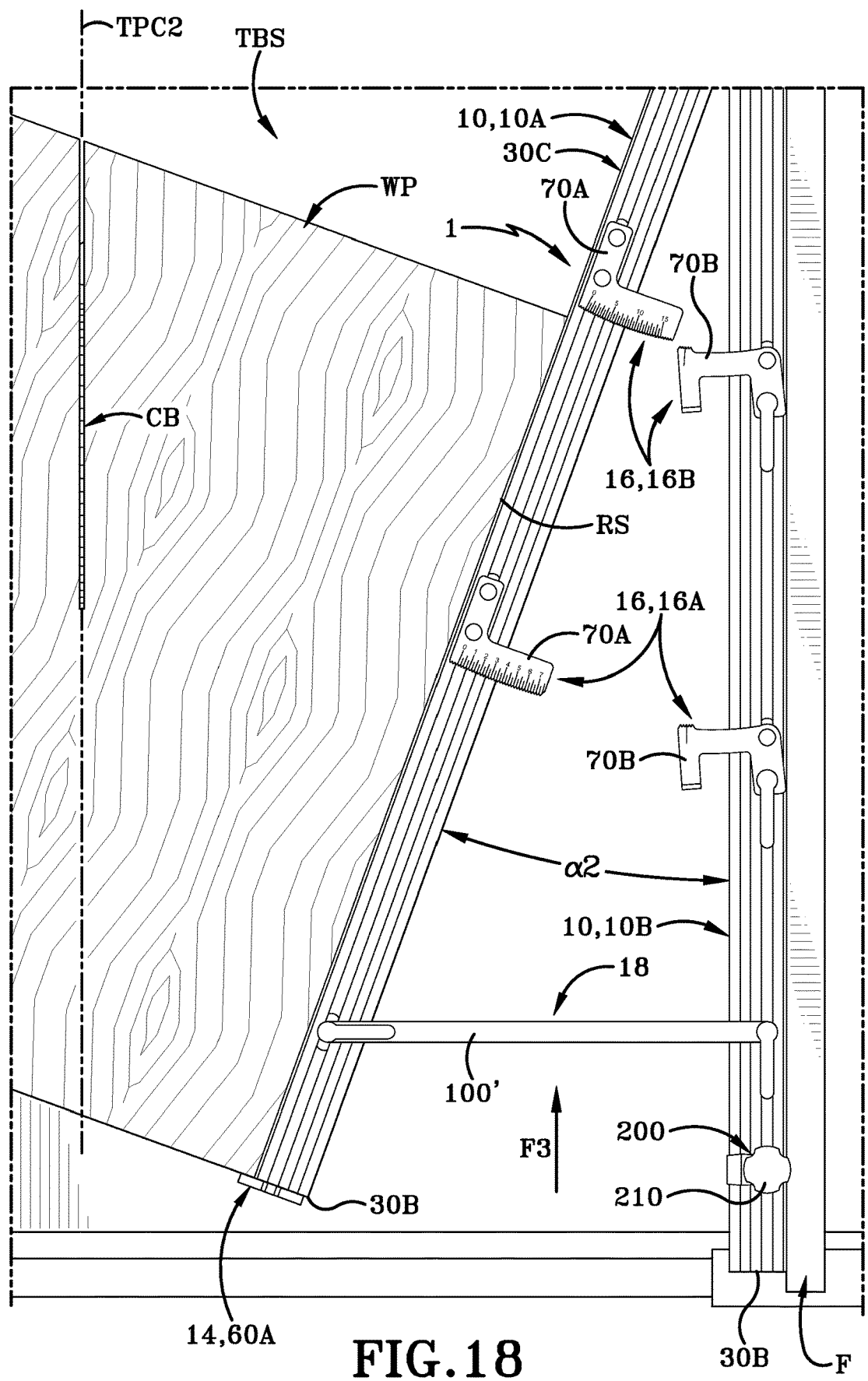
FIG. 18 is a partial elevation view similar to FIG. 17 of the taper jig operably engaged with a different workpiece, wherein the table saw cuts a second tapered cut into the workpiece at a second angle

As described previously, the woodworker using the taper jig 1 may omit the use of the sleds 22A, 22B when making a tapered cut "$TPC_2$". As illustrated in FIG. 18, the woodworker may omit or remove the first and second sleds 22A, 22B from the first and second tracks 10A, 10B due to the size, shape, and configuration of a workpiece, such as workpiece "WP'" in FIG. 18. In the illustrated embodiment, the woodworker may also omit or reposition the clamping handles 200 and/or the expansion assembly 300 from the taper jig 1 in which the clamping handles 200 and the expansion assembly 300 operably engage the workpiece "WP'". In one example, the woodworker may reposition at least one clamping handle assembly 200 on the second track 10B to assist the woodworker in leveraging the applied force to the taper jig 1 during a cutting process.

As described previously, the first and second measurement scale assemblies 16A, 16B may not be used by the woodworker during a cutting process. As illustrated in FIG. 18, the taper jig 1 may define a second tapered angle $\alpha_2$ defined between the first track 10A and the second track 10B. In the illustrated embodiment, the second tapered angle $\alpha_2$ of the taper jig 1 is at least fifteen degrees.

Figure 19:
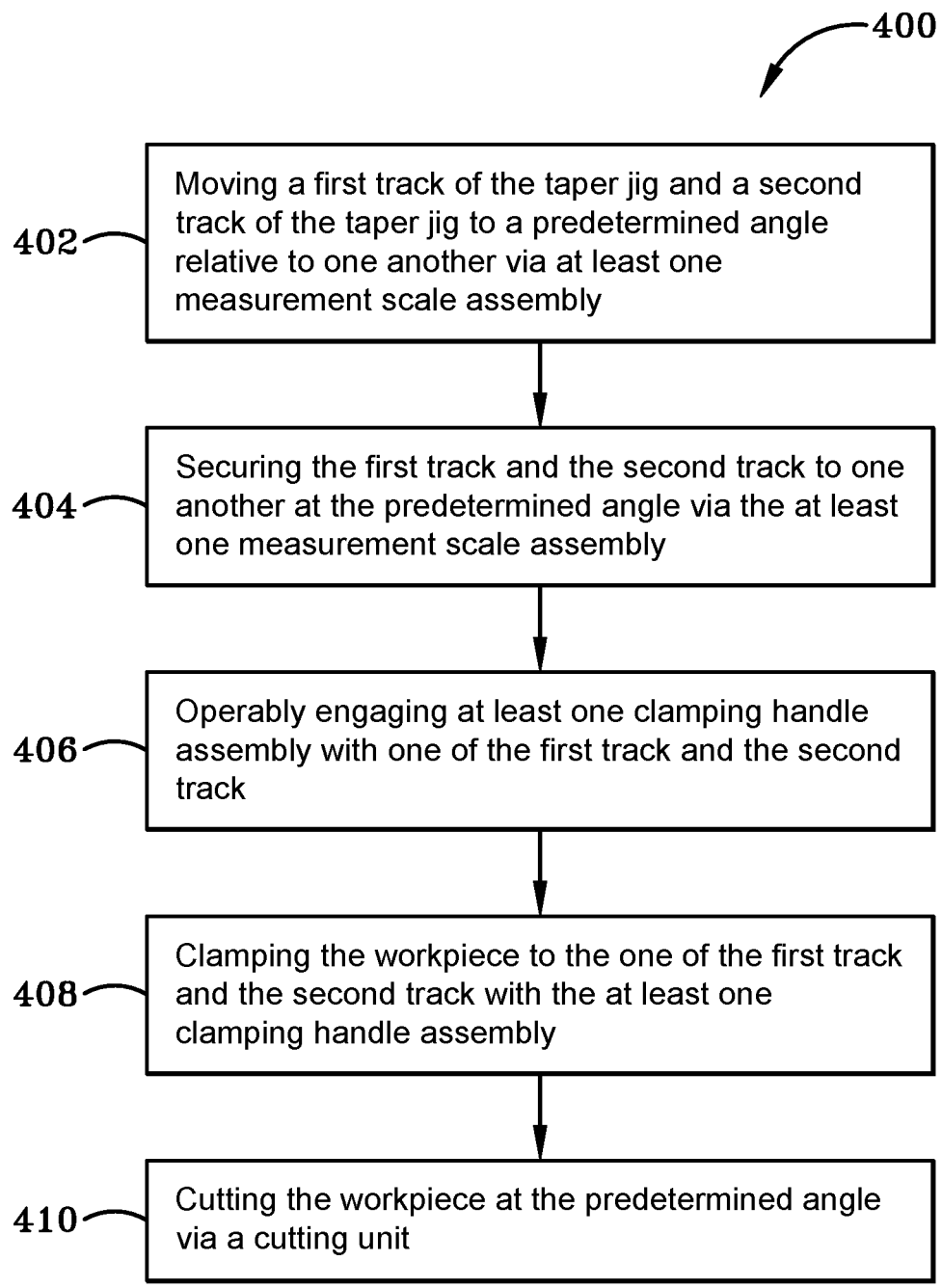
FIG. 19 is a method of cutting a workpiece using a taper jig.

FIG. 19 illustrates a method 400 of cutting a workpiece using a taper jig. An initial step 402 comprises moving a first track of the taper jig and a second track of the taper jig to a predetermined angle relative to one another via at least one measurement scale assembly. Another step 404 comprises securing the first track and the second track to one another at the predetermined angle via the at least one measurement scale assembly. Another step 406 comprises operably engaging at least one clamping handle assembly with one of the first track and the second track. Another step 408 comprises clamping the workpiece to the one of the first track and the second track with the at least one clamping handle assembly. Another step 410 comprises cutting the workpiece at the predetermined angle via a cutting unit.

In an exemplary embodiment, method 400 may include additional steps of cutting a workpiece with a taper jig. An optional step may further comprise utilizing the at least one measurement scale assembly to set the predetermined angle in a first range of angles. An optional step may further comprise providing an indexer on the at least one measurement scale assembly having a first set of angles thereon that are in the first range of angles, and the first set of angles is from about zero degrees up to about seven degrees arranged in one-quarter degree increments. An optional step may further comprise providing an indexer on the at least one measurement scale assembly with a first set of angles thereon that are in the first range of angles, and the first set of angles is from about zero degrees up to about fifteen degrees arranged in one-half degree increments. Optional steps may further comprise providing an indexer on the at least one measurement scale assembly and providing a set of measurement teeth on the indexer; providing a selector on the at least one measurement scale assembly and providing at least one selector tooth on the selector; and selectively engaging the at least one selector tooth with the set of measurement teeth to set the predetermined angle between the first track and the second track. Optional steps may further comprise disengaging the at least one measurement scale from one or both of the first track and the second track; engaging a span clamp assembly between the first track and the second track; and utilizing the span clamp assembly to set the predetermined angle in a second range of angles, wherein the second range of angles is outside of the first range of angles. Optional steps may further comprise defining a first channel in the first track, wherein the first channel extends between a front end and a rear end of the first track; defining a second channel in the second track, wherein the second channel extends between a front end and rear end of the second track; and engaging the at least one measurement scale assembly in the first channel and in the second channel. Optional steps may further comprise attaching a first expansion track of an expansion assembly to the first track of the taper jig; attaching a second expansion track of the expansion assembly to the second track of the taper jig; and operably engaging a workpiece with the first track of the taper jig and the first expansion track of the expansion assembly.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−1% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A taper jig, comprising:
   a first track;
   a second track operably engaging the first track wherein the second track is pivotably moveable relative to the first track; and
   at least one measurement scale assembly operably securing the first track and the second track to one another at a predetermined angle;
     wherein the at least one measurement scale assembly further comprises: an indexer having a set of measurement teeth defining a set of angles;
     and a selector having at least one selector tooth operable to selectively engage the set of measurement teeth and set the predetermined angle between the first track and the second track.

2. The taper jig of claim 1, wherein the first track and the second track are arranged in a same plane, and each of the first track and the second track has an outer surface and an inner surface, and when the first track and the second track pivot relative to one another, the inner surfaces move one of towards and away from one another.

3. The taper jig of claim 1, wherein the first track further comprises a front end, a rear end, a first top channel extending from the front end of the first track to the rear end of the first track, and an opposing first bottom channel extending from the front end of the first track to the rear end of the first track.

4. The taper jig of claim 3, wherein the second track further comprises a front end, a rear end, a second top channel extending from the front end of the second track to the rear end of the second track, and an opposing second bottom channel extending from the front end of the second track to the rear end of the second track.

5. The taper jig of claim 4, further comprising:
   at least one clamping handle assembly operably engaging one of the first track and the second track, said at least one clamping handle assembly being adapted to clamp a workpiece; wherein the at least one clamping handle assembly is selectively operably engageable in one of the first top channel and the second top channel.

6. The taper jig of claim 1, wherein each of the first track and the second track has a front end and a rear end, wherein a channel is defined in each of the first track and the second track and each of the channel extends from each of the front end to each of the rear end, and wherein the at least one measurement scale assembly is operably engaged with the channel of the first track and with the channel of the second track.

7. The taper jig of claim 1, further comprising: a push plate selectively operably engaging either of the first track and the second track.

8. The taper jig of claim 1, wherein the set of angles defines a range of from zero degrees up to seven degrees arranged in one-quarter degree increments.

9. The taper jig of claim 1, wherein the set of angles defines a range of from zero degrees up to fifteen degrees arranged in one-half degree increments.

10. The taper jig of claim 5, wherein the at least one clamping handle assembly comprises:
a handle;
a threaded shaft operably engaged with the handle, said threaded shaft being adapted to engage with a woodworking tool; and
a clamp block operably engaged with the threaded shaft, said clamp block being adapted to apply a clamping force to a workpiece.

11. The taper jig of claim 10, wherein the handle and the clamp block interlockingly engage with one another.

12. The taper jig of claim 10, wherein the clamp block is selectively movable between a first orientation and a second orientation.

13. The taper jig of claim 1, wherein each of the first track and the second track has a front end and a rear end, wherein a channel is defined in each of the first track and the second track and each of the channel extends from each of the front end to each of the rear end, and wherein the taper jig further comprises:
a span clamp assembly extending between the channel in the first track and the channel in the second track, said span clamp assembly adjustably securing the first track and the second track to one another.

14. The taper jig of claim 13, wherein the at least one measurement scale assembly sets the predetermined angle in a first range of angles, and wherein the span clamp assembly sets the predetermined angle in a second range of angles outside of the first range of angles.

15. The taper jig of claim 4, further comprising:
a first sled operably engaged with the first bottom channel of the first track by a first set of locking mechanisms; and
a second sled operably engaged with the second bottom channel of the second track by a second set of locking mechanisms.

16. The taper jig of claim 1, further comprising an expansion assembly, the expansion assembly comprising:
a first expansion track operably engaged to the first track; and
a second expansion track operably engaged to the second track.

17. A method of cutting a workpiece using a taper jig, comprising:
engaging a first track of a taper jig with a second track of the taper jig by pivotably moving the second track relative to the first track;
moving the first track of the taper jig and the second track of the taper jig to a predetermined angle relative to one another via at least one measurement scale assembly;
securing the first track and the second track to one another at the predetermined angle via the at least one measurement scale assembly;
operably engaging at least one clamping handle assembly with one of the first track and the second track;
clamping the workpiece to the one of the first track and the second track with the at least one clamping handle assembly;
cutting the workpiece at the predetermined angle via a cutting blade;
providing an indexer on the at least one measurement scale assembly and providing a set of measurement teeth on the indexer;
providing a selector on the at least one measurement scale assembly and providing at least one selector tooth on the selector; and
selectively engaging the at least one selector tooth with the set of measurement teeth to set the predetermined angle between the first track and the second track.

18. The method of claim 17, further comprising:
utilizing the at least one measurement scale assembly to set the predetermined angle in a first range of angles.

19. The method of claim 18, further comprising providing the indexer on the at least one measurement scale assembly having a first set of angles thereon that are in the first range of angles, and the first set of angles is from zero degrees up to seven degrees arranged in one-quarter degree increments.

20. The method of claim 18, further comprising providing the indexer on the at least one measurement scale assembly with a first set of angles thereon that are in the first range of angles, and the first set of angles is from zero degrees up to fifteen degrees arranged in one-half degree increments.

21. The method of claim 18, further comprising:
disengaging the at least one measurement scale from one or both of the first track and the second track;
engaging a span clamp assembly between the first track and the second track; and
utilizing the span clamp assembly to set the predetermined angle in a second range of angles, wherein the second range of angles is outside of the first range of angles.

22. The method of claim 17, further comprising:
defining a first channel in the first track, wherein the first channel extends between a front end and a rear end of the first track;
defining a second channel in the second track, wherein the second channel extends between a front end and rear end of the second track; and
engaging the at least one measurement scale assembly in the first channel and in the second channel.

23. The method of claim 17, further comprising:
attaching a first expansion track of an expansion assembly to the first track of the taper jig;
attaching a second expansion track of the expansion assembly to the second track of the taper jig; and
operably engaging a workpiece with the first track of the taper jig and the first expansion track of the expansion assembly.

* * * * *